United States Patent [19]

Mizutani et al.

[11] Patent Number: 5,748,953

[45] Date of Patent: May 5, 1998

[54] DOCUMENT SEARCH METHOD WHEREIN STORED DOCUMENTS AND SEARCH QUERIES COMPRISE SEGMENTED TEXT DATA OF SPACED, NONCONSECUTIVE TEXT ELEMENTS AND WORDS SEGMENTED BY PREDETERMINED SYMBOLS

[75] Inventors: Natsuko Mizutani; Atsushi Hatakeyama, both of Kawasaki; Hisamitsu Kawaguchi, Sagamihara; Katsumi Tada; Kanji Kato, both of Yokohama; Satoshi Asakawa, Hirakata, all of Japan

[73] Assignee: Hitachi, Ltd., Tokyo, Japan

[21] Appl. No.: 444,842

[22] Filed: May 18, 1995

Related U.S. Application Data

[63] Continuation-in-part of Ser. No. 120,285, Sep. 13, 1993, abandoned, and Ser. No. 31,625, Mar. 15, 1993, Pat. No. 5,471,610, each is a continuation-in-part of Ser. No.985,795, Nov. 30, 1992, Pat. No. 5,519,857, which is a continuation of Ser. No. 555,483, filed as PCT/JP90/00774 Jun. 14, 1990, Pat. No. 5,168,533.

[30] Foreign Application Priority Data

| Jun. 14, 1989 | [JP] | Japan | 1-149630 |
| Jul. 24, 1989 | [JP] | Japan | 1-188772 |
| Jul. 24, 1989 | [JP] | Japan | 1-188773 |
| Sep. 8, 1989 | [JP] | Japan | 1-231567 |
| Mar. 19, 1992 | [JP] | Japan | 4-063067 |
| Sep. 18, 1992 | [JP] | Japan | 4-249191 |
| Sep. 18, 1992 | [JP] | Japan | 4-275186 |
| Nov. 17, 1992 | [JP] | Japan | 4-306748 |
| May 24, 1994 | [JP] | Japan | 6-133810 |

[51] Int. Cl.$^6$ ........................... G06F 17/30
[52] U.S. Cl. ............. 395/606; 395/793; 395/761
[58] Field of Search ............ 395/606, 601–605, 395/611–612, 761, 793; 364/DIG. 1

[56] References Cited

U.S. PATENT DOCUMENTS

| 4,516,166 | 5/1985 | Tellone, et al. | 395/611 |
| 4,991,087 | 2/1991 | Burkowski et al. | 395/601 |
| 5,168,533 | 12/1992 | Kato et al. | 395/601 |

FOREIGN PATENT DOCUMENTS

| 0266586A3 | 5/1988 | European Pat. Off. . |
| 0437615A1 | 7/1991 | European Pat. Off. . |
| 60-105039 | 6/1985 | Japan . |
| 60-105040 | 6/1985 | Japan . |
| 60-117326 | 6/1985 | Japan . |

(List continued on next page.)

OTHER PUBLICATIONS

"A Computer Architecture to Support Natural Full Text Information Retrieval", Ray Smith & James Hooper, The University of Alabama at Huntsville, Southeastcon, 1988 IEEE confernece Proceddings, pp. 197–199, Jun. 1988.

(List continued on next page.)

*Primary Examiner*—Thomas G. Black
*Assistant Examiner*—Hosain T. Alam
*Attorney, Agent, or Firm*—Fay, Sharpe, Beall, Fagan, Minnich & McKee

[57] ABSTRACT

A neighboring plural-character occurrence bitmap of a practical capacity capable of eliminating noises by hashing is realized, and a high speed full text search is realized equivalently, by greatly reducing the number of documents to be searched even if a search term constituted by a combination of English characters and words is used. Text data is segmented into words, and n-character strings at every (m+l)-th character positions are extracted from each word. A neighboring plural-character occurrence bitmap is created which stores data representing a presence of each neighboring plural-character string at a certain entry thereof. N-character strings at every (m+l)-th character positions are extracted from a search term and the neighboring plural-character occurrence bitmap is searched by using a search control program. Since the neighboring plural-character occurrence bitmap is searched prior to searching condensed texts, documents not relevant to the search term can be discarded and a high speed full text search can be realized.

18 Claims, 40 Drawing Sheets

FOREIGN PATENT DOCUMENTS

| | | |
|---|---|---|
| 62-11932 | 1/1987 | Japan . |
| 62-011932 | 1/1987 | Japan . |
| 5-055912 | 9/1987 | Japan . |
| 62-241026 | 10/1987 | Japan . |
| 63-198124 | 8/1988 | Japan . |
| 63-311530 | 12/1988 | Japan . |
| 5-76068 | 12/1989 | Japan . |
| 5-076068 | 12/1989 | Japan . |
| 3-956722 | 4/1991 | Japan . |
| 3-125263 | 5/1991 | Japan . |
| 3-174652 | 7/1991 | Japan . |
| 5-055912 | 8/1993 | Japan . |
| WO9016036 | 12/1990 | WIPO . |

OTHER PUBLICATIONS

"A Multilevel Signature Approach For Retrieval of Unformed Data", Nassrin Tvakoli, University of North Carolina, Southeastcon, 1989, IEEE Proceedings, pp.1316–1320, Jun. 1989.

Hollaar, Lee A. "Text Retrieval Computers," Computer, Mar. 1979, pp. 40–50. (English).

Faloutsos, et al., "Signature Files: An Access Method for Documents and Its Analytical Performance Evaluation," ACM Transactions on Office Information Systems, vol. 2, No. 4, Oct. 1984, pp. 267–288.

Mukhopadhyay, Uttam, et al. "An Intelligent System for Document Retrieval in Distributed Office Environments," Journal of the American Society for Information Science, vol. 37, No. 3, May 1986, pp. 123–135.

Kim, Michelle Y. "Synchronized Disk Interleaving," IEEE Transactions on Computers, vol. C–35, No. 11, Nov. 1986, pp. 978–988.

"UNIX Device Driver," ASCII, pp. 51–52. (Provided in Japanese).

Roger L. Haskin, et al., "Operational Characteristics of a Hardware–Based Pattern Matcher," ACM Transactions on Database Systems, vol. 8, No. 1, Mar. 1983, pp. 15–40.

Alfred V. Aho, et al., "Efficient String Matching: An Aid to Bibliographic Search," Communications of the ACM, vol. 18, No. 6, Jun. 1975, pp. 333–340.

Faloutsos, et al., "Signature Filed: An Access Method for Documents and Its Analytical Performance Evaluation", ACM Trans on Office Information Systems, V.2, No. 4, Oct. 1984, pp. 267–288.

Haskins, et al., "Operational Characteristics of a Hardware–based Pattern Matcher", ACM Trans on Database Systems, V.8, No.1, Mar. 1983, pp. 15–40.

Aho, et al., "Efficient String Matching: An Aid to Bibliographic Search" Comm of the ACM, V.18, No.1, Jun. 1975, pp. 333–340.

Kimbrell, Roy E. "State Machines Find the Pattern," Computer Design, vol. 24, No. 5, May 1985, pp. 163–169. (English).

Sellis, Timos K. "Multiple–Query Optimization," ACM Transactions on Database Systems, vol. 13, No. 1, Mar. 1988, pp. 23–52. (English).

Alsabbagh, J. R., et al. "A Framework for Multiple–Query Optimization," IEEE Second International Workshop on Research Issues on Data Engineering: Transaction Query Processing, Cat. No. 92TH0417 6, Feb. 3, 1992, pp. 157–162. (English).

Kang, Myong H., et al. "Algorithm Choice for Multiple–Query Evaluation," Parbase–90 International Conference on Databases, Parallel Architectures and Their Applications, Cat. No. 90CH2728–4, Mar. 9, 1990, p. 535. (English).

Hollaar, "Test Retrieval Computers," Computer, Mar. 1979.

FIG.3
TEXT "mountain"
CONVENTIONAL SEGMENTATION INTO
NEIGHBORING PLURAL-CHARACTER CONSTITUENT
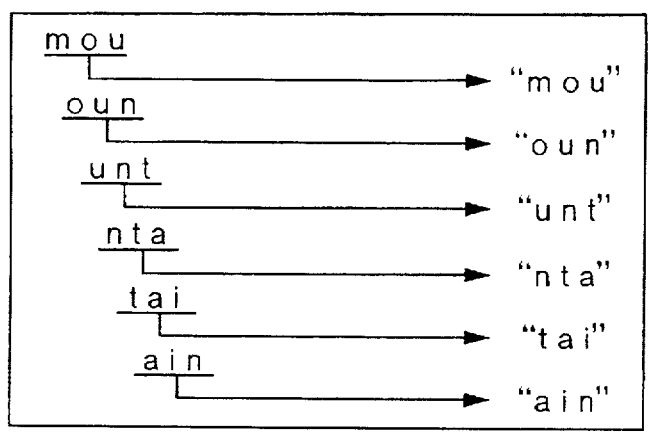
PRESENT SEGMENTATION INTO
NEIGHBORING PLURAL-CHARACTER
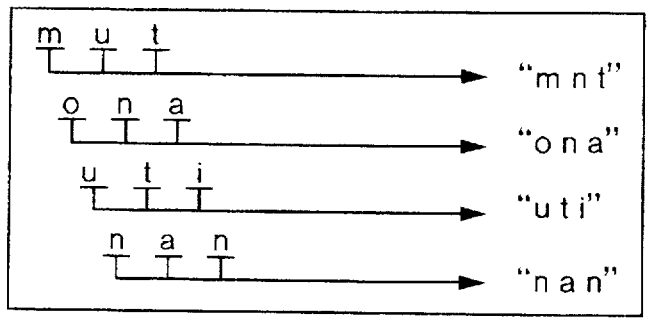

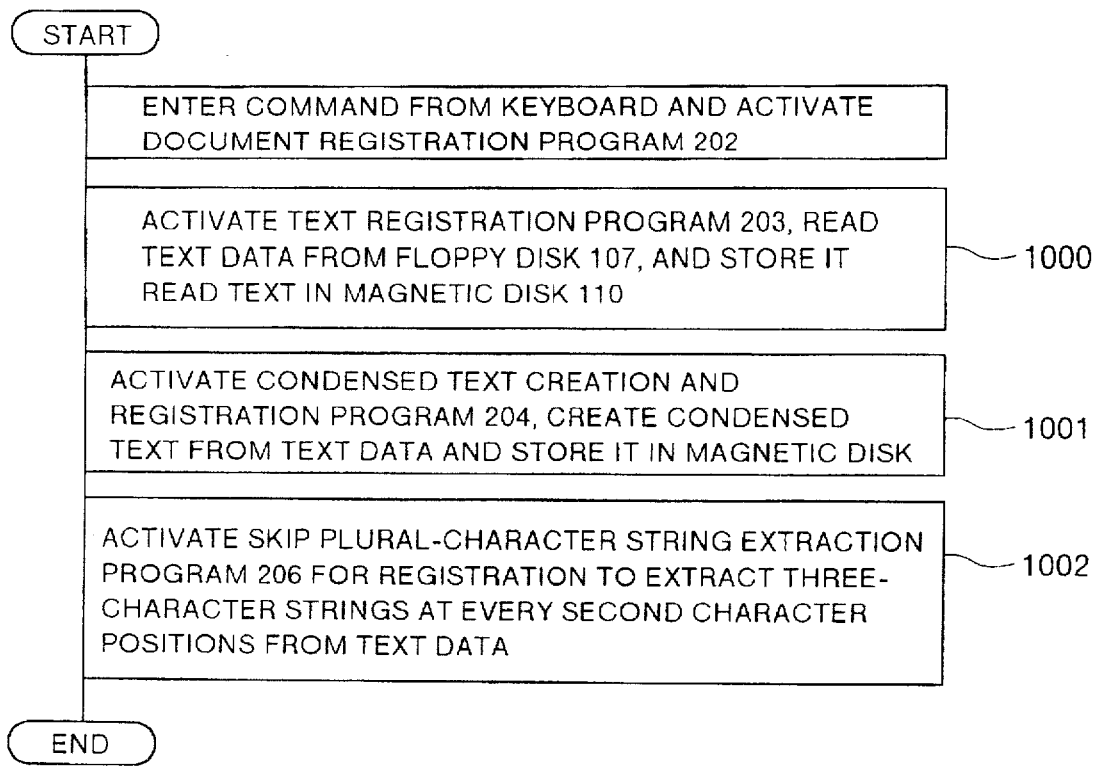
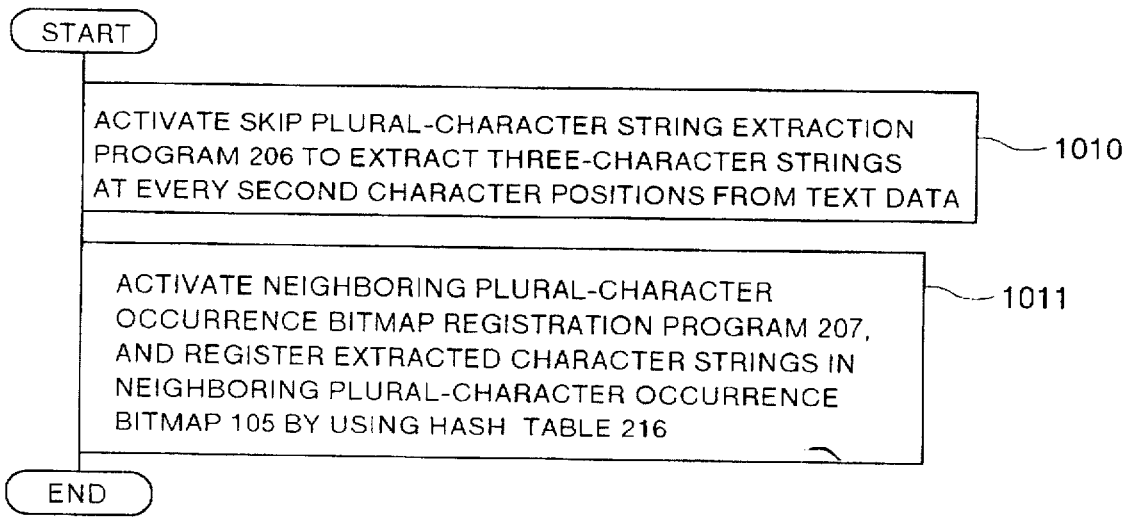

FIG.44

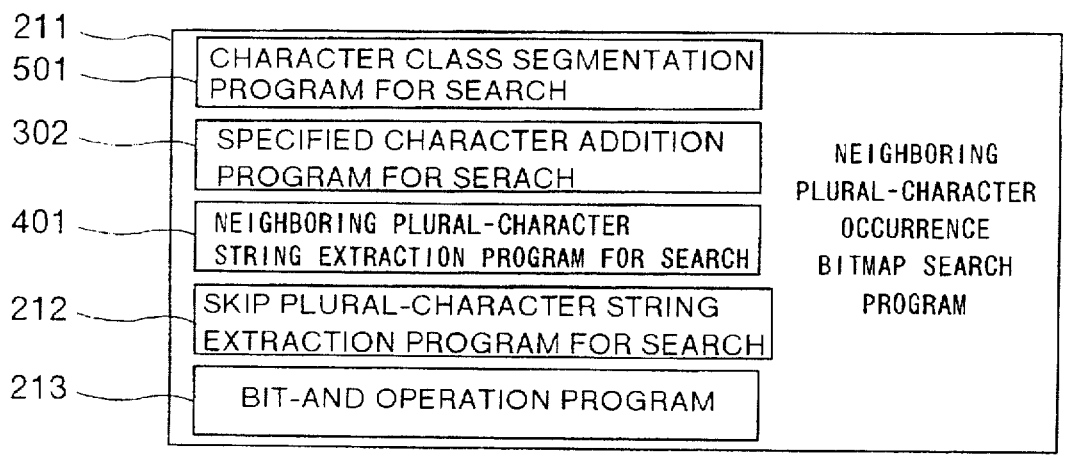

- 211, 501 — CHARACTER CLASS SEGMENTATION PROGRAM FOR SEARCH
- 302 — SPECIFIED CHARACTER ADDITION PROGRAM FOR SERACH
- 401 — NEIGHBORING PLURAL-CHARACTER STRING EXTRACTION PROGRAM FOR SEARCH
- 212 — SKIP PLURAL-CHARACTER STRING EXTRACTION PROGRAM FOR SEARCH
- 213 — BIT-AND OPERATION PROGRAM

NEIGHBORING PLURAL-CHARACTER OCCURRENCE BITMAP SEARCH PROGRAM

FIG.45

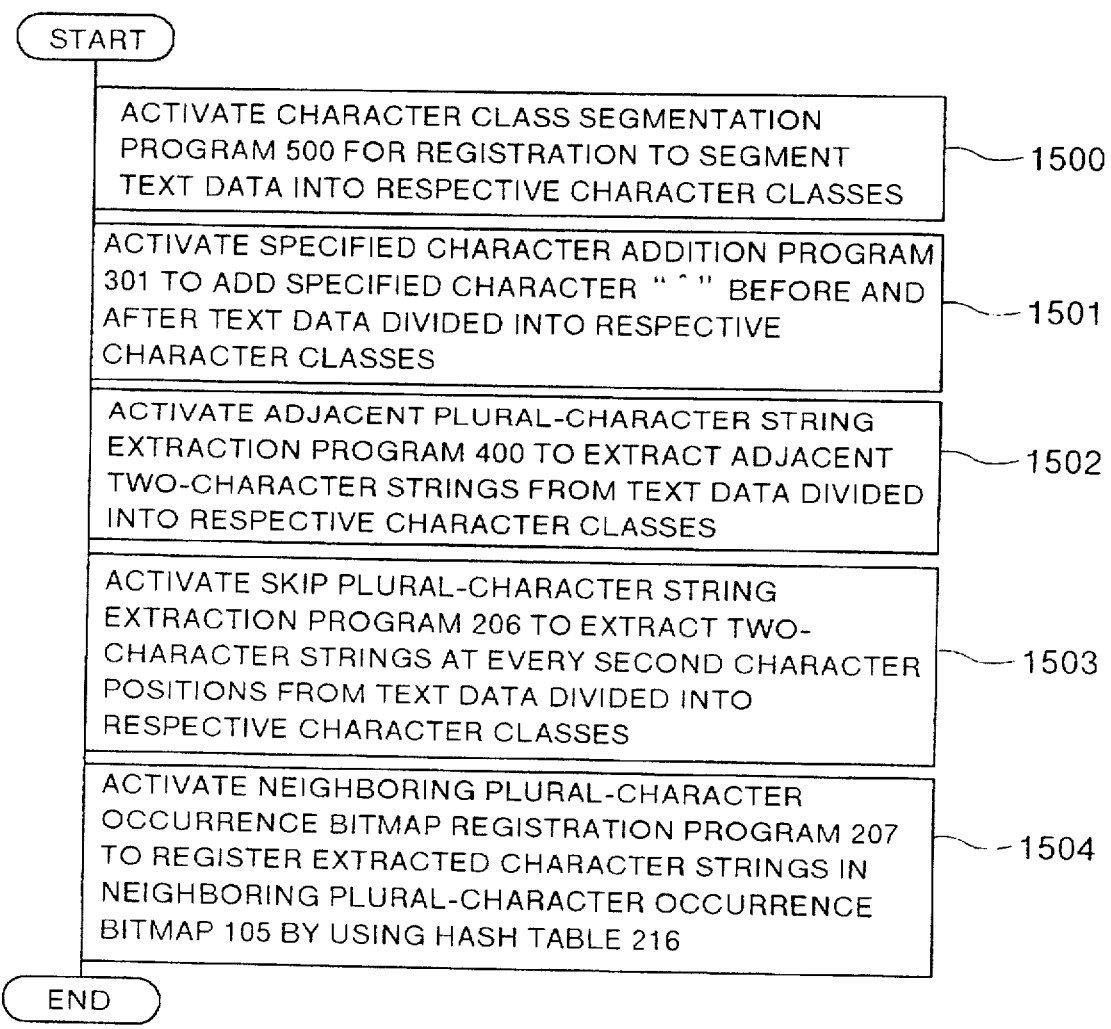

START

1500 — ACTIVATE CHARACTER CLASS SEGMENTATION PROGRAM 500 FOR REGISTRATION TO SEGMENT TEXT DATA INTO RESPECTIVE CHARACTER CLASSES

1501 — ACTIVATE SPECIFIED CHARACTER ADDITION PROGRAM 301 TO ADD SPECIFIED CHARACTER " ^ " BEFORE AND AFTER TEXT DATA DIVIDED INTO RESPECTIVE CHARACTER CLASSES

1502 — ACTIVATE ADJACENT PLURAL-CHARACTER STRING EXTRACTION PROGRAM 400 TO EXTRACT ADJACENT TWO-CHARACTER STRINGS FROM TEXT DATA DIVIDED INTO RESPECTIVE CHARACTER CLASSES

1503 — ACTIVATE SKIP PLURAL-CHARACTER STRING EXTRACTION PROGRAM 206 TO EXTRACT TWO-CHARACTER STRINGS AT EVERY SECOND CHARACTER POSITIONS FROM TEXT DATA DIVIDED INTO RESPECTIVE CHARACTER CLASSES

1504 — ACTIVATE NEIGHBORING PLURAL-CHARACTER OCCURRENCE BITMAP REGISTRATION PROGRAM 207 TO REGISTER EXTRACTED CHARACTER STRINGS IN NEIGHBORING PLURAL-CHARACTER OCCURRENCE BITMAP 105 BY USING HASH TABLE 216

END

DOCUMENT SEARCH METHOD WHEREIN STORED DOCUMENTS AND SEARCH QUERIES COMPRISE SEGMENTED TEXT DATA OF SPACED, NONCONSECUTIVE TEXT ELEMENTS AND WORDS SEGMENTED BY PREDETERMINED SYMBOLS

CROSS-REFERENCE TO RELATED APPLICATION

"This is a continuation-in-part of applications Ser. No. 08/120,285 filed on Sep. 13, 1993, now abandoned, and Ser. No. 08/031,625 filed on Mar. 15, 1993 now U.S. Pat. No. 5,471,610, which are continuation-in-part applications of Ser. No. 07/985,795 filed on Nov. 30, 1992 now U.S. Pat. No. 5,519,857, which was a continuation of Ser. No. 07/555,483 filed on Aug. 9, 1990 (PCT/JP90/00774; Filed Jun. 14, 1990) and now U.S. Pat. No. 5,168,533 issued Dec. 1, 1992."

This application relates to U.S. patent application Ser. No. 07/724,161 filed on Jul. 1, 1991 issued as U.S. Pat. No. 5,138,669 on Aug. 11, 1992 and U.S. patent application Ser. No. 07/733,982 filed on Jun. 14, 1990 issued as U.S. Pat. No. 5,140,644 on Aug. 18, 1992 and U.S. patent application Ser. No. 07/855,090 filed on Mar. 20, 1992, now abandoned, and U.S. patent application Ser. No. 07/914,334 filed on Jul. 17, 1992 issued as U.S. Pat. No. 5,220,625 on Jun. 15, 1993 and U.S. patent application Ser. No. 08/031,700 filed on Mar. 15, 1993, now U.S. Pat. No. 5,454,105, and all of above applications are continuation-in-part of U.S. patent application Ser. No. 07/555,483 filed on Aug. 9, 1990 issued as U.S. Pat. No. 5,168,533 on Dec. 1, 1992, and the contents of above all are incorporated herein by reference.

BACKGROUND OF THE INVENTION

1. Field of the Invention

The present invention relates to a document search method (full text search method) of searching a document having a designated character string at high speed from all sentences stored in a large scale document database, the document search method being applied to database, document management system, document filing system, desk top publishing system, and other systems.

The invention is applicable to any type of languages of documents stored in a document database. For example, the invention is applicable to either those languages such as the English language and the German language which are structured by phonetic symbols of a small number of characters and has words discriminated by spaces, or those languages such as the Japanese language, the Chinese language, and the Korean language which are not structured only by phonetic symbols and has words not discriminated by spaces.

2. Description of the Related Art

As a document search system not using index information, a full text search has been proposed by which a document is transformed into character codes and they are directly stored in a text database of a computer as text data, and when a search character string (hereinafter called a search term) is designated, the contents of all texts in the text database are read to search a document having the search term (refer to L. A. Hollar, "Text Retrieval Computers", COMPUTER, March, 1979).

This full text search is characterized in that text files of all documents in the text database are scanned one word after another from the top of the text files to check whether a designated search term is contained and to search a document containing the search term.

With this full text search, even if index files describing identifiers or the like of each document containing a search term are not used, a document can be searched by directly checking text files in the text database.

However, since the full text search scans all text files from the top thereof, it takes a long time to search a document and it is not practical to apply it to a large scale database.

The present applicant has proposed an information retrieval system in which reading text data and searching a search term is speeded up by using dedicated hardware, and prior to searching text files, auxiliary files storing compressed text data are searched in order to reduce the number of documents for which text files are searched later. In this manner, a high speed full text search can be realized equivalently.

A hierarchical pre-search which features this information retrieval system will be described.

The hierarchical pre-search is a process of equivalently speeding up a search time by hierarchically searching two information compressed auxiliary files including a character constituent bitmap and condensed texts prior to searching text files in order to discard documents not relevant to a search term and to reduce the number of documents for which text files are searched later.

Specifically, the character constituent bitmap is first searched in the unit of one character. Then, the condensed texts of the documents remained after the search of the character constituent bitmap are searched in the unit of word.

However, in searching the character constituent bitmap, this bitmap stores a registered text information in the unit of one character. Therefore, documents containing any character of a search term are all used as search candidates. For example, if a search term is "日の出", a document containing any one of the characters "日", "の", and "出" is hit by the character constituent bitmap.

Namely, a number of documents not containing "日の出" are outputted as the search results. These documents are called hereinafter "noises". In such a case, the number of documents for which the condensed text search is performed cannot be reduced so much. Therefore, it takes a time to search the condensed texts and a sufficient search response cannot be obtained.

In order to solve this problem, the present applicant has proposed a neighboring plural-character occurrence bitmap scheme in which a character constituent is made of a combination of a plurality of characters to obtain a higher reduction rate than using a single character (refer to U.S. application Ser. No. 07/843,162).

Specifically, information on whether a document contains a character string of a predetermined number of two or more characters is registered in an auxiliary file when the document is registered. In a search, prior to searching condensed documents, a search term is divided into character strings each having a predetermined number of characters, and a document containing all these character strings is extracted by referring to the auxiliary file to discard documents not required to be searched.

With this scheme, by using an auxiliary file including a neighboring plural-character occurrence bitmap and condensed texts in addition to text files, documents not relevant to an inputted search term can be discarded at high precision at a partial character string level.

For example, in searching a text database (Documents 1, 2, ..., N) shown in FIG. 2, search entries for a search term "イラン" are those indicated by arrows. In the case of a single character occurrence bitmap, since the documents 1 and 2 containing "ライオン", and "オンライン" contains "イ", "ラ", and "ン", they are searched by the single character occurrence bitmap although they do not contain a character string "イラン". These documents 1 and 2 become noises.

In contrast with this, in the case of a neighboring plural-character occurrence bitmap, a document containing both "イラ" and "ラン" is identified to be only the document N, and noises are not entered as in the case of the single character occurrence bitmap.

Use of such a neighboring plural-character occurrence bitmap allows documents such as the documents 1 and 2 containing any one character of a search term to be deleted from search candidates, and an excess condensed text search can be omitted more than the single character occurrence bitmap. It is therefore possible to equivalently realize a high speed full text search at a practical search response even for a large scale text database.

It is necessary to store all neighboring plural-character constituents. For example, in the case of a neighboring two-character occurrence bitmap, all combinations of two-character strings raised to the second power are required to be stored. With this scheme, however, a hashing method is used by which a presence\absence of a plurality of neighboring plural-character constituents is represented by one data (an area for storing this data is called an entry) based upon an occurrence frequency of a neighboring plural-character string in a text. In this manner, the capacity of the neighboring plural-character occurrence bitmap can be reduced and a search reduction rate can be prevented from being lowered.

The above-described search of the character occurrence bitmap is effective for the language such as the Japanese language having a number of characters, even if the bitmap stores two-character constituents. However, in the case of a language such as the English language having less characters and its phonetic symbols providing a meaning based upon its sequential order, there are a number of words containing the same neighboring plural-character string so that a search reduction rate becomes insufficient. In such a case, the number of documents for which a condensed text search is performed cannot be reduced by the pre-search, and a sufficient search response cannot be obtained.

Problems associated with searching a document constituted by phonetic symbols such as the English language by using the neighboring plural-character occurrence bitmap will be described in detail in the following.

(1) As compared to ideograms such as the Japanese language, phonetic symbols such as the English language have a very small number of characters and provide a meaning based upon a regularity of a combination of vowels and consonants. Therefore, there are a number of words having the same neighboring plural-character string, and noises are likely to be generated in a search of the neighboring plural-character occurrence bitmap. For example, for a neighboring three-character string of "ain" wherein three characters are positioned side by side (hereinafter called an adjacent plural-character string), all documents containing words such as "mountain", "painting", and "Spain" are hit and the search reduction rate of the neighboring plural-character occurrence bitmap is lowered.

The reason for this is that phonetic symbols such as the English language provide a meaning based upon a combination of consonants and vowels, and there are a number of words containing the same neighboring plural-character string, and the adjacent plural-character string has no sequential order of characters specific to each word.

(2) All neighboring plural-character constituents from the start to end of a sentence are stored according to conventional techniques.

Specifically, in the English language, a sentence is formed by separating each word by spaces, for example a sentence "There_is_a_girl_ ..." ("_" represents a space). In the case of a neighboring three-character occurrence bitmap, data of "e_i", "s_a", and "a_g" between words is also stored. These character constituents are not used by a search term and not necessary for a search. However, they are hashed in the same entries as those of important character constituents, and the search is adversely affected to thereby generate search noises. For example, if the "ain" and "a_g" are hashed in the same entry, all documents containing words having not only "ain" but also "a_girl", "a-group", and etc., are hit as noises during a search of the neighboring plural-character occurrence bitmap.

(3) If there is a document containing a word partially having a search term therein (hereinafter called a middle matching word), this document is hit during a search of the neighboring plural-character occurrence bitmap, although the document does not contain the search term. For example, assuming that "mist" is designated as a search term, a document containing all neighboring plural-character strings segmented from "mist", i.e., "mis" and "ist", for example, "chemistry", is hit during a search of the neighboring plural-character occurrence bitmap, although the document does not contain a word "mist".

Furthermore, the search results of the neighboring plural-character occurrence bitmap contains noises because of hashing. Since a plurality of neighboring plural-character strings are assigned to one entry of the neighboring plural-character occurrence bitmap, there is a possibility that when a neighboring plural-character string is designated and the associated entry is read, a document containing a different neighboring plural-character string may be obtained in accordance with the bit information in the entry. Therefore, in a large scale document search system registering a number of documents, documents not relevant to a search term cannot be discarded and a search reduction cannot be made properly, resulting in a lowered search performance. If all neighboring plural-character strings are assigned each entry to solve this problem, the capacity of the neighboring plural-character occurrence bitmap becomes very bulky and unpractical.

More specifically, there are about 8000 character codes of the Japanese language. Assuming that a combination of two-character strings is used, the number of two-character strings is 64 millions (8000 strings×8000 strings). Assuming that the number of registered documents is one million, document identification information of one million bits is required to be assigned to 64 millions of the neighboring plural-character strings. Therefore, the neighboring plural-character occurrence bitmap is required to have a capacity of 8 TBytes (64 millions×one billion bits). Assuming that the capacity of one document is 20 kB, the total capacity of one billion documents is 200 Bytes (20 kB per document×one million) which is far smaller than the capacity of the neighboring plural-character occurrence bitmap.

SUMMARY OF THE INVENTION

It is a principal object of the present invention, in searching a document constituted by phonetic symbols such as the English language, (1) to improve a search reduction rate of a neighboring plural-character occurrence bitmap in searching a document constituted by phonetic symbols having a small number of characters, (2) to prevent noises to be caused by segmenting a neighboring plural-character string between two words usually not contained in a search term, from a document when it is registered in a text database, and hashing it in the same entry as an important plural-character constituent, and (3) to prevent a document having a middle matching word from being hit.

It is another object of the present invention to realize a neighboring plural-character occurrence bitmap having less noises even if and when a word constituted by phonetic symbols such as English characters is designated as a search term, and to realize a neighboring plural-character occurrence bitmap for a large scale document database capable of suppressing search noises to be caused by hashing.

A first issue of the invention can be solved by incorporating the following constitution.

A document search method includes the steps of: extracting partial character strings in a predetermined format from documents stored in advance; forming a neighboring plural-character occurrence bitmap indicating whether each partial character string is contained in each document; extracting search partial character strings in a predetermined format from a search term entered for searching a desired document from the stored documents; and referring to the neighboring plural-character occurrence bitmap at entries corresponding to the extracted search partial character strings and obtaining a document containing a partial character string coincident with the extracted search partial character strings constituting the search term, and discarding documents not relevant to the search term without searching, wherein the partial character string is extracted from each document as a character string of predetermined n characters (n is an integer of 2 or larger) at every (m+1)-th character positions (m is an integer of 1 or larger), and the search partial character string is extracted from the search term as a character string of predetermined n characters (n is an integer of 2 or larger) at every (m+1)-th character positions (m is an integer of 1 or larger).

A second issue of the invention can be solved by incorporating the following constitution.

A document search method wherein a neighboring plural-character occurrence bitmap includes a bit list and a document number list, the bit list storing appearance information of a neighboring plural-character string by setting "1" at a bit position corresponding to a document number containing a neighboring plural-character string having an appearance frequency higher than a predetermined threshold value, and the document number list for a neighboring plural-character string having an appearance frequency lower than a predetermined threshold value, storing a document number containing a neighboring plural-character string having an appearance frequency lower than the predetermined threshold value, in the form of binary data list, includes the steps of: calculating in advance the type of each neighboring plural-character constituent appearing in each document and the number of documents in which each neighboring plural-character constituent appears; judging from the calculated results whether the number of occurrence documents in which texts each neighboring plural-character string appears is larger than the threshold value; registering, if it is judged that the number of occurrence documents is larger than a predetermined threshold value, appearance information of each neighboring plural-character constituent by setting "1" at a bit position of the bit list corresponding to a document number in which the associated neighboring plural-character string appears; registering, if it is judged that the number of occurrence documents is smaller than the predetermined threshold value, appearance information of each neighboring plural-character constituent by writing a binary data list of a document number in which the associated neighboring plural-character string appears, in the document number list; and reading the bit list corresponding to a neighboring plural-character string extracted from a search term from the neighboring plural-character occurrence bitmap or reading the document number list corresponding to a neighboring plural-character string extracted from a search term from the neighboring plural-character occurrence bitmap and converting the document number list into the bit list.

The operation of the document search method of the first issue will be described.

In the document search method, at a skip plural-character string extraction step of the neighboring plural-character occurrence bitmap creation and registration process, n-character strings at every (m+1)-th character positions are extracted from text data, and appearance information of each n-character string is registered in the neighboring plural-character occurrence bitmap. Similarly, in a search process of the neighboring plural-character occurrence bitmap, n-character strings at every m(+1)-th character positions are extracted from a search term to search the neighboring plural-character occurrence bitmap. Accordingly, even in the case of a language such as the English language having a number of words containing the same partial character string, a neighboring plural-character string specific to each word can be extracted so that a search reduction rate of searching the neighboring plural-character occurrence bitmap can be improved.

For example, according to a conventional method of searching an adjacent plural-character bitmap by using an adjacent plural-character constituent, if a character string "mountain" is designated as a search term, the extracted adjacent plural-character constituents are "mou", "oun", "unt", "nta", "tai", and "ain" as shown in FIG. 3. However, for example, "ain" is contained in words such as "p ainting" and "Spain". Therefore, documents containing these words are hit as noise documents. In contrast with this, for example, if a neighboring plural-character string is extracted at every second character positions, it is possible to extract neighboring plural-character constituents specific to a word, such as constituents "mut", "ona", "uti", and "nan". Accordingly, retrieval noises of hitting words containing the same partial character string can be considerably reduced as compared to a conventional method.

Next, the operation of the document search method of the second issue will be described.

In the document search method, at a character occurrence frequency calculation step, the type of a neighboring plural-character constituent appeared in text data and the number of documents in which each neighboring plural-character constituent appears are calculated in advance when documents are registered.

When the neighboring plural-character occurrence bitmap is created, at a character appearance frequency judgement step, it is judged from the results at the character appearance frequency calculation step whether the number of occurrence documents in which texts each neighboring plural-character string appears, is larger than a predetermined threshold value.

If the occurrence document number is larger than the predetermined threshold value, at a bit list registration step, appearance information of each neighboring plural-character constituent is registered by setting "1" at a bit position of the bit list corresponding to a document number in which the associated neighboring plural-character string appears.

If the number of occurrence documents is smaller than the predetermined threshold value, at a document number registration step, appearance information of each neighboring plural-character constituent is registered by writing a binary data list of a document number in which the associated neighboring plural-character string appears, in the document number list.

In a search operation, at a neighboring plural-character string acquisition step, a bit list corresponding to a neighboring plural-character string extracted from a search term is read from the neighboring plural-character occurrence bitmap or the document number list corresponding to a neighboring plural-character string extracted from a search term is read from the neighboring plural-character occurrence bitmap and the read document number list is converted into a bit list.

According to the document search method of the second issue of this invention, the neighboring plural-character occurrence bitmap stores a neighboring plural-character string of a high appearance frequency in the bit list, and a neighboring plural-character string of a low appearance frequency in the document number list. It is therefore possible to considerably reduce the file capacity of the neighboring plural-character occurrence bitmap. Specifically, if the neighboring plural-character occurrence bitmap is constituted by a bit list form, bits corresponding in number to the capacity of all documents stored in a database are required. However, if the neighboring plural-character occurrence bitmap is constituted by a document number list form, bits corresponding in number to the number of bits representing a document number multiplied by the number of registered documents are required. For example, it is assumed that the total number of documents stored in a database is one million, 32 bits are assigned to represents one document number, and there are ten documents containing a certain neighboring plural-character constituent. In such a case, a storage area of one million bits=125 Kbytes is required for the bit list form, whereas a storage area of 32 bits×10 documents=320 bits=40 bytes is required for the document number list form.

Assuming that there are 900 thousand documents containing a certain neighboring plural-character constituent among one million documents, a storage area of one million bits=125 Kbytes is required for the bit list form, whereas a storage area of 32 bits×900 thousands documents=4 bytes× 900 thousands documents=3.6 Mbytes is required for the document number list form.

Therefore, if one million documents are to be stored and each document identifier uses 32 bits, a threshold value of the number of documents is set to one million bits divided by 32 bits, i.e., 31,250 documents. If the number of stored document is larger than this threshold value, the bit list form is utilized, whereas if smaller, the document number form is utilized, respectively in order to create the neighboring plural-character occurrence bitmap. In this manner, a file capacity of the bit-and operation program can be reduced.

In the document search method of the second issue of the invention, the search results of the neighboring plural-character occurrence bitmap do not contain noises to be caused by hashing. As a result, the search results obtained by a logical product (AND) operation between bits between searched bit lists reduce noises considerably as compared to conventional hashing and searching, and improve a search reduction rate.

BRIEF DESCRIPTION OF THE DRAWINGS

FIG. 3 is a diagram illustrating the operation of a first document search method.

FIG. 4 is a problem analysis diagram (PAD) illustrating a document registration procedure according to the first embodiment of the invention.

FIG. 5 is a PAD illustrating the procedure of a neighboring plural-character occurrence bitmap creation and registration program according to the first embodiment of the invention.

FIG. 44 is a diagram showing the structure of a neighboring plural-character occurrence bitmap search program according to the seventh embodiment of the invention.

FIG. 45 is a PAD illustrating the procedure of the neighboring plural-character occurrence bitmap creation and registration program according to the seventh embodiment of the invention.

DESCRIPTION OF THE PREFERRED EMBODIMENTS

Figure 1:
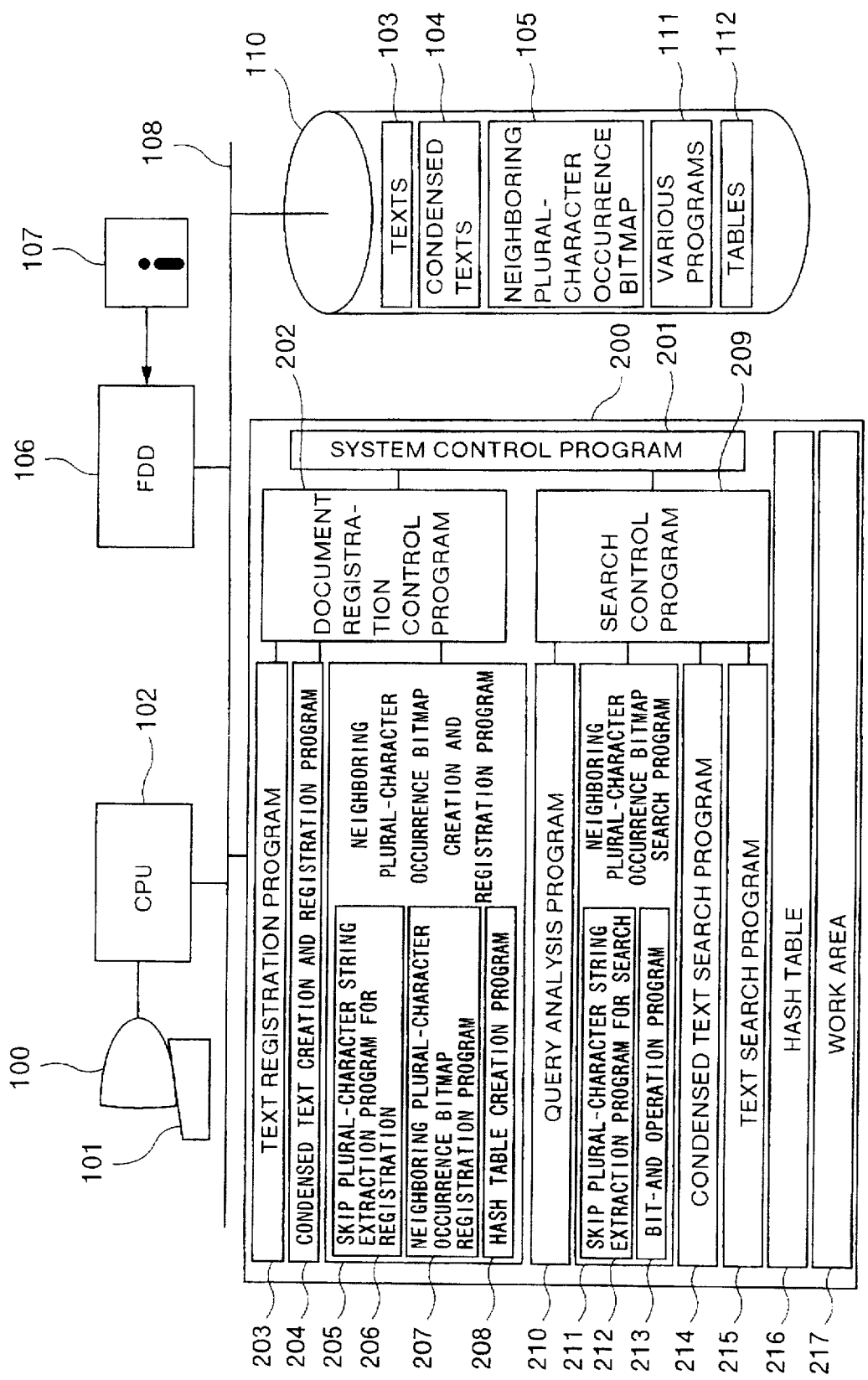
FIG. 1 is a diagram showing the structure of a first embodiment of the invention.
Figure 2:
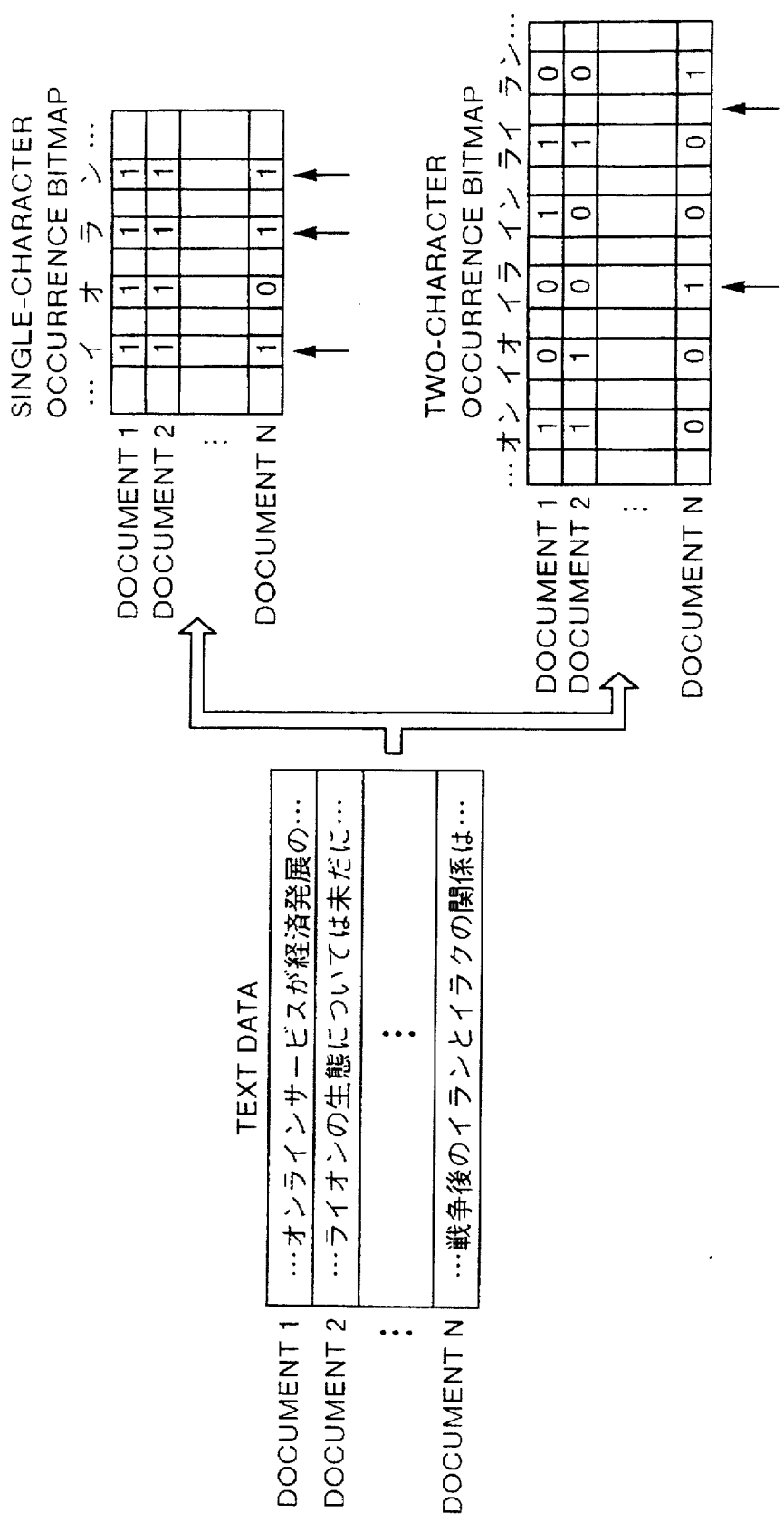
FIG. 2 is a schematic diagram illustrating a conventional system.

The first embodiment of the invention will first be described with reference to FIG. 1.

In this embodiment, a skip plural-character occurrence bitmap for extracting a character string of n characters at every (m+1)-th character positions of an English sentence is used by way of example, where m=1 and n=3.

The document retrieval system of the invention is constituted by a display 100, a keyboard 101, a central processing unit (CPU) 102, a magnetic disk 110, a floppy disk drive (FDD) 106, and a main memory 200. These constituents are interconnected by a bus 108. The magnetic disk 110 stores therein texts 103, condensed texts 104, a neighboring plural-character occurrence bitmap 105, and various programs 111 and tables 112 to be described later. Reference numeral 107 represents a floppy disk storing a document to be registered.

Read from the magnetic disk 110 and stored in the main memory 200 area are a system control program 201, a document registration control program 202, a text registration program 203, a condensed text creation and registration program 204, a neighboring plural-character occurrence bitmap creation and registration program 205, a search control program 209, a query analysis program 210, a neighboring plural-character occurrence bitmap search program 211, a condensed text search program 214, a text search program 215, and a hash table 216. A work area 217 is reserved in the main memory 200.

The neighboring plural-character occurrence bitmap creation and registration program 205 is constituted by a condensed text creation and registration program 206 for registration, a neighboring plural-character occurrence bitmap registration program 207, and a hash table creation program 208. The neighboring plural-character occurrence bitmap search program 211 is constituted by a skip plural-character string extraction program 212 for search and a bit-and operation program 212. These programs are executed under the control of the system control program 201 in response to a user instruction from the keyboard 101.

In the following, a registration process and a search process for a hierarchical pre-search including search of the neighboring plural-character occurrence bitmap according to the invention will be described.

In registering a document, in response to a command entered from the keyboard 101, the system control program 201 starts the document registration control program 202. The document registration control program 202 activates the text registration program 203 at Step 1000 which in turn reads text data of a registration document from the floppy disk 107 loaded in the floppy disk drive 106, writes the text data in the work area 217, and stores the text data in the magnetic disk 110 as a text 103. A document may be registered from devices other than floppy disks, such as communication lines (not shown in FIG. 1).

Next, the document registration control program 202 activates the condensed text creation and registration program 204 at Step 1001 which in turn segments the text data into partial character strings at a word level by using spaces and symbols as separators, checks an inclusion relationship between segmented partial character strings to discard partial character strings included in other partial character strings, stores the remaining partial character strings in the magnetic disk 110 as a condensed text 104. When this program is completed, the registration process is terminated.

Lastly, the document registration control program 202 activates the neighboring plural-character occurrence bitmap creation and registration program 205 at Step 1002.

The process to be executed by the neighboring plural-character occurrence bitmap creation and registration program 205 will be described with reference to FIG. 5.

The neighboring plural-character occurrence bitmap creation and registration program 205 activates the skip plural-character string extraction program 206 for registration at Step 1010 which in turn reads the text data of the text 103 stored in the magnetic disk 110, stores the text data in the work area 217, and extracts all character strings of three characters from the text data at every second character positions.

Next, at Step 1011, the neighboring plural-character-occurrence bitmap registration program 207 is activated, and the skip plural-character string extraction program 206 for registration registers the character strings extracted from the text data into the neighboring plural-character occurrence bitmap 105 of the work area 217 in accordance with the hash table 216, and stores the results in the magnetic disk 110.

When a new neighboring plural-character occurrence bitmap 105 is registered, the neighboring plural-character occurrence bitmap registration program 207 activates the hash table creation program 208 which in turn creates a hash table 216 to be used for the reference to an associated entry of the neighboring plural-character occurrence bitmap 105 and initializes ("0" clear) all entries of the neighboring plural-character occurrence bitmap 105.

The hash table 216 created by the hash table creation program 208 is used when an entry of the neighboring plural-character occurrence bitmap 105 is referred to by using a neighboring plural-character constituent. The hash table 216 may use a simple hash function or a hash scheme using an occurrence frequency of a neighboring plural-character constituent in the previously described document database.

The contents of processes executed by the neighboring plural-character occurrence bitmap creation and registration program have been described above.

In a search operation, when a query is entered from the keyboard 101, the system control program 201 activates the search control program 209. Sequentially activated under the control of the search control program 209 are the query analysis program 210, neighboring plural-character occurrence bitmap search program 211, condensed text search program 214, and text search program 215.

Figure 6:
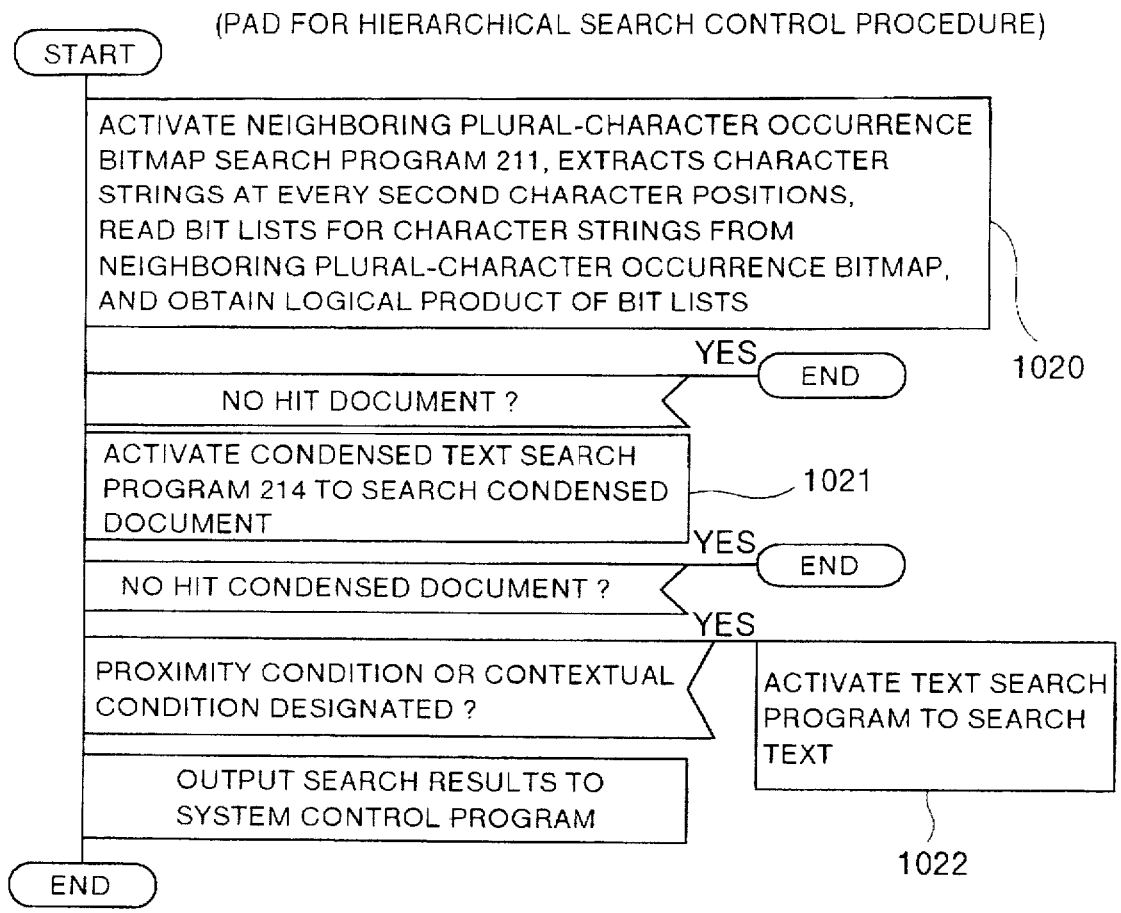
FIG. 6 is a PAD illustrating the control procedure of hierarchical search.

The hierarchical search process to be executed by the neighboring plural-character occurrence bitmap search program 211, condensed text search program 214, and text search program 215 will be detailed with reference to FIG. 6.

The search control program 209 activates the neighboring plural-character occurrence bitmap search program 211 at Step 1020 which in turn activates the skip plural-character string extraction program 212 for search. This program 212 extracts character strings of three characters from a search term of an inputted query condition at every second character positions.

Next, the bit-and operation program 213 is activated, and the skip plural-character string extraction program 212 for search reads a bit list stored in an entry of the neighboring plural-character occurrence bitmap corresponding to each extracted character string, by using the hash table 216, and stores the bit list in the work area 217. After bit lists stored in entries of the neighboring plural-character occurrence bitmap corresponding to all extracted character strings are read by using the hash table 216 and stored in the work area 217, the bit-and operation program 213 is activated to obtain logical products (AND) of bits between all bit lists stored in the work area 217. Document numbers having a bit "1" as the logical product operation results are passed to the search control program 209 as the results of a search of the neighboring plural-character occurrence bitmap. If no document is searched by the neighboring plural-character occurrence bitmap, the search results of a null document are displayed on the display by this program 209.

If any document is searched by the neighboring plural-character occurrence bitmap, the search control program 209 executes at Step 1021 the condensed text creation and registration program 214. Condensed texts corresponding to the document numbers outputted by the neighboring plural-character occurrence bitmap search program 211 are stored in the work area 217.

The condensed text creation and registration program 214 searches the stored condensed texts 104 and passes document numbers of condensed texts containing the search term to the search control program 209.

If no condensed text is searched by the condensed text search, the search results of a null condensed text are passed to the system control program 201 and the search process is terminated.

If a query condition designates only a single search term or only a logical relation (AND operation or OR operation) between a plurality of search terms and if a positional relation in a text is not designated, the search is terminated and the search results of document numbers outputted from the condensed text creation and registration program 214 are passed to the system control program 201.

In the other case, i.e., if a given query condition does not designate a positional relation in a text between a plurality of search terms, the text search program 2125 is activated at Step 1022 for the execution of a text search.

If a single search term is designated or an AND or OR operation is simply designated, the search can be terminated at the condensed text search. This reason is as follows. As seen from the formation algorithm of the condensed text 104, all words in texts 103 are extracted completely so that if condensed texts 104 are searched, it can be judged whether a designated word exists in the text data.

Consider for example an AND operation of ["information"<AND> "systems"] meaning that [search a document containing both "information" and "system"] or an OR operation of ["information"<OR> "systems"] meaning that [search a document containing either "information" or "systems"]. The AND or OR operation only designates a logical relation between a plurality of search terms, and does not designate the positional relation in a text. Therefore, it is sufficient if a presence of "information" and "systems" is checked, so that if the condensed text search is performed, it is possible to judge whether the query condition is satisfied or not.

In contrast with this, a contextual condition, a proximity condition, an adjacency condition, and the like designate a position relation of a plurality of search terms in a text. Therefore, it is not possible to judge from the condensed text search which does not provide occurrence position information of a word. An example of the contextual condition is ["information" <S> "systems"] meaning that [search a document having a co-occurrence (appear at the same time) of both "information" and "systems" in the same sentence]. An example of the proximity condition is ["information" <2W> "systems"] meaning that [search a document having "information" and "systems" in proximity within two words]. An example of the adjacent condition is ["information"<A> "systems"] meaning that [search a document having "information" and "systems" at adjacent positions].

If any condensed text is searched by the condensed text search and one of the contextual condition, proximity condition, and adjacency condition is designated, the text search program 215 is activated which in turn reads text data of the text 103 corresponding to the document number outputted from the condensed text search program 214 and writes it in the work area 217. The text search program 215 searches and extracts text data containing the search terms and satisfying the designated condition regarding the position relation between the search terms, and passes a document number of the extracted text data to the search control program 209 as the search results.

The foregoing description gives the outline of the full text search system of the first embodiment to which the full text search method of the invention was applied.

Figure 7:
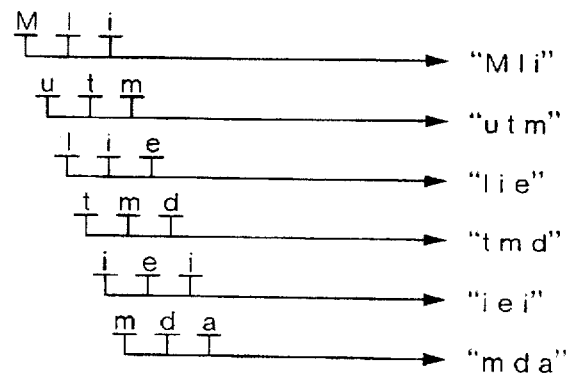
FIG. 7 is a diagram illustrating a method of extracting a neighboring plural-character constituent according to the first embodiment of the invention.

The registration procedure of a neighboring plural-character occurrence bitmap of this embodiment is illustrated in FIG. 7. The registration procedure will be detailed hereinunder.

First, the details of the processes of registering the neighboring plural-character occurrence bitmap will be given. As described earlier, the neighboring plural-character occurrence bitmap creation and registration program 205 activates the skip plural-character string extraction program 206 for registration.

As this program 206 is executed, text data of each of texts 103 stored in the magnetic disk 110 is read and stored in the work area 217. Character strings of three characters at every second character positions of the text data are extracted from the text data.

Next, the neighboring plural-character occurrence bitmap registration program 27 is activated. An entry of each neighboring plural-character constituent of the text data extracted by the skip plural-character string extraction program 206 for registration is calculated by using the hash table 216, and "1" is set at the corresponding bit position to indicate a presence of the neighboring plural-character constituent.

In the process of the skip plural-character string extraction program 206 for registration, for example as shown in FIG. 7, "Mil", "utm", "lie" "tmd", "iei", and "mda" are extracted from text data "Multimedia" as neighboring plural-character constituents of three characters at every second character positions.

Figure 8:
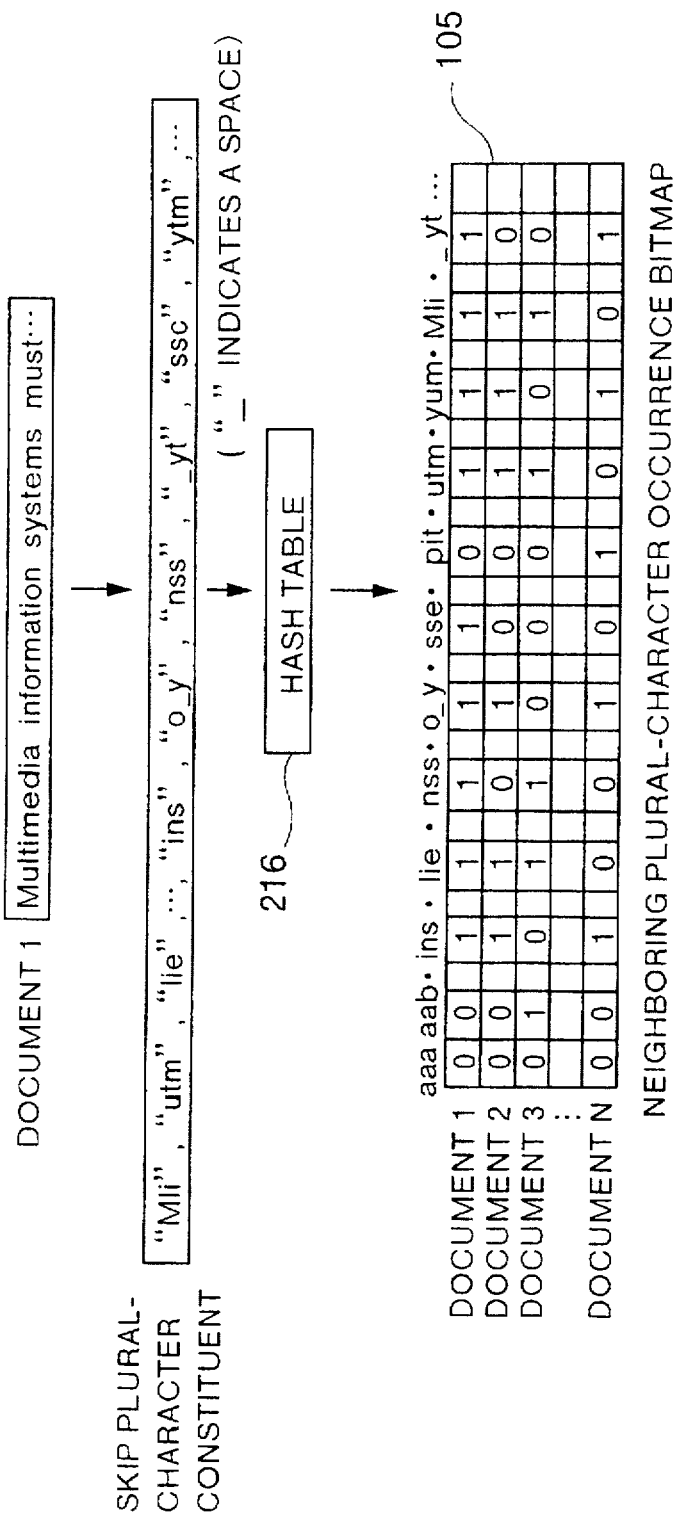
FIG. 8 is a diagram illustrating a method of forming a neighboring plural-character occurrence bitmap according to the first embodiment of the invention.

For each neighboring plural-character constituent, "1" is set at a corresponding bit position of an entry of the neighboring plural-character occurrence bitmap 105, the entry being identified by the hash table 216. In an example shown in FIG. 8, a document 1 has "Mli". Therefore, "1" is set at a bit position of an entry of the neighboring plural-character occurrence bitmap 105, the bit position corresponding to the document 1 and the entry being identified by the hash table 216. "1" is set at a corresponding entry also for "sse". Similarly, "1" is set at corresponding entries of the neighboring plural-character occurrence bitmap 105 for all neighboring plural-character constituents extracted from the text data. As shown, trains (bit lists) of "1" and "0" are finally completed for all registration documents. For example, a column of "nss" of [1 0 1, . . . , 0] is one bit list.

In the above manner, the neighboring plural-character occurrence bitmap creation and registration program 205 forms the neighboring plural-character occurrence bitmap 105 when documents are registered for the preparation of a hierarchical pre-search.

Figure 9:
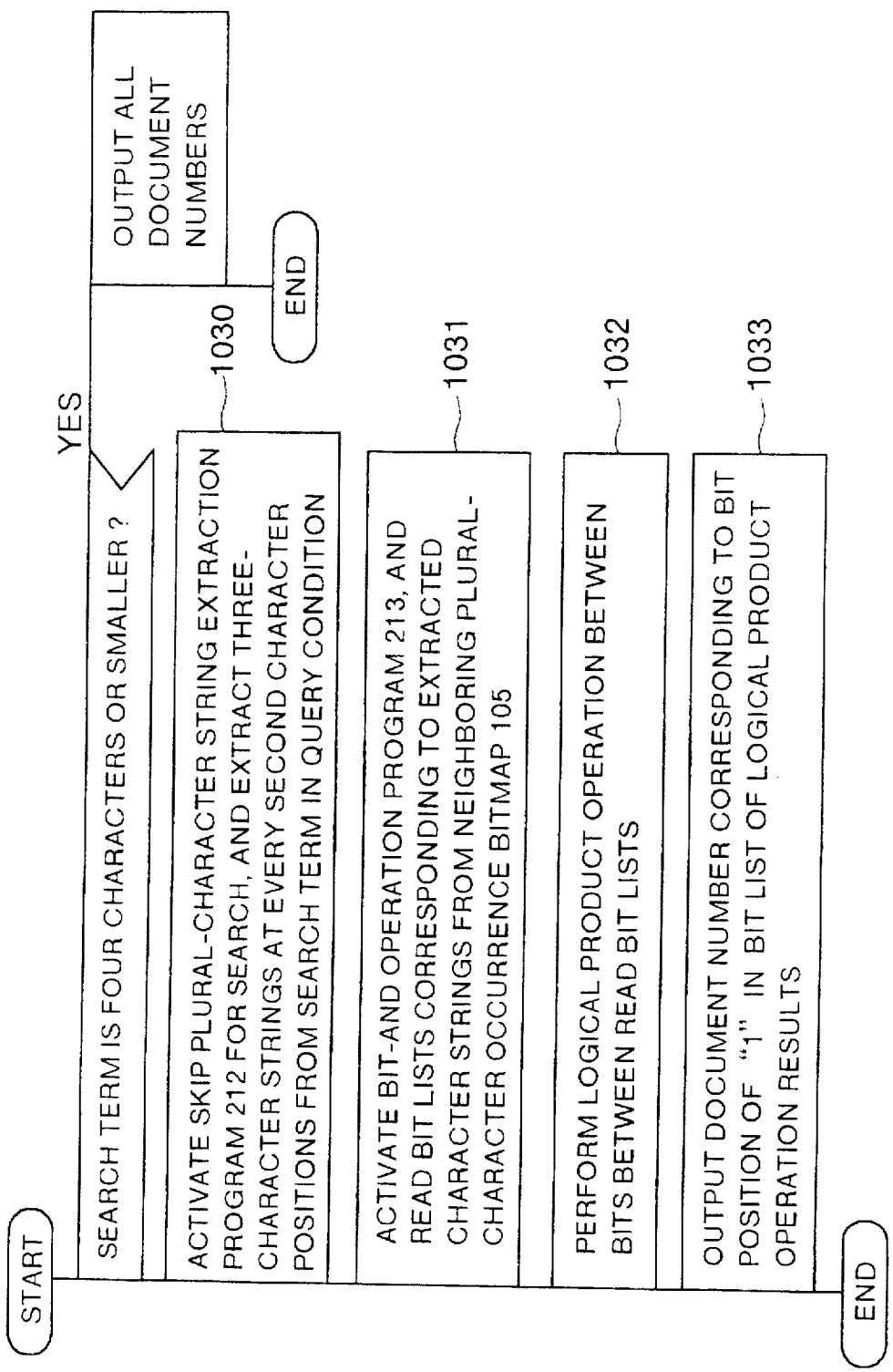
FIG. 9 ia a PAD illustrating a method of searching the neighboring plural-character occurrence bitmap according to the first embodiment of the invention.

Next, the details of the procedure of searching the neighboring plural-character occurrence bitmap will be detailed with reference to FIG. 9.

The search control program 209 activates at Step 1030 the skip plural-character string extraction program 212 for search. In this embodiment, three-character strings are extracted from a search term of a query condition at every second character positions. Since the neighboring plural-character occurrence bitmap uses a three-character string extracted at every second character positions, a neighboring plural-character constituent cannot be extracted from a search term having 4 characters or less. In this embodiment, therefore, the search results of the neighboring plural-character occurrence bitmap are assumed that all documents are hit, and the condensed text search is performed for all documents. After the document number is outputted, the neighboring plural-character occurrence bitmap search program 211 is terminated.

If a search term having five characters or more is given, the bit-and operation program 213 reads at Step 1031 bit lists for the character strings extracted by the skip plural-character string extraction program 212 for search, from the neighboring plural-character occurrence bitmap 105 by using the hash table 216, and stores them in the work area 217. At Step 1032, a logical product operation is performed between bits between the read bit lists. At Step 1033, a document number having the logical product operation results of "1" is outputted as the search results of the neighboring plural-character occurrence bitmap.

Figure 10:
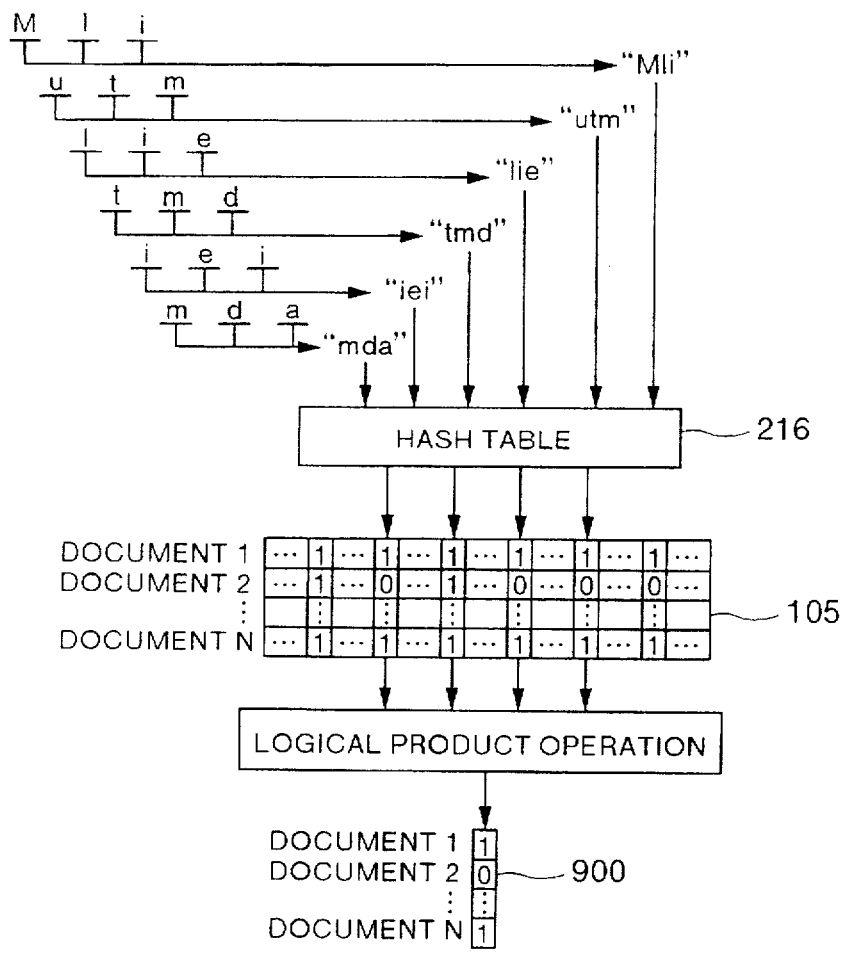
FIG. 10 is a diagram illustrating a method of searching the neighboring plural-character occurrence bitmap according to the first embodiment of the invention.

For example, as shown in FIG. 10, if a character string "Multimedia" is given as a search term, bit lists of the neighboring plural-character occurrence bitmap 105 corresponding to "Mli", "utm", "lie", "tmd", "iei", and "mda" are read by using the hash table 216. A document having all "1" between these bit lists is obtained as the search results of the neighboring plural-character occurrence bitmap.

Specifically, a logical product operation is performed between bits between all read bit lists to obtain the bit-and calculation results 900. A document number corresponding to a bit "1" of the bit-and calculation results indicates a hit document as the search results of the neighboring plural-character occurrence bitmap.

In the above manner, a document containing all of "Mli", "utm", "lie", "tmd", "iei", and "mda" is extracted. In the example shown in FIG. 10, documents 1 and N are hit.

As above, in the process of the neighboring plural-character occurrence bitmap creation and registration, three-character strings extracted at every second character positions from text data are obtained when a document is registered. Information of whether each neighboring plural-character constituent is present is registered in the neighboring plural-character occurrence bitmap, so that each neighboring plural-character constituent specific to a word can be checked. It is therefore possible to improve a search reduction rate during the search of the neighboring plural-character occurrence bitmap. Since the search amount of condensed texts during the hierarchical pre-search is reduced, the total search speed can be equivalently shortened. It is therefore possible to perform a full text search of large volume in real time.

In this embodiment, the neighboring plural-character occurrence bitmap is formed by using all character strings including spaces (_), periods (.), and comma (,) without paying attention only to words. Therefore, even if a character string containing spaces such as "Multimedia information systems" is used as a search term, a search reduction rate can be improved by using neighboring plural-character constituents extracted between words.

In the above embodiment, three-character strings extracted at every second character positions are used for forming the neighboring plural-character occurrence bitmap. Two-character or four-character or more strings extracted at every x-th (x=any integer) character positions may also be used, as apparent from the foregoing description.

In the above embodiment, if a search term having four characters or less, all documents are hit as the search results of the neighboring plural-character occurrence bitmap. A neighboring plural-character occurrence bitmap may be formed for two-character strings extracted at every second character positions so that a search term having four characters or less can be used for searching the neighboring plural-character occurrence bitmap.

As above, in searching the neighboring plural-character occurrence bitmap of this embodiment, retrieval noises can be reduced considerably as compared to conventional techniques, with a small difference between the search results of the neighboring plural-character occurrence bitmap and the search results of condensed texts and original texts. Therefore, the search results of the neighboring plural-character occurrence bitmap may be outputted to the system control program as the final search results of the system.

Next, the second embodiment of the invention will be described.

In the first embodiment of the invention, the neighboring plural-character occurrence bitmap is formed by using all character strings including spaces (_), periods (.), and comma (,) without paying attention only to words. With this arrangement, skip plural-character strings between words are registered in the neighboring plural-character occurrence bitmap. As a result, the following two types of noises are generated if a search is performed by designating a word.

The first noise is generated if a skip plural-character string between words is hashed to the same entry of another neighboring plural-character constituent. For example, if "angle" is used as a search term, "age" is extracted as a skip plural-character string. In this case, if a skip plural-character string "aif" riding over a space (_) of "Multimedia in formation systems" is hashed to the same entry as "age", a document containing "Multimedia information systems" is hit as a noise document.

The second noise is generated when a document is hit which has the same skip plural-character constituent extracted from a search term between words of the document. Specifically, if a document containing character strings ". . . a green cup . . . " is registered, a skip plural-character string "age" riding over a space (_) is registered in the neighboring plural-character occurrence bitmap. In this case, if "angle" is designated as a search term, a skip plural-character string "age" is extracted from the search term and the document is hit as a noise document.

To remove these noises, in the second embodiment of the invention, when a neighboring plural-character constituent is extracted, a text is segmented into words, and skip plural-character constituents are extracted from these segmented words to form a neighboring plural-character occurrence bitmap. In this manner, neighboring plural-character constituents between words are not extracted.

Figure 11:
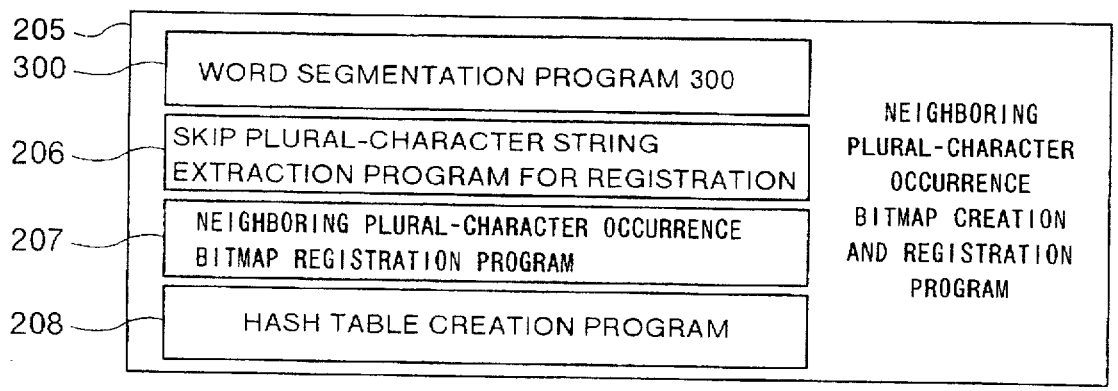
FIG. 11 is a diagram showing the structure of the neighboring plural-character occurrence bitmap creation and registration program according to a second embodiment of the invention.
Figure 12:
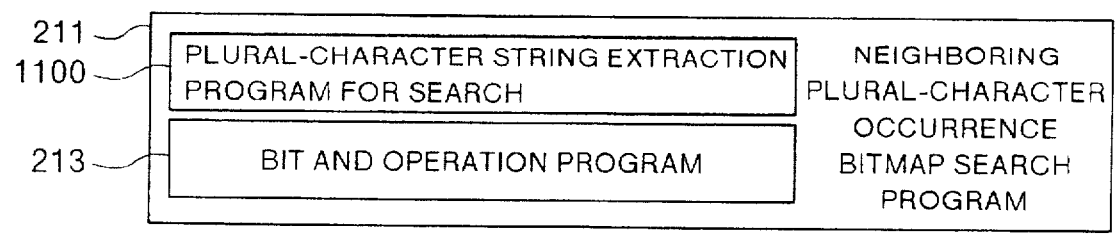
FIG. 12 is a diagram showing the structure of a neighboring plural-character occurrence bitmap search program according to the second embodiment of the invention.

The second embodiment is structured fundamentally in the same manner as the first embodiment, excepting that the neighboring plural-character occurrence bitmap creation and registration program 205 is configured as shown in FIG. 11 and the neighboring plural-character occurrence bitmap search program 211 is configured as shown in FIG. 12.

Specifically, the neighboring plural-character occurrence bitmap creation and registration program 205 is constituted by a word segmentation program 300, skip plural-character string extraction program 206 for registration, neighboring plural-character occurrence bitmap registration program 207, and hash table formation program 208. The neighboring plural-character occurrence bitmap search program 1100 is constituted by a skip plural-character string extraction program 212 for search and a bit-and operation program 213.

A three-character string cannot be extracted from a word having two characters or less such as "SE". In this case, a specified character such as "|" is added after the word to extract a three-character string (not shown).

The neighboring plural-character occurrence bitmap registration program 207 is activated lastly. The skip plural-character string extraction program 206 for registration sets "1" to an entry corresponding to a neighboring plural-character constituent extracted from a word in a text 103, by using the hash table 216, to thereby indicate a presence of the neighboring plural-character constituent.

Figure 13:
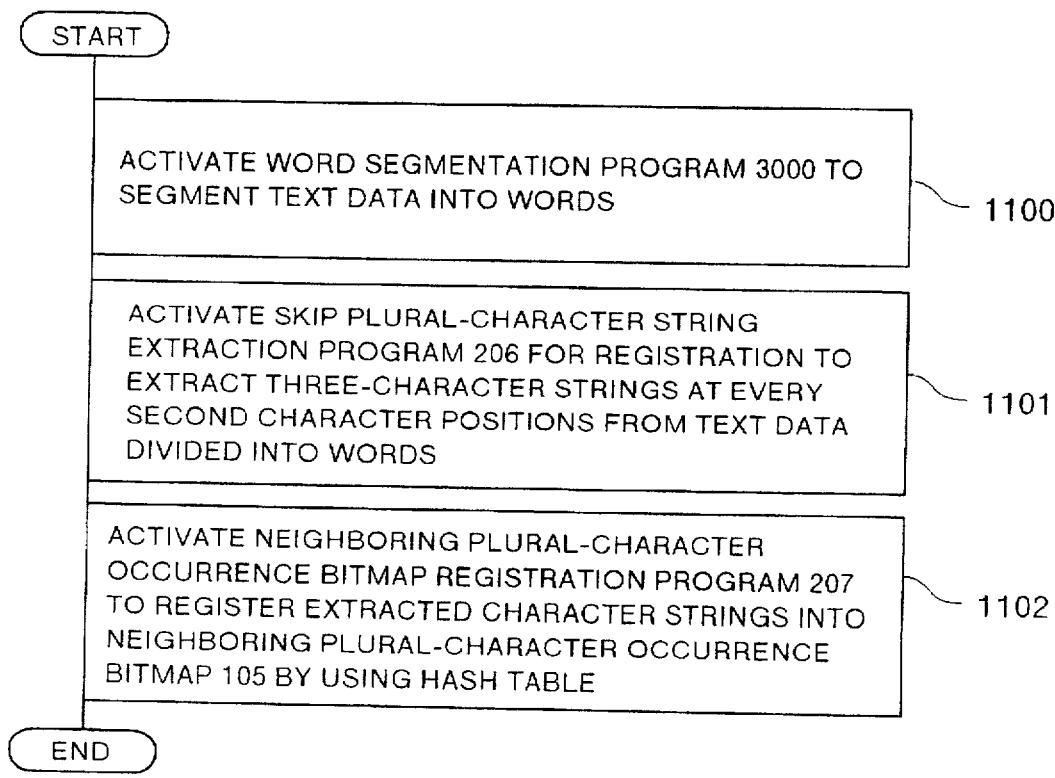
FIG. 13 is a PAD illustrating the procedure of the neighboring plural-character occurrence bitmap creation and registration program according to the second embodiment of the invention.

As shown in FIG. 13, the neighboring plural-character occurrence bitmap creation and registration program 205 activates the word segmentation program 300 to read and store a text 103 in the magnetic disk 110 in the work area 217. The text 103 is segmented into words by using spaces as separators.

Next, the skip plural-character string extraction program 206 is activated to extract all three-character strings from all the words separated by the word segmentation program 300.

Next, the neighboring plural-character occurrence bitmap registration program 207 is activated to register neighboring plural-character strings extracted from words by the skip plural-character string extraction program 206 for registration, in a neighboring plural-character occurrence bitmap in the work area 217. This bit map is stored in the magnetic disk 110 as the neighboring plural-character occurrence bitmap 105.

Figure 14:
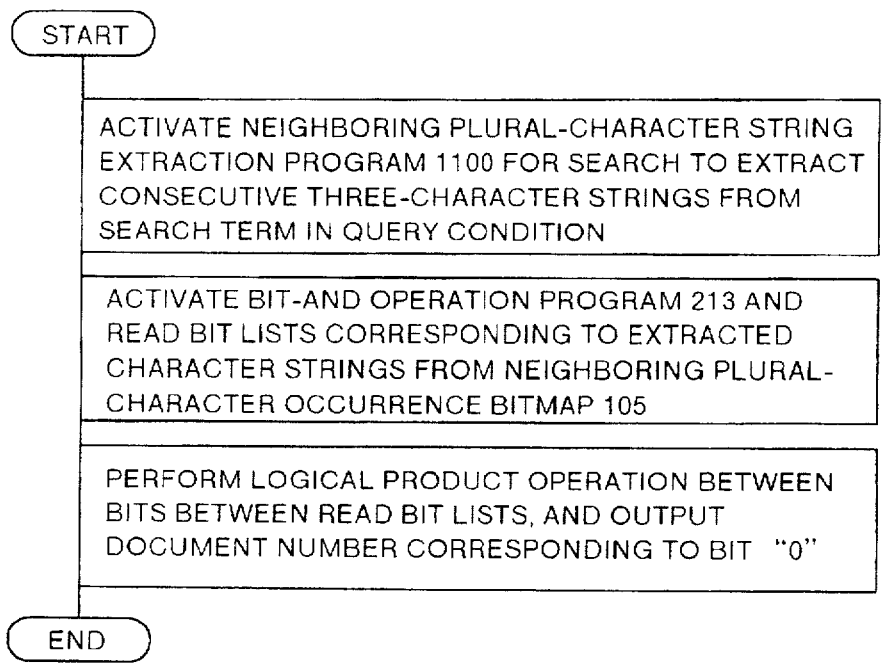
FIG. 14 is a PAD illustrating the procedure of the neighboring plural-character occurrence bitmap search program according to the second embodiment of the invention.

As shown in FIG. 14, the neighboring plural-character occurrence bitmap search program 211 activates the neighboring plural-character string extraction program 1100 for search to extract all consecutive three-character strings from a search term of an inputted query condition.

Next, the bit-and operation program 213 is activated to read bit lists stored in the entries of the neighboring plural-character occurrence bitmap 105 corresponding to all the character strings extracted by the neighboring plural-character string extraction program 1100 for search, by using the hash table 216, and to store the bit lists in the work area 217. A logical product operation is performed between bits between the read bit lists. A document number corresponding to the logical product operation results of "1" is outputted as the search results of the neighboring plural-character occurrence bitmap.

Figure 15:
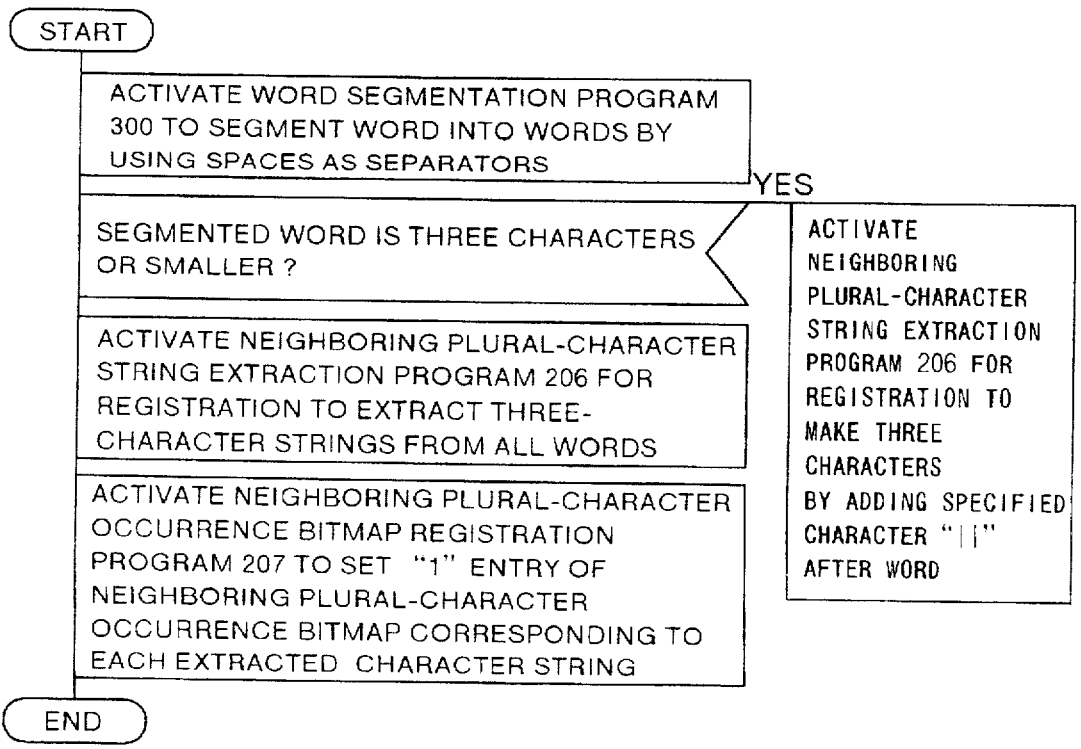
FIG. 15 is a PAD illustrating the registration procedure of the neighboring plural-character occurrence bitmap according to the second embodiment of the invention.

Next, the process to be executed by the neighboring plural-character occurrence bitmap creation and registration program 205 will be detailed with reference to FIG. 15.

The neighboring plural-character occurrence bitmap creation and registration program 205 activates the word segmentation program 300 to read each of texts 103 stored in the magnetic disk 110 and to store it in the work area 217. This text 103 is segmented into words by using spaces as separators.

Next, the skip plural-character string extraction program 206 for registration is activated to extract all three-character strings from the words separated by the word segmentation program 300.

Extraction of skip plural-character strings and registration thereof to the neighboring plural-character occurrence bitmap will be described assuming that a text of, for example, "Multimedia information systems must . . . " is registered.

Figure 16:
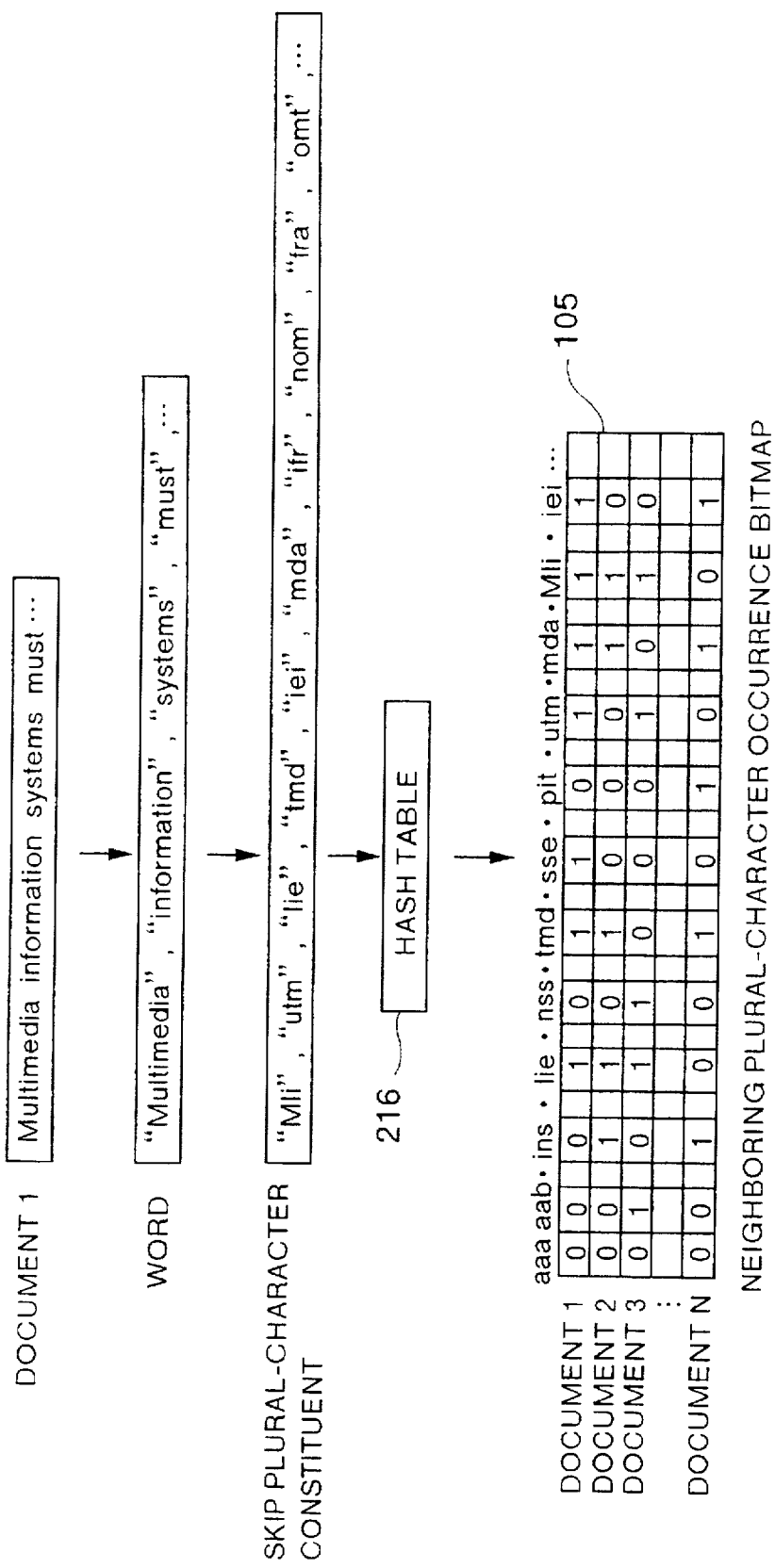
FIG. 16 is a diagram illustrating a method of forming the neighboring plural-character occurrence bitmap according to the second embodiment of the invention.

As shown in FIG. 16, the word segmentation program 300 divides the document 1 into "Multimedia", "information", "systems", "must", . . .

Next, extracted from the words by the skip plural-character string extraction program 206 for registration are the skip plural-character constituents including "Mli", "utm", "lie", "tmd", "iei", "mda", "ifr", "nom", "fra", "omt", . . .

Next, for "Mli" separated by the skip plural-character string extraction program 206 for registration, the neighboring plural-character occurrence bitmap registration program 207 sets "1" at a bit position corresponding to the document 1 and identified by the hash table 216. "1" is set at a corresponding entry also for "utm". Similarly, "1" is set at corresponding entries of the neighboring plural-character occurrence bitmap 105 for all neighboring plural-character constituents extracted from the words of the text data. As shown, trains (bit lists) of "1" and "0" are finally completed for all registration documents.

In the search operation, similar to the first embodiment of the invention, the neighboring plural-character occurrence bitmap search program 211 activates the neighboring plural-character string extraction program 1100 for search to extract all three-character strings from a search term of an inputted query condition.

Next, the bit-and operation program 213 is activated to read bit lists stored in entries of the neighboring plural-character occurrence bitmap 105 corresponding to all the character strings extracted by the skip plural-character string extraction program 1100 for search, by using the hash table 216, and to store them in the work area 217. A logical product operation is performed between bits between the read bit lists. A document number corresponding to the bit "1" of the logical product operation results is outputted as the search results of the neighboring plural-character occurrence bitmap.

As above, in the process of the neighboring plural-character occurrence bitmap creation and registration of this embodiment, text data is segmented into words, three-character strings extracted at every second character positions from the words, and information of a presence of these neighboring plural-character strings are registered in the neighboring plural-character occurrence bitmap. Since word segmentation removes neighboring plural-character constituents between words, a noise caused by hashing and a noise by a skip plural-character string between words can be reduced. For example, even if a document containing character strings of ". . . a green cup . . . " in a text, a skip plural-character string "age" riding over a space (_) is not registered in the neighboring plural-character occurrence bitmap. Therefore, even if "angle" having "age" as a skip plural-character string is designated as a search term, a noise is not generated. It is therefore possible to improve a search reduction rate during the search of the neighboring plural-character occurrence bitmap. Since the search amount of condensed texts during the hierarchical pre-search is reduced, the total search speed can be equivalently shortened. It is therefore possible to perform a full text search of large volume in real time.

Figure 17:
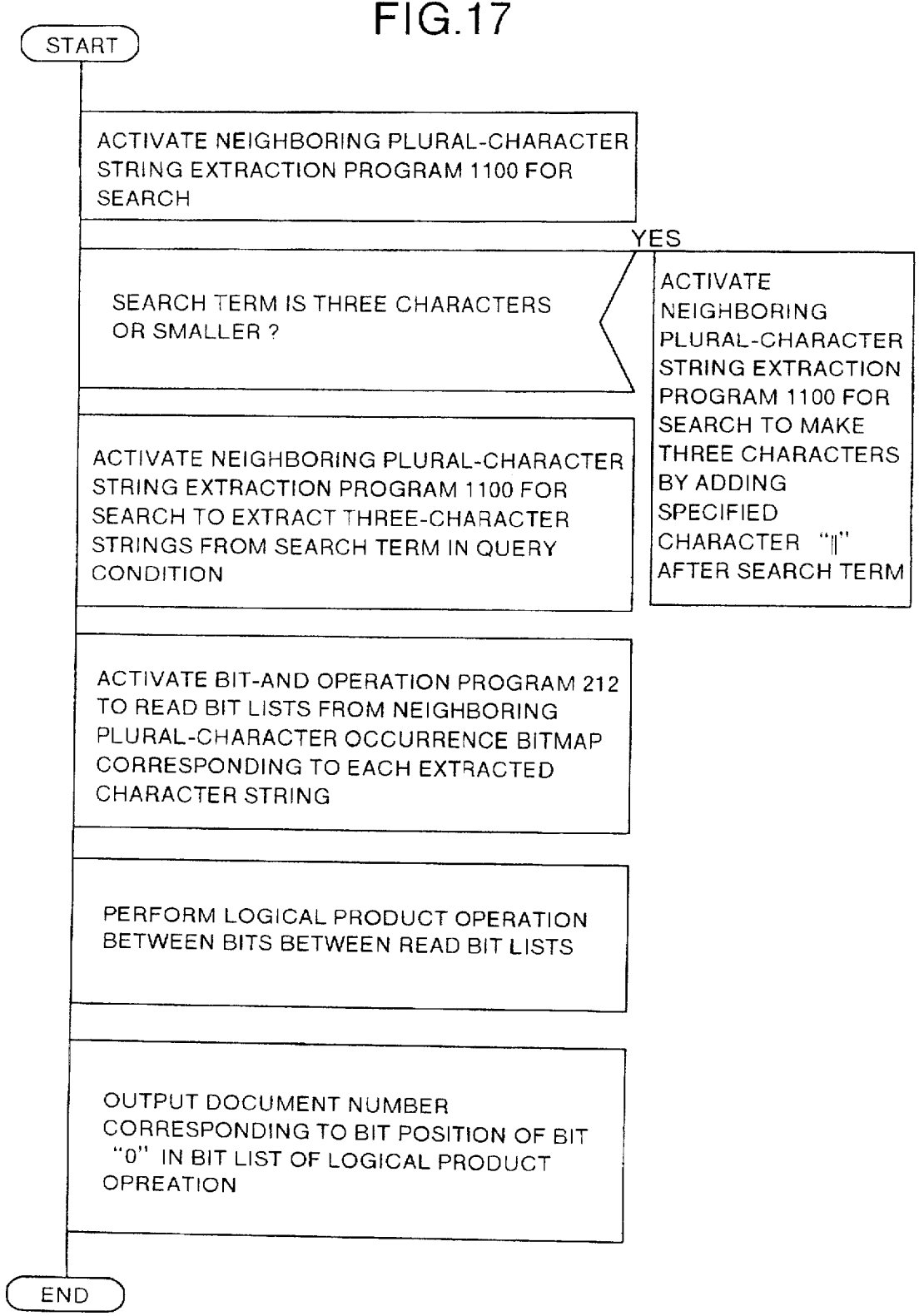
FIG. 17 is a PAD illustrating the procedure of searching the neighboring plural-character occurrence bitmap according to the second embodiment of the invention.

Next, the process to be executed by the neighboring plural-character occurrence bitmap search program 211 will be detailed with reference to FIG. 17.

First, the neighboring plural-character occurrence bitmap search program 1100 is activated to extract three-character strings from a search term of a query condition. In this embodiment, the neighboring three-character occurrence bitmap is used. Therefore, a three-character string cannot be extracted from a word having two characters or less. In this case, a specified character such as "|" is added after the word to extract a three-character string.

Next, the bit-and operation program 213 is activated to read bit lists stored in entries of the neighboring plural-character occurrence bitmap 105 corresponding to all the character strings extracted by the neighboring plural-character string extraction program 1100 for search, by using the hash table 216, and to store them in the work area 217. A logical product operation is performed between bits between the read bit lists. A document number corresponding to the bit "1" of the logical product operation results is outputted as the search results of the neighboring plural-character occurrence bitmap.

Figure 18:
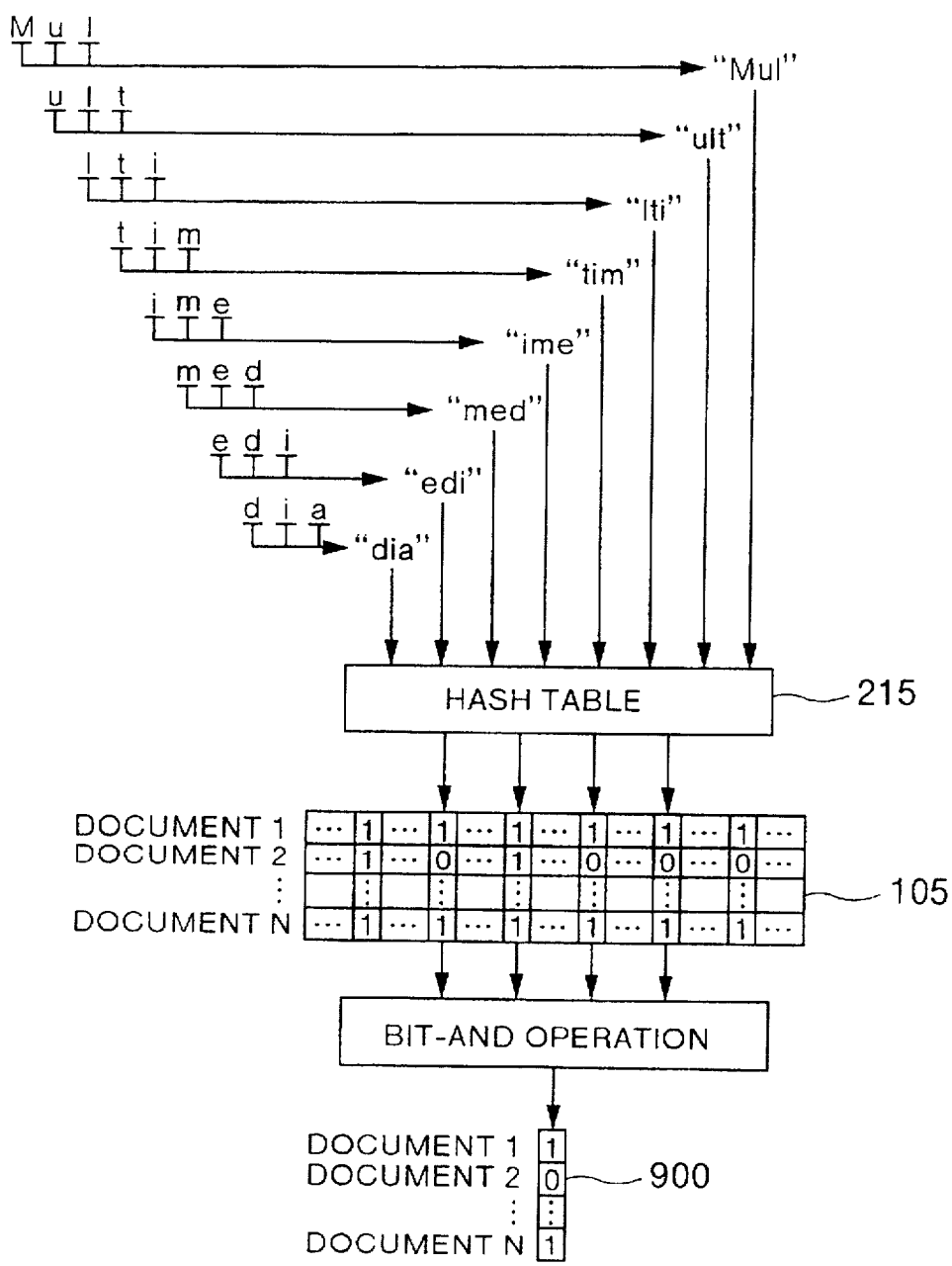
FIG. 18 is a diagram illustrating the procedure of searching a neighboring plural-character occurrence bitmap according to the second embodiment of the invention.

For example, as shown in FIG. 18, if a character string "Multimedia" is designated as a search term, bit lists are read via the hash table 216 from the neighboring plural-character occurrence bitmap 105 at entries corresponding to "Mul", "ult", "lti", "tim", "ime", "med", "edi", and "dia". A document having all "1" in a bit list is obtained as the search results of the neighboring plural-character occurrence bitmap.

Specifically, a logical product operation is performed between bits between all read bit lists to obtain the bit-and calculation results 900. A document number corresponding to a bit "1" of the bit-and calculation results indicates a hit document as the search results of the neighboring plural-character occurrence bitmap. In the above manner, a document containing all of "Mul", "ult", "lti", "tim", "ime", "med", "edi", and "dia" is extracted. In the example shown in FIG. 18, documents 1 and N are hit.

As above, in the process of the neighboring plural-character occurrence bitmap creation and registration of this embodiment, a text is segmented into words, three-character strings extracted from the words, and information of whether each neighboring plural-character constituent is present is registered in the neighboring plural-character occurrence bitmap, so that each neighboring plural-character constituent between words can be removed and a noise by hashing is reduced.

It is therefore possible to improve a search reduction rate during the search of the neighboring plural-character occurrence bitmap. Since the search amount of condensed texts during the hierarchical pre-search is reduced, the total search speed can be equivalently shortened. It is therefore possible to perform a full text search of large volume in real time.

In this embodiment, three-character strings extracted are used for forming the neighboring plural-character occurrence bitmap. Two-character or four-character or more strings may also be used.

Also in this embodiment, a text is segmented into words to form the neighboring plural-character occurrence bitmap by using a neighboring plural-character string (skip plural-character string) extracted at every (m+1)-th character positions (m is a predetermined integer of 1 or larger). It is also apparent that a noise to be caused by hashing a neighboring plural-character string containing a space (_) to the same entry of another neighboring plural-character string can be reduced by segmenting a text into words to form the neighboring plural-character occurrence bitmap by using a conventional adjacent plural-character string extracted one character after another.

In the second embodiment of the invention, text data is previously segmented into words, and skip plural-character strings are extracted from each word. Therefore, it is possible to reduce a noise to be caused by hashing a skip plural-character string between words to the same entry of another neighboring plural-character string and a noise to be caused by a skip plural-character constituent between words.

This method is associated, however, with the problem that a document having a word containing as its partial character string a word designated as a search term is hit as a noise. For example, assuming that a document containing a word "jangle" in its text is registered, "jnl" and "age" are registered as the skip plural-character strings in the neighboring plural-character occurrence bitmap. In this case, if "angle" is designated as a search term, "age" is extracted from the search term as a skip plural-character string. Therefore, a document is hit as a noise, which document contains a word "jangle" as its partial character string of the search term "angle".

To solve this problem, in the third embodiment of the invention, a predetermined symbol such as a specified character (hereinafter called a specified character in general) is added before and after each word when registering and searching the neighboring plural-character occurrence bitmap as in the document search method of the second embodiment. Namely, specified characters (e.g., "^") are added and a neighboring plural-character constituent is extracted being inclusive of the specified characters to form a neighboring plural-character occurrence bitmap of a specified character addition type. In this manner, a partition between words can be identified by the specified character, and a document having a word containing as its partial character string a search term can be prevented from being hit so that a noise can be reduced.

Figure 19:
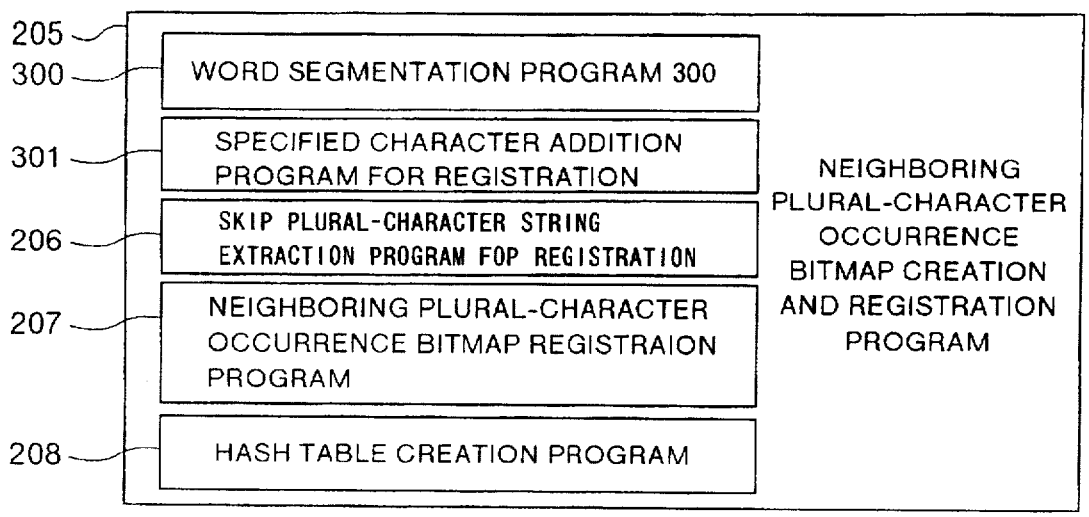
FIG. 19 is a diagram showing the structure of the neighboring plural-character occurrence bitmap creation and registration program according to a third embodiment of the invention.
Figure 20:
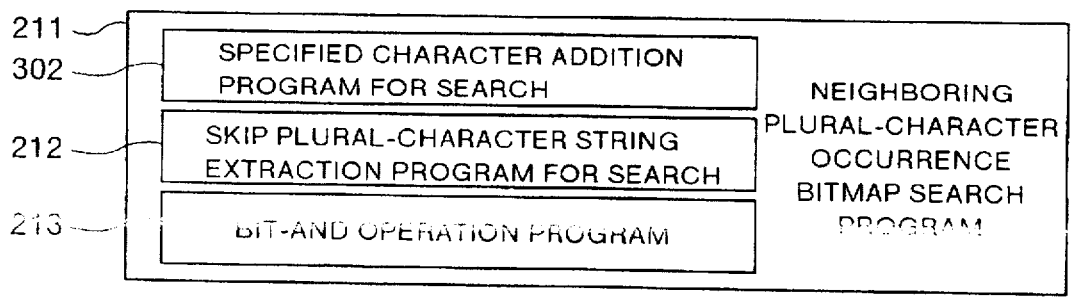
FIG. 20 is a diagram showing the structure of a neighboring plural-character occurrence bitmap search program according to the second embodiment of the invention.

The third embodiment is structured fundamentally in the same manner as the first embodiment, excepting that the neighboring plural-character occurrence bitmap creation and registration program 205 is configured as shown in FIG. 19 and neighboring plural-character occurrence bitmap search program 211 is configured as shown in FIG. 11.

Specifically, the neighboring plural-character occurrence bitmap creation and registration program 205 is constituted by a word segmentation program 300, specified character addition program 301 for registration, skip plural-character string extraction program 206 for registration, neighboring plural-character occurrence bitmap registration program 207, and hash table formation program 208. The neighboring plural-character occurrence bitmap search program 211 is constituted by a specified character addition program 302 for search, skip plural-character string extraction program 212 for search, and a bit-and operation program 213.

Figure 21:
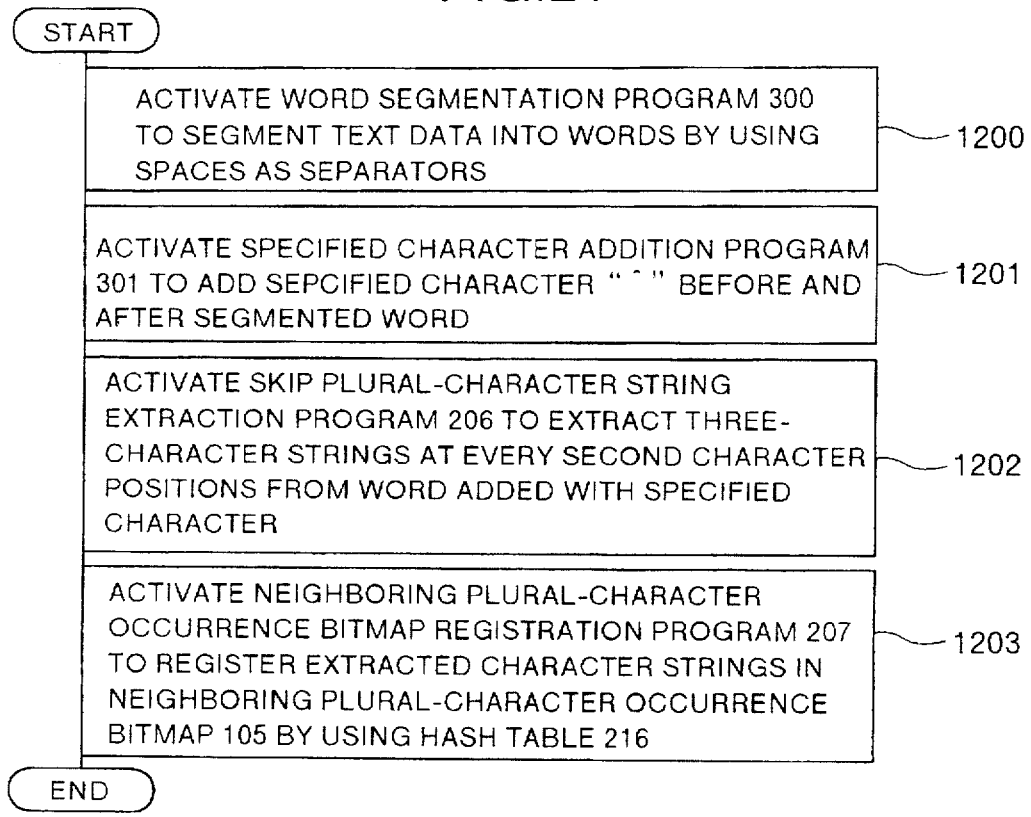
FIG. 21 is a PAD illustrating the procedure of the neighboring plural-character occurrence bitmap creation and registration program according to the third embodiment of the invention.

As shown in FIG. 21, the neighboring plural-character occurrence bitmap creation and registration program 205 activates at Step 1200 the word segmentation program 300 to read and store text data of a text 103 in the magnetic disk 110 in the work area 217. The text data is segmented into words by using spaces as separators.

Next, at Step 1201, the specified character addition program 301 for registration is activated to add the specified character "^" before and after each word separated by the word segmentation program 300.

Thereafter, the skip plural-character string extraction program 206 for registration is activated to extract all three-character strings from all the words added with the specified words separated by the word segmentation program 300.

Next, the neighboring plural-character occurrence bitmap registration program 207 is activated to register neighboring plural-character strings extracted from words by the skip plural-character string extraction program 206 for registration, in a neighboring plural-character occurrence bitmap in the work area 217. This bit map is stored in the magnetic disk 110 as the neighboring plural-character occurrence bitmap 105.

As shown in FIG. 14, the neighboring plural-character occurrence bitmap search program 211 activates the skip plural-character string extraction program 1100 for search to extract all three-character strings from a search term of an inputted query condition.

Next, the bit-and operation program 213 is activated to read bit lists stored in the entries of the neighboring plural-character occurrence bitmap 105 corresponding to all the character strings extracted by the skip plural-character string extraction program 1100 for search, by using the hash table 216, and to store the bit lists in the work area 217. A logical product operation is performed between bits between the read bit lists. A document number corresponding to the logical product operation results of "1" is outputted as the search results of the neighboring plural-character occurrence bitmap.

Next, the process to be executed by the neighboring plural-character occurrence bitmap creation and registration program 205 will be detailed with reference to FIG. 15.

The neighboring plural-character occurrence bitmap creation and registration program 205 activates the word segmentation program 300 to read each of texts 103 stored in the magnetic disk 110 and to store it in the work area 217. This text 103 is segmented into words by using spaces as separators.

Next, the skip plural-character string extraction program 206 for registration is activated to extract all three-character strings from the words separated by the word segmentation program 300.

Lastly, at Step 1203, the neighboring plural-character occurrence bitmap registration program 207 is activated to register the neighboring plural-character strings extracted from the words by the skip plural-character string extraction program 206 for registration, into the neighboring plural-character occurrence bitmap 105 in the work area 217 in accordance with the hash table 216, and to store the bitmap 105 in the magnetic disk 110.

Figure 22:
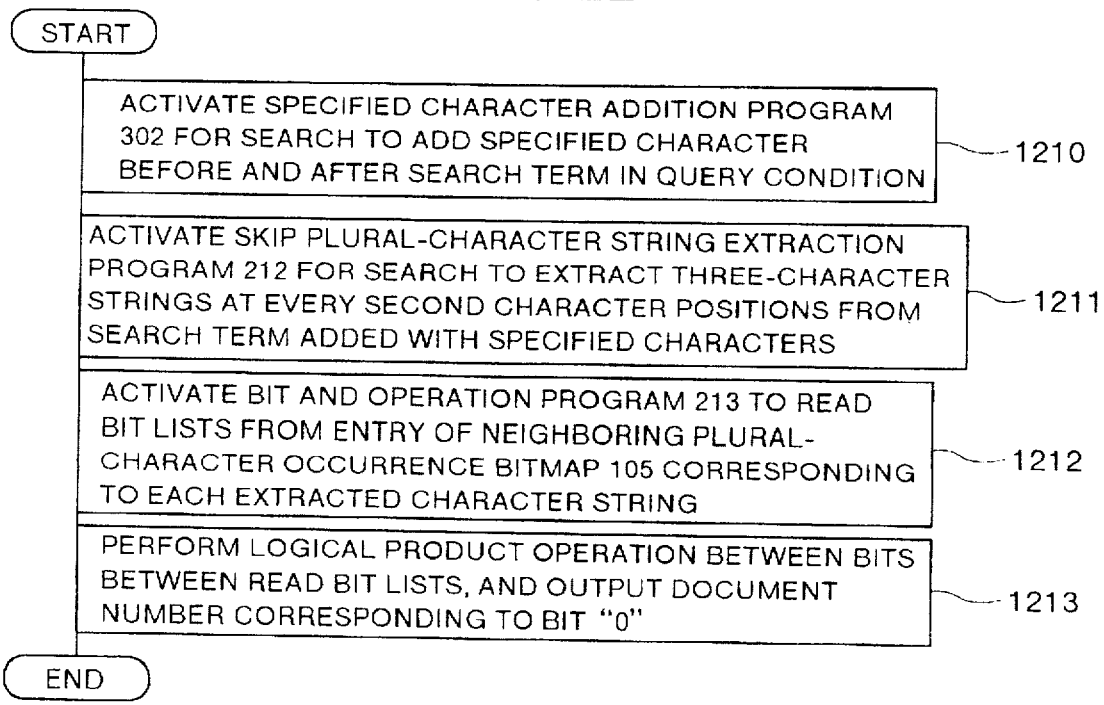
FIG. 22 is a PAD illustrating the procedure of the neighboring plural-character occurrence bitmap search program according to the third embodiment of the invention.

In the search operation, as shown in FIG. 22, the neighboring plural-character occurrence bitmap search program 211 activates at Step 1210 the specified character addition program 302 for search to add the specified character "^" before and after a search term of a query condition.

Next, at Step 1211 the skip plural-character string extraction program 212 for search is activated to extract all three-character strings from the search term added with the specified characters "^" by the specified character addition program 302 for search.

Thereafter, at Step 1212, the bit-and operation program 213 is activated to read bit lists stored in entries of the neighboring plural-character occurrence bitmap 105 corresponding to all the character strings extracted by the skip plural-character string extraction program 212 for search, by using the hash table 216, and to store them in the work area 217. At Step 1213, a logical product operation is performed between bits between the read bit lists.

A document number corresponding to the bit "1" of the logical product operation results is outputted as the search results of the neighboring plural-character occurrence bitmap.

Next, the process to be executed by the neighboring plural-character occurrence bitmap creation and registration program 205 will be detailed.

The neighboring plural-character occurrence bitmap creation and registration program 205 segments a text 103 into words by using spaces as separators, and adds the specified character "^" before and after each word. Thereafter, three-character strings are extracted from the words added with the specified character "^" at every second character positions.

Extraction of skip plural-character strings will be described assuming that a text of, for example, "Multimedia information systems must . . . " is registered.

Figure 23:
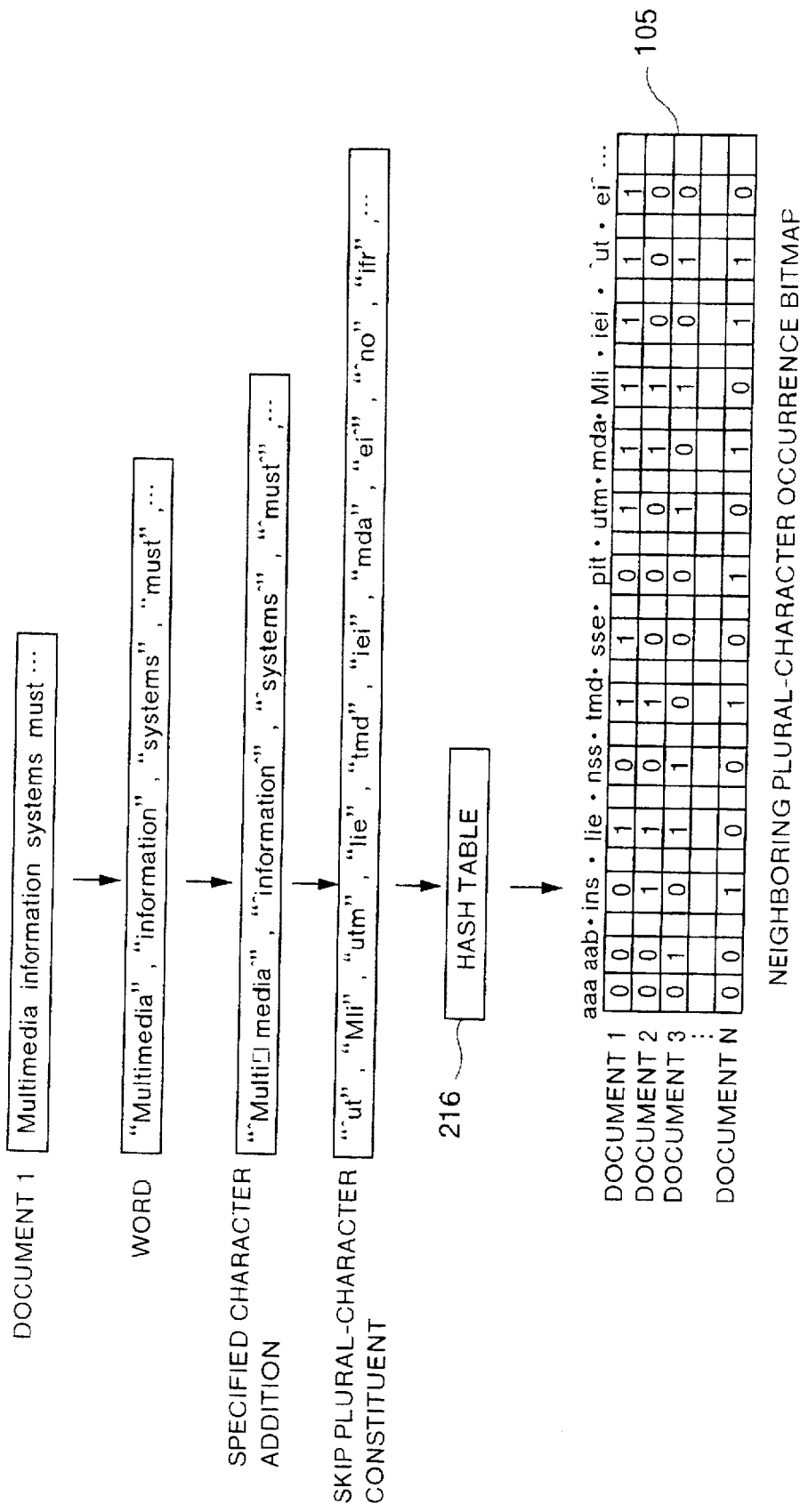
FIG. 23 is a diagram illustrating a method of forming the neighboring plural-character occurrence bitmap according to the third embodiment of the invention.

As shown in FIG. 23, the word segmentation program 300 divides the document 1 into "Multimedia", "information", "systems", "must", . . . .

Next, the specified character addition program 301 for registration adds the specified character "^" before and after each separated word to obtain "^Multimedia^", "^information^", "^systems^","^must", . . . .

Next, extracted from the words added with the specified character "^" by the skip plural-character string extraction program 206 for registration are "^ut", "Mli", "utm", "lie", "tmd", "iei", "mda", "ei^", "^no", "ifr", "nom", "fra", "omt", . . . .

Lastly, the neighboring plural-character occurrence bitmap registration program 207 is activated. "1" is set to an entry corresponding to each neighboring plural-character constituent extracted from the word added with the specified character "^" by the skip plural-character string extraction program 206 for registration, by using the hash table 216, to thereby indicate a presence of a neighboring plural-character constituent.

In the example of the document 1 shown in FIG. 23, for "^ut", "1" is set at a bit position of the document 1 at the entry identified by the hash table 216. "1" is also set for "Mli".

Similarly, "1" is set at corresponding entries of the neighboring plural-character occurrence bitmap 105 for all neighboring plural-character constituents extracted from the words including those words added with the specified character "^". As shown, trains (bit lists) of "1" and "0" are finally completed for all documents in texts 103.

Next, the details of the procedure of the neighboring plural-character occurrence bitmap search program 211 will be detailed.

The neighboring plural-character occurrence bitmap search program 211 adds a specified character "^" before and after a search term in a query condition, and three-character strings are extracted from the search term.

Thereafter, a logical product operation is performed between bits between the bit lists corresponding to each extracted character string. A document number corresponding to a bit "1" is outputted as the search results of the neighboring plural-character occurrence bitmap.

Figure 24:
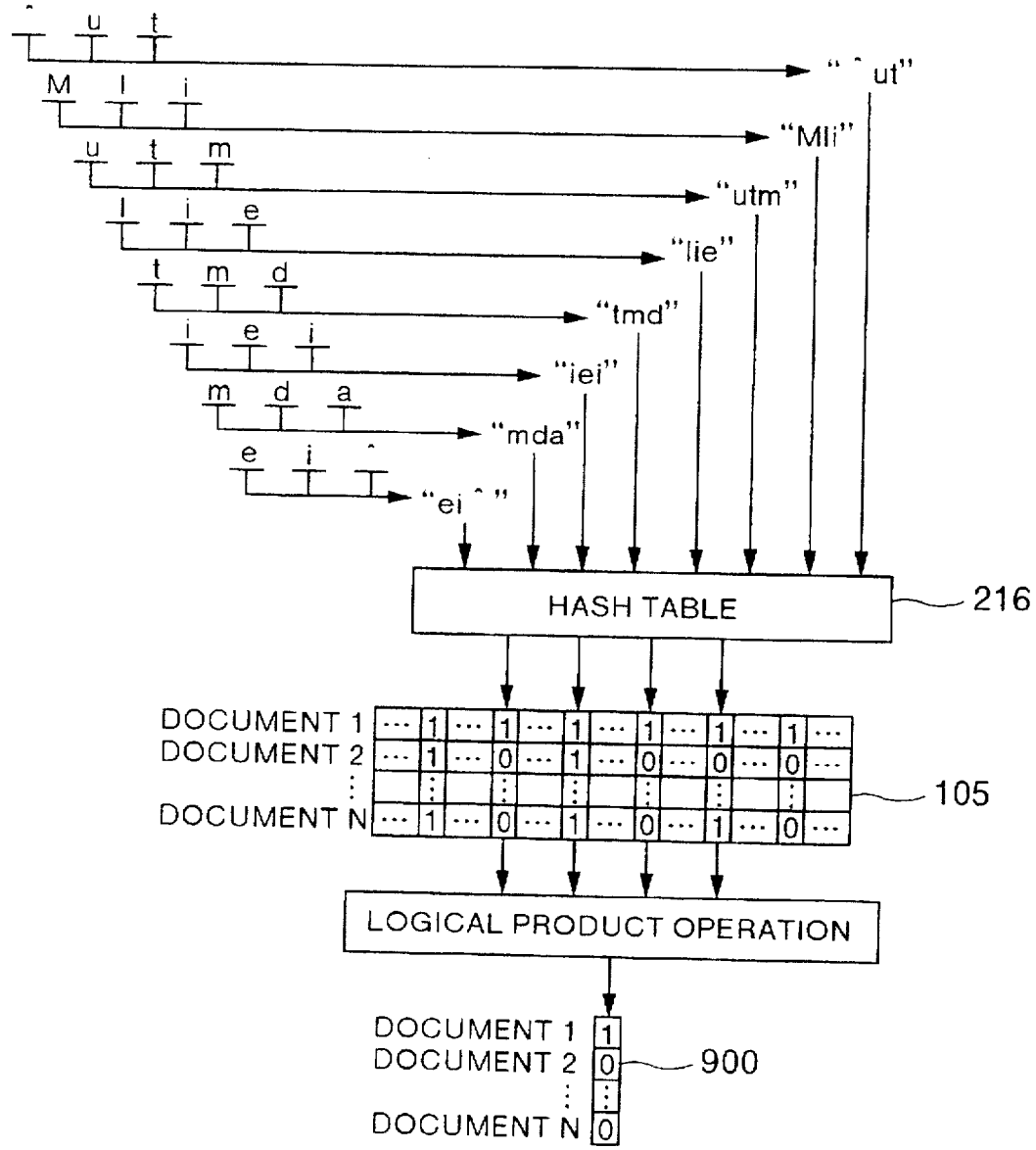
FIG. 24 is a diagram illustrating a method of searching the neighboring plural-character occurrence bitmap according to the third embodiment of the invention.

For example, as shown in FIG. 24, a search term "Multimedia" becomes "^Multimedia^" by adding the specified character. Three-character strings are extracted from this search term at every second character positions, the obtained neighboring plural-character constituents being "^ut", "Mli", "utm", "lie", "tmd", "iei", "mda" and "ei^". Bit lists corresponding to these neighboring plural-character constituents are read by using the hash table 216. A document having all "1" between these bit lists is obtained as the search results of the neighboring plural-character occurrence bitmap.

Specifically, a logical product operation is performed between bits between all read bit lists to obtain the bit-and calculation results 900. A document number corresponding to a bit "1" of the bit-and calculation results indicates a hit document as the 20 search results of the neighboring plural-character occurrence bitmap.

In the above manner, a document containing all of "^ut", "Mli", "utm", "lie", "tmd", "iei", "mda", and "ei^" is extracted as the search results. In the example shown in FIG. 24, a document 1 is hit.

When a document containing a word "jangle" in its text is registered, "^ag", "jnl", "age ", and "nl^" are extracted as skip plural-character strings from "jangle" added with the specified character before and after it, and registered in the neighboring plural-character occurrence bitmap. When "angle" is designated as a search term, "^nl", "age" and "nl" are extracted as skip plural-character strings from "^angle^". In this case, the document containing "^jangle^" does not contain the skip plural-character string corresponding to "^nl". This document containing "jangle" is not therefore hit as a noise document.

As above, in the process of the neighboring plural-character occurrence bitmap creation and registration, a text is segmented into words, the specified character is added before and after each word, and three-character strings extracted at every second character positions from text data are obtained when a document is registered. Information of whether each neighboring plural-character constituent is present is registered in the neighboring plural-character occurrence bitmap, and the specified character is added before and after a search term when the neighboring plural-character occurrence bitmap is searched, so that the start and end of each word can be discriminated by the specified characters. As a result, an unnecessary word containing as its partial character string a search term can be prevented from being hit by middle matching, resulting in a reduced noise. It is therefore possible to improve a search reduction rate during the search of the neighboring plural-character occurrence bitmap. Since the search amount of condensed texts during the hierarchical pre-search is reduced, the total search speed can be equivalently shortened. It is therefore possible to perform a full text search of large volume in real time.

In the above embodiment, three-character strings (n=3) extracted at every second character positions are used for forming the neighboring plural-character occurrence bitmap. Two-character or four-character or more strings extracted at every x-th (x=any integer) character positions may also be used, as apparent from the foregoing description.

Also in this embodiment, a text is segmented into words and the specified character is added before and after each word to form the neighboring plural-character occurrence bitmap by using a neighboring plural-character string (skip plural-character string) extracted at every (m+1)-th character positions. It is also apparent that a document containing as its partial character string a search term can be prevented from being hit and removing from a search target by segmenting a text into words and adding the specified word to each separated word to form the neighboring plural-character occurrence bitmap by using a conventional adjacent plural-character string extracted one character after another.

Next, the fourth embodiment of the invention will be described.

In the first embodiment of the invention, a method of extracting n-character strings at every (m+1)-th character positions to form the neighboring plural-character occurrence bitmap has been described. With this method, however, if a search term having a small number of characters is designated, the number of extracted neighboring plural-character constituents is small so that a number of retrieval noises are generated. Specifically, when a document containing a word "argue" in its text is registered, "age" is extracted as the skip plural-character string and stored in the neighboring plural-character occurrence bitmap, and when "angle" is designated as a search term, "age" is extracted as the skip plural-character string. In this case, a document containing "argue" is searched as a noise. Furthermore, with a conventional method of forming the neighboring plural-character occurrence bitmap by adjacent plural-character strings, a document containing at the same time, for example, both "angry" and "single" is hit as a noise document.

To solve this problem, in the fourth embodiment of the invention, when the neighboring plural-character constituents are extracted as in the document search method of the first embodiment, a conventional adjacent plural-character string having i consecutive characters and a skip plural-character string having n characters at every (m+1)-th character positions are extracted to form the neighboring plural-character occurrence bitmap by using both the conventional adjacent plural-character constituents and neighboring plural-character constituents, to thereby reduce the number of documents to be searched and noises.

Figure 25:
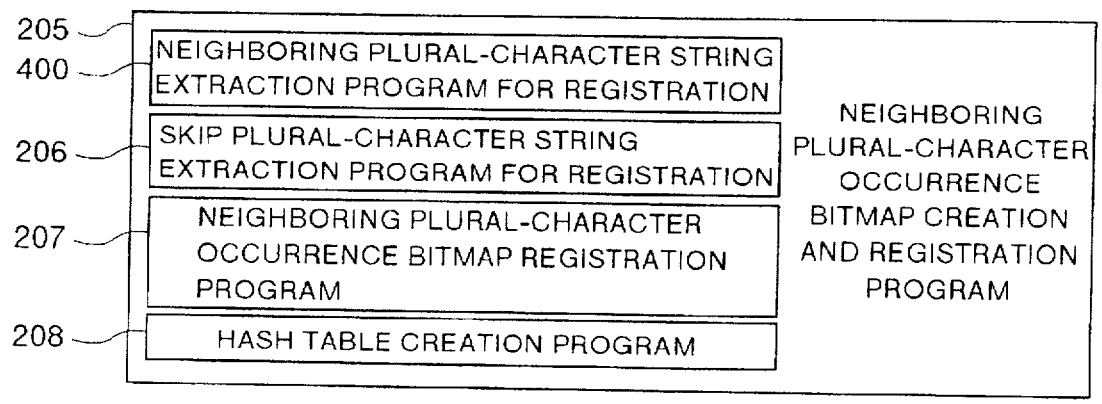
FIG. 25 is a diagram showing the structure of the neighboring plural-character occurrence bitmap creation and registration program according to a fourth embodiment of the invention.
Figure 26:
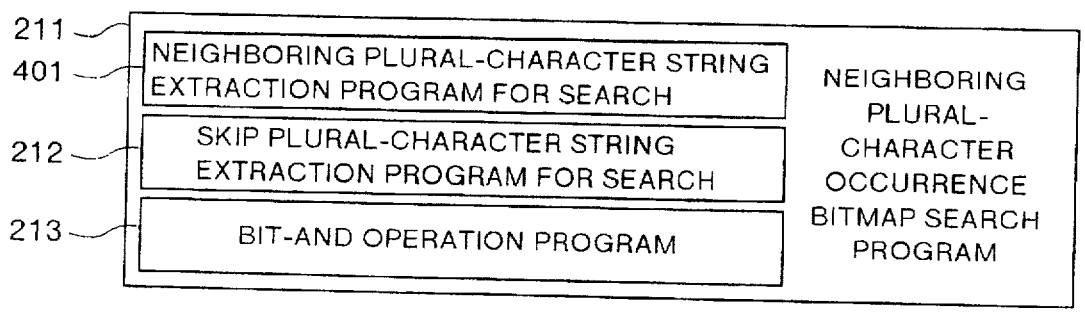
FIG. 26 is a diagram showing the structure of a neighboring plural-character occurrence bitmap search program according to the fourth embodiment of the invention.

The fourth embodiment is structured fundamentally in the same manner as the first embodiment, excepting that the neighboring plural-character occurrence bitmap creation and registration program 205 is configured as shown in FIG. 25 and neighboring plural-character occurrence bitmap search program 211 is configured as shown in FIG. 26.

Specifically, the neighboring plural-character occurrence bitmap creation and registration program 205 is constituted by an adjacent plural-character string extraction program 400, skip plural-character string extraction program 206 for registration, neighboring plural-character occurrence bitmap registration program 207, and hash table formation program 208. The neighboring plural-character occurrence bitmap search program 211 is constituted by an adjacent plural-character string extraction program 401, skip plural-character string extraction program 212 for search, and a bit-and operation program 213.

Figure 28:
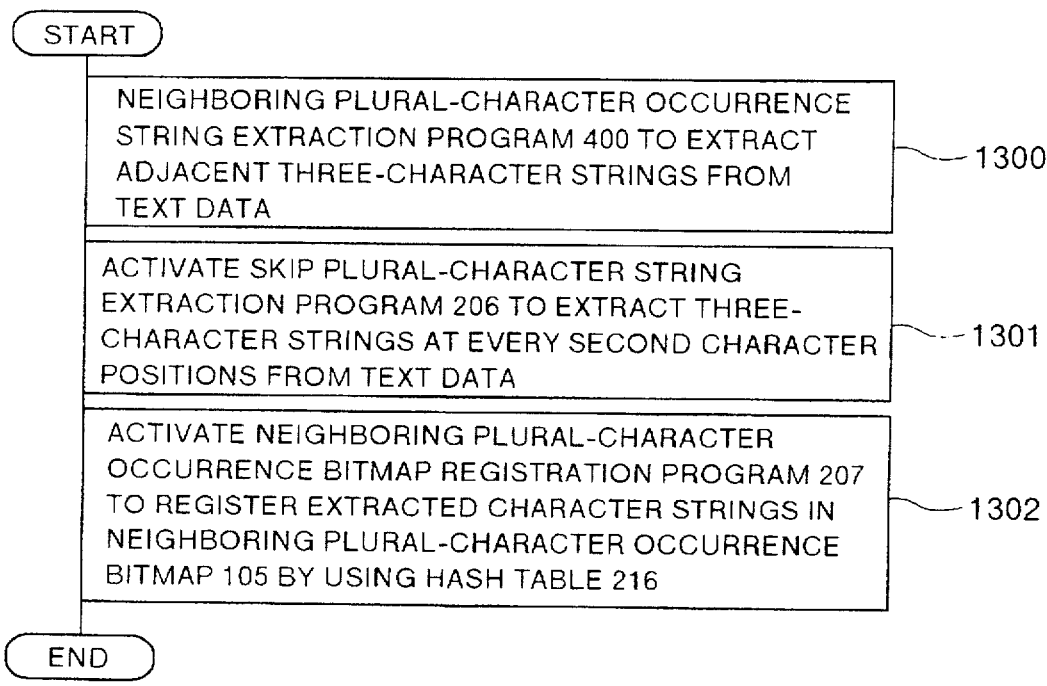
FIG. 28 is a PAD illustrating the procedure of the neighboring plural-character occurrence bitmap creation and registration program according to the third embodiment of the invention.

As shown in FIG. 28, the neighboring plural-character occurrence bitmap creation and registration program 205 activates at Step 1300 the adjacent plural-character string extraction program 400 to read and store text data of a text 103 in the magnetic disk 110 in the work area 217. All consecutive three-character strings are extracted.

Next, at Step 1301, the skip plural-character string extraction program 206 for registration is activated to extract all three-character strings from the text data in the work area 217 at every second character positions.

Lastly, at Step 1302, the neighboring plural-character occurrence bitmap registration program 207 is activated to register neighboring plural-character strings extracted by the adjacent plural-character string extraction program 400 and skip plural-character string extraction program 206 for registration, in the neighboring plural-character occurrence bitmap 105 in the work area 217, and to store the bitmap 105 in the magnetic disk 110.

Figure 29:
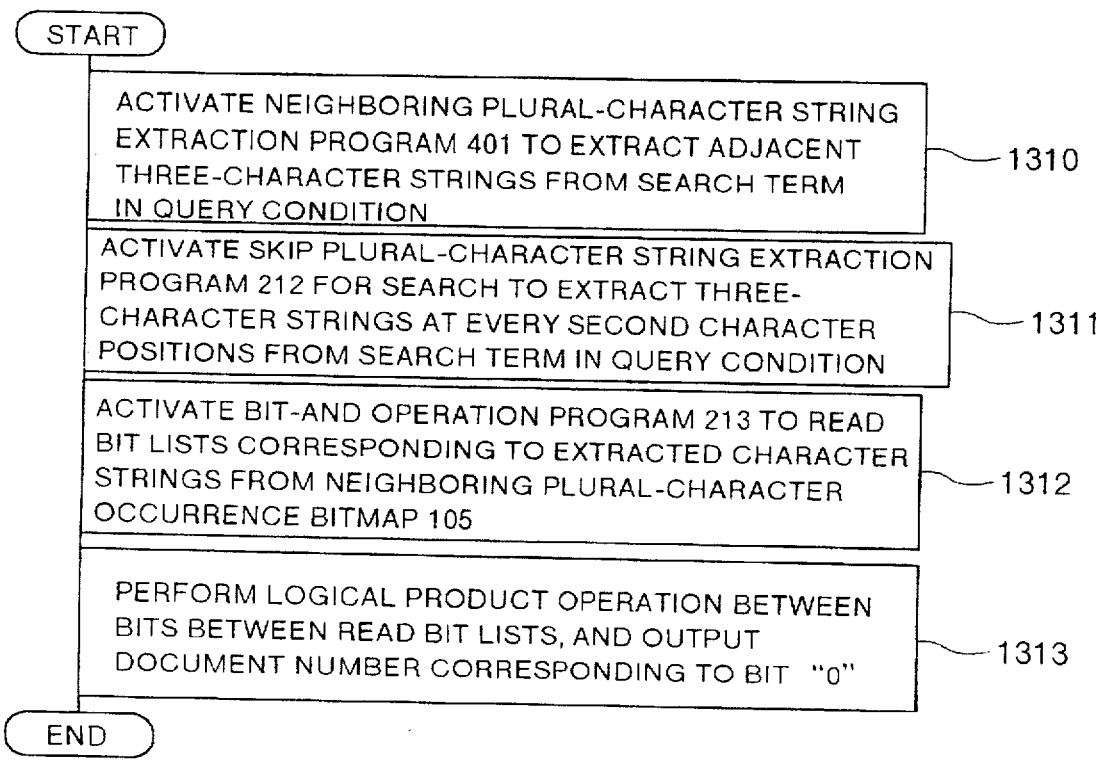
FIG. 29 is a PAD illustrating the procedure of the neighboring plural-character occurrence bitmap search program according to the fourth embodiment of the invention.

In the search operation, as shown in FIG. 29, the neighboring plural-character occurrence bitmap search program 211 activates at Step 1310 the adjacent plural-character string extraction program 401 to extract all consecutive three-character strings from a search term.

Next, at Step 1311, the skip plural-character string extraction program 212 for search is activated to extract all three-character strings from a search term at every second character positions.

Thereafter, at Step 1312, the bit-and operation program 213 is activated to read bit lists stored in the entries of the neighboring plural-character occurrence bitmap 105 corresponding to all the character strings extracted by the adjacent plural-character string extraction program 400 and skip plural-character string extraction program 206 for registration, by using the hash table 216, and to store the bit lists in the work area 217. A logical product operation is performed between bits between the read bit lists.

A document number corresponding to the logical product operation results of "1" is outputted as the search results of the neighboring plural-character occurrence bitmap.

Next, the process to be executed by the neighboring plural-character occurrence bitmap creation and registration program 205 will be detailed.

The neighboring plural-character occurrence bitmap creation and registration program 205 extracts consecutive (adjacent) three-character strings and neighboring three-character strings, respectively from text data.

Extraction of these adjacent and neighboring plural-character strings will be described assuming that a text of, for example, "Multimedia information systems must . . . " is registered.

Figure 31:
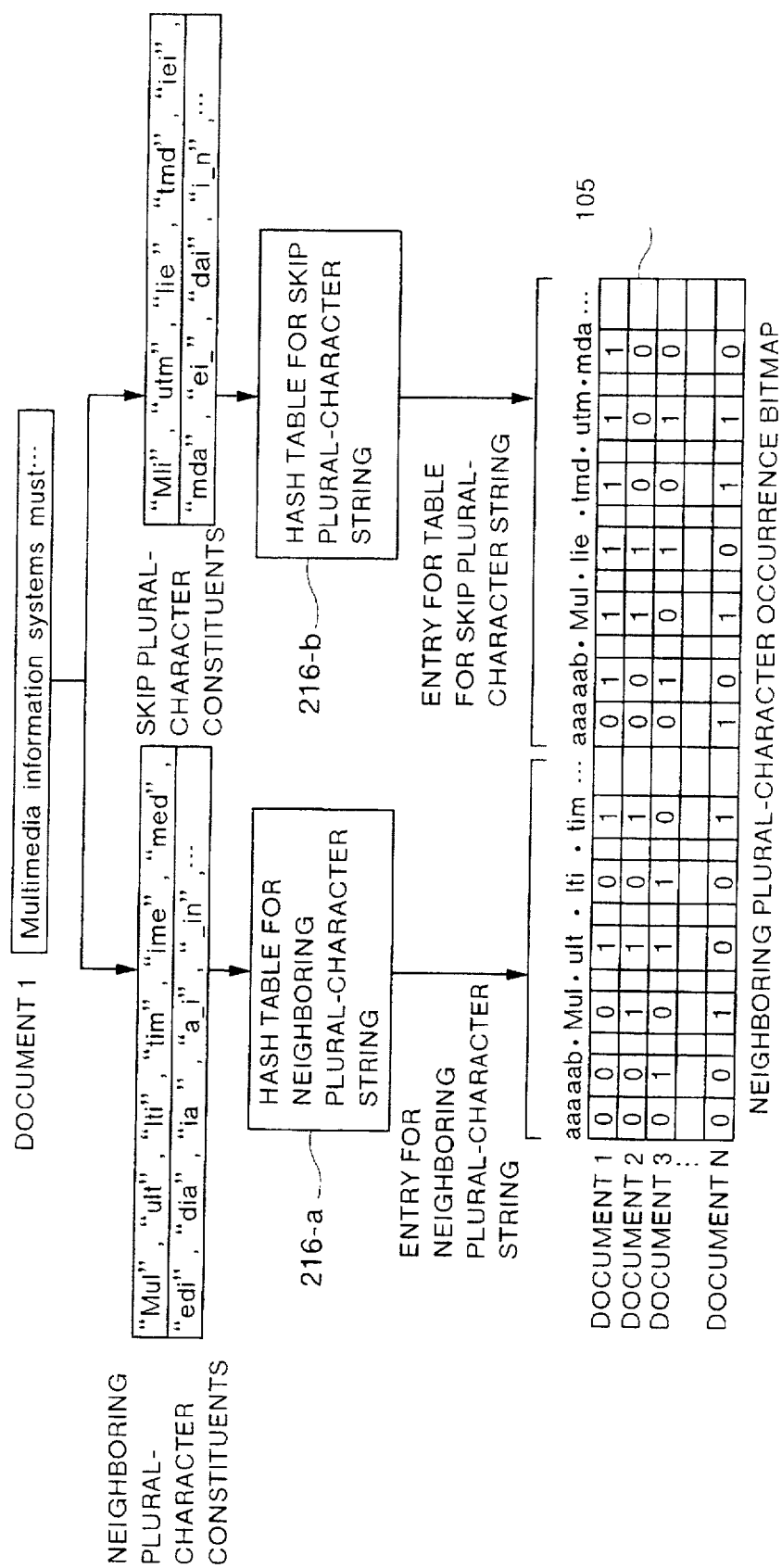
FIG. 31 is a diagram illustrating a method of forming the neighboring plural-character occurrence bitmap according to the fourth embodiment of the invention.

The adjacent plural-character string extraction program 400 extracts from the document 1 shown in FIG. 31 "Mul", "ult", "lti", "tim", "lme", "med", "edi", "dia", "ia_", "a_i", . . . The skip plural-character string extraction program 206 for registration extracts "Mli", "utm", "lie", "tmd", "iei", "mda", "ei_", "dai", "i_n", "aif", . . .

Lastly, the neighboring plural-character occurrence bitmap registration program 207 is activated. "1s" are set at entries corresponding to the neighboring plural-character constituents extracted by the adjacent plural-character string extraction program 400 and the skip plural-character string extraction program 206 for registration by using a hash table 216-a for neighboring plural-character strings and a hash table 216-b for skip plural-character strings.

Next, a search process will be detailed.

Figure 32:
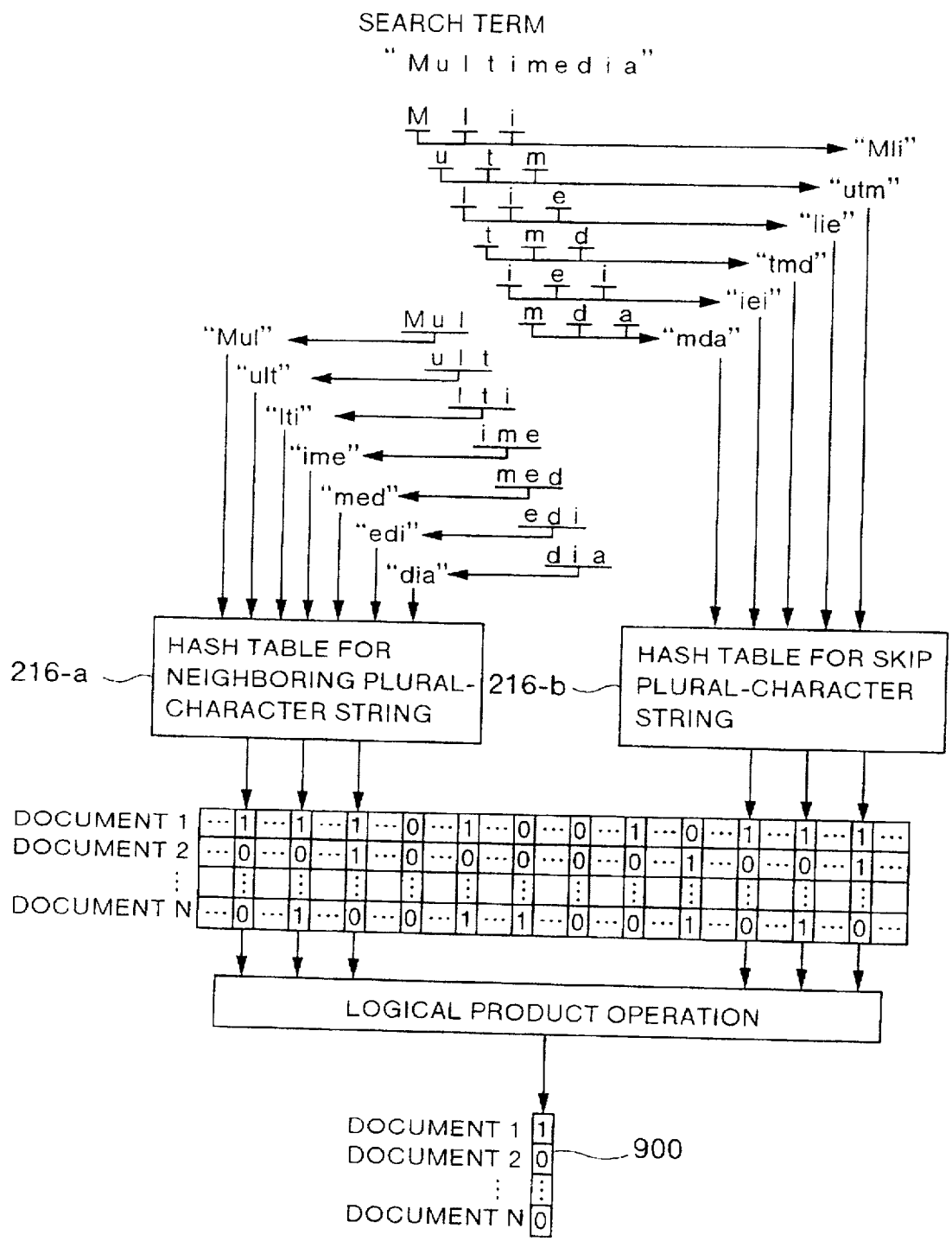
FIG. 32 is a diagram illustrating a method of searching the neighboring plural-character occurrence bitmap according to the fourth embodiment of the invention.

For example, as shown in FIG. 32, the adjacent plural-character string extraction program 401 extracts the adjacent plural-character constituents including "Mul","ult", "lti", "tim", "lme", "med", "edi", and "dia", from a search term "Multimedia". The skip plural-character string extraction program 212 for search extracts the skip plural-character constituents including "Mli", "utm", "lie", "tmd", "iei", and "mda". The bit-and operation program 213 reads bit lists in the neighboring plural-character occurrence bitmap 105 by using the hash table 216-a for adjacent plural-character strings and the hash table 216-b for skip plural-character strings. A document having all "1" between these bit lists is obtained as the search results of the neighboring plural-character occurrence bitmap.

Specifically, a logical product operation is performed between bits between all read bit lists to obtain the bit-and calculation results 900. A document number corresponding to a bit "1" of the bit-and calculation results indicates a hit document as the search results of the neighboring plural-character occurrence bitmap. In the example shown in FIG. 32, the document 1 is a hit document.

As above, in the process of the neighboring plural-character occurrence bitmap creation and registration of this embodiment, extracted from a text are adjacent three-character strings (adjacent plural-character strings) and three-character strings at every second character positions (skip plural-character strings), and information of whether each plural-character constituent is present is registered in the neighboring plural-character occurrence bitmap. In a search operation, a document containing plural-character constituents of both the adjacent and skip plural character strings is searched to thereby reduce a noise during a search of the neighboring plural-character occurrence bitmap. For example, if "angle" is designated as a search term, the system searches a document containing the adjacent plural-character strings of "ang", "ngl", and "gle" and the skip plural-character string of "age". If a document containing a word "argue" in its text is registered, "age" is extracted as the skip plural-character string. However, "ang", "ngl", and "gle" are not extracted as the adjacent plural-character strings. Therefore, noises can be reduced. In another case, if a document containing both words "angry" and "single" is registered, the adjacent plural-character strings of "ang", "ngl", and "gle" are registered in the neighboring plural-character occurrence bitmap. However, since "age" is not extracted as the skip plural-character string, noises can be reduced.

It is therefore possible to improve a search reduction rate during the search of the neighboring plural-character occurrence bitmap. Since the search amount of condensed texts during the hierarchical pre-search is reduced, the total search speed can be equivalently shortened. It is therefore possible to perform a full text search of large volume in real time.

In the above embodiment, adjacent three-character strings are used for forming the neighboring plural-character occurrence bitmap. Two-character or four-character or more strings may also be used, with the same process being made possible as apparent from the foregoing description. Similarly, skip three-character strings at every second character positions are used for forming the neighboring plural-character occurrence bitmap. Character strings at every x-th (x=any integer) character positions, or two-character or four-character or more strings may also be used, with the same process being made possible as apparent from the foregoing description.

In this embodiment, the neighboring plural-character occurrence bitmap is formed by using all character strings including spaces (_), periods (.), and comma (,) without paying attention only to words. Similar to the second embodiment, a text may be segmented into words to form the neighboring plural-character occurrence bitmap, or similar to the third embodiment, a text may be segmented into words and a specified character may be added before and after each word to form the neighboring plural-character occurrence bitmap, with the same effects being obtained as apparent from the foregoing description.

Figure 27:
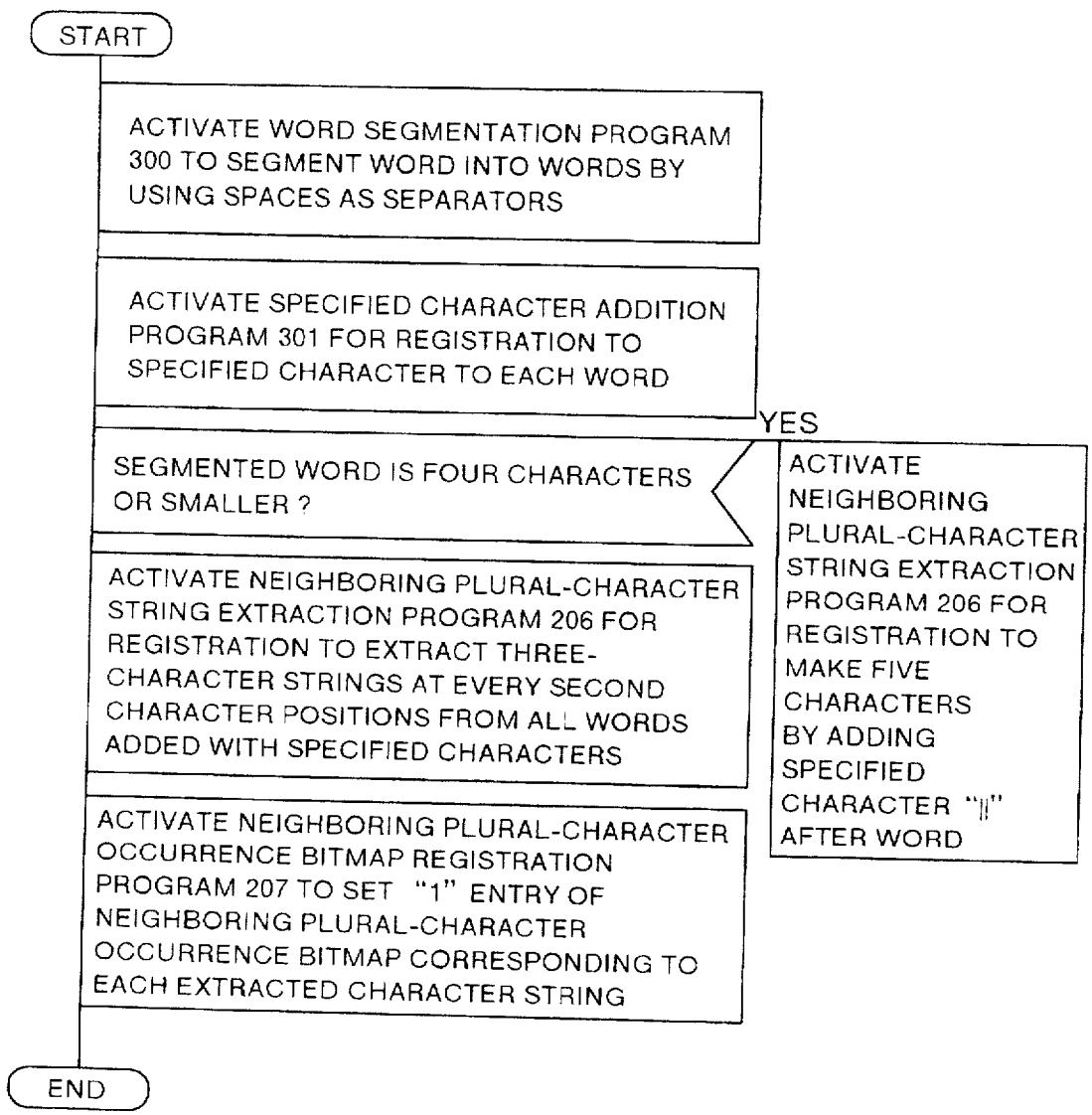
FIG. 27 is a PAD illustrating the procedure of registering the neighboring plural-character occurrence bitmap according to the fourth embodiment of the invention.

Next, the process to be executed by the neighboring plural-character occurrence bitmap creation and registration program 205 will be described with reference to FIG. 27, wherein the neighboring plural-character occurrence bitmap is formed after specified characters are added.

In the neighboring plural-character occurrence bitmap creation and registration program 205, the word segmentation program 300 divides a text 103 into words by using spaces as separators, and the specified character addition program 301 for registration adds the specified character "^" before and after each separated word.

Extracted thereafter from the words added with the specified character "^" by the skip plural-character string extraction program 206 for registration are all three-character trains at every second character positions. For example, a text in the document 1 shown in FIG. 30 "Multimedia information systems must . . . SE (Systems Engineering)

..." is divided by the word segmentation program 300 into "Multimedia", "information", "systems", "must", . . . , "SE", "Systems", and "Engineering", . . . The specified character addition program 301 for registration adds the specified characters "^" to obtain "^Multimedia^", "^information^", "^systems^", "^must^", . . . "^SE^", "^Systems^", and "^Engineering^", . . .

Next, extracted from the words added with the specified character "^" by the skip plural-character string extraction program 206 for registration are "^ut", "Mli", "utm", . . . , "ain", "to^", "^yt", "sse", . . . , "^E||", "^yt", "Sse", . . .

In this case, a three-character string at every second character positions cannot be extracted from a word having two characters or less such as "SE", even if the specified characters are added before and after the word to obtain a four-character string of "^SE^". In this case, a specified character such as "||" is added after the word to obtain a five-character string of "^SE^||" and extract a three-character string therefrom.

Lastly, the neighboring plural-character occurrence bitmap registration program 207 is activated. "1" is set to an entry corresponding to each neighboring plural-character constituent extracted from the word, to thereby indicate a presence of a neighboring plural-character constituent.

Figure 30:
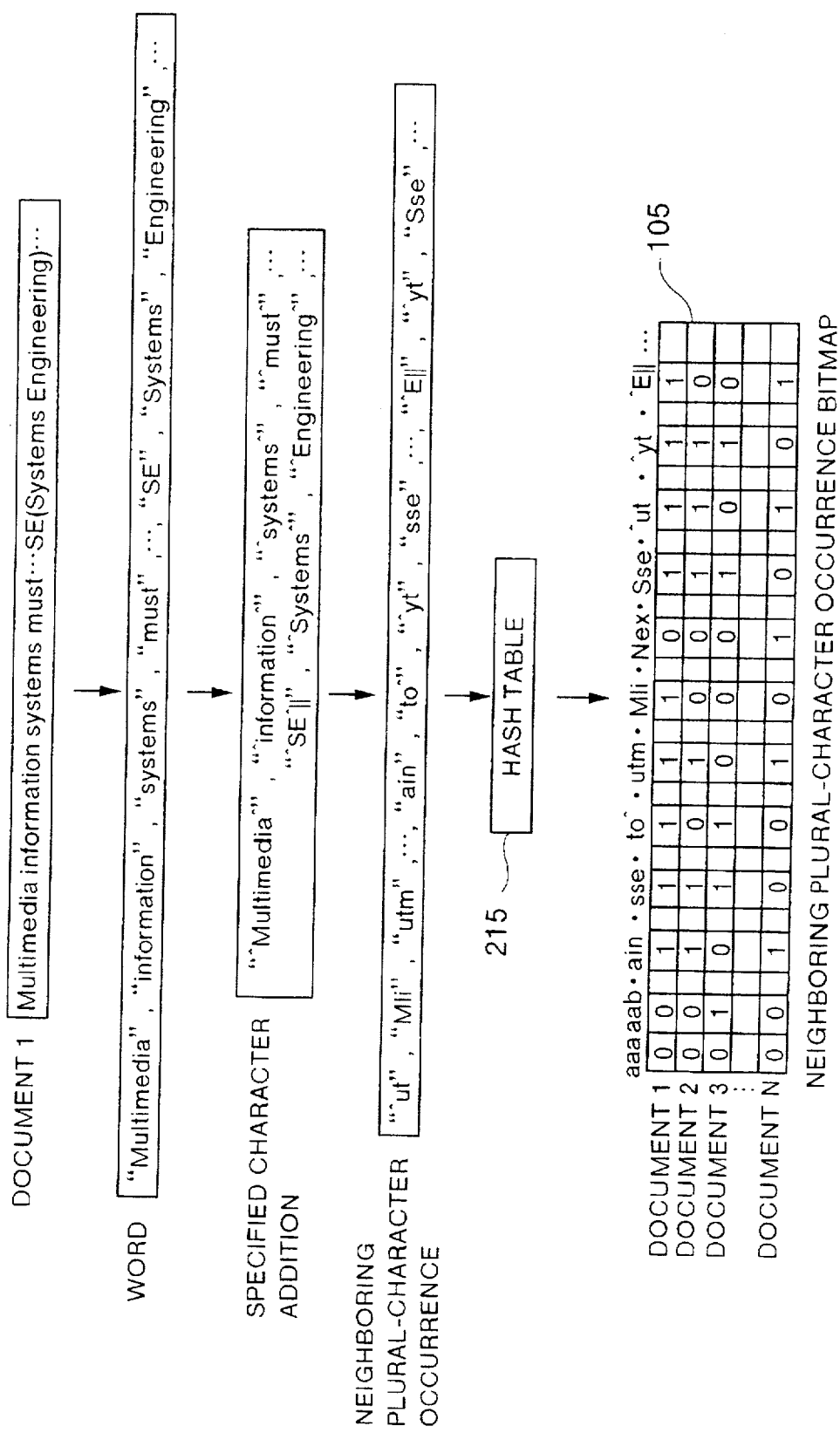
FIG. 30 is a diagram illustrating a method of forming the neighboring plural-character occurrence bitmap according to the fourth embodiment of the invention.

In the example of the document 1 shown in FIG. 30, for "^ut", "1" is set at a bit position of the document 1 at the entry identified by the hash table 216. "1" is also set for "Mli".

Similarly, "1" is set at corresponding entries of the neighboring plural-character occurrence bitmap 105 for all neighboring plural-character constituents extracted from the words. As shown, trains (bit lists) of "1" and "0" are finally completed for all documents in texts 103.

Figure 33:
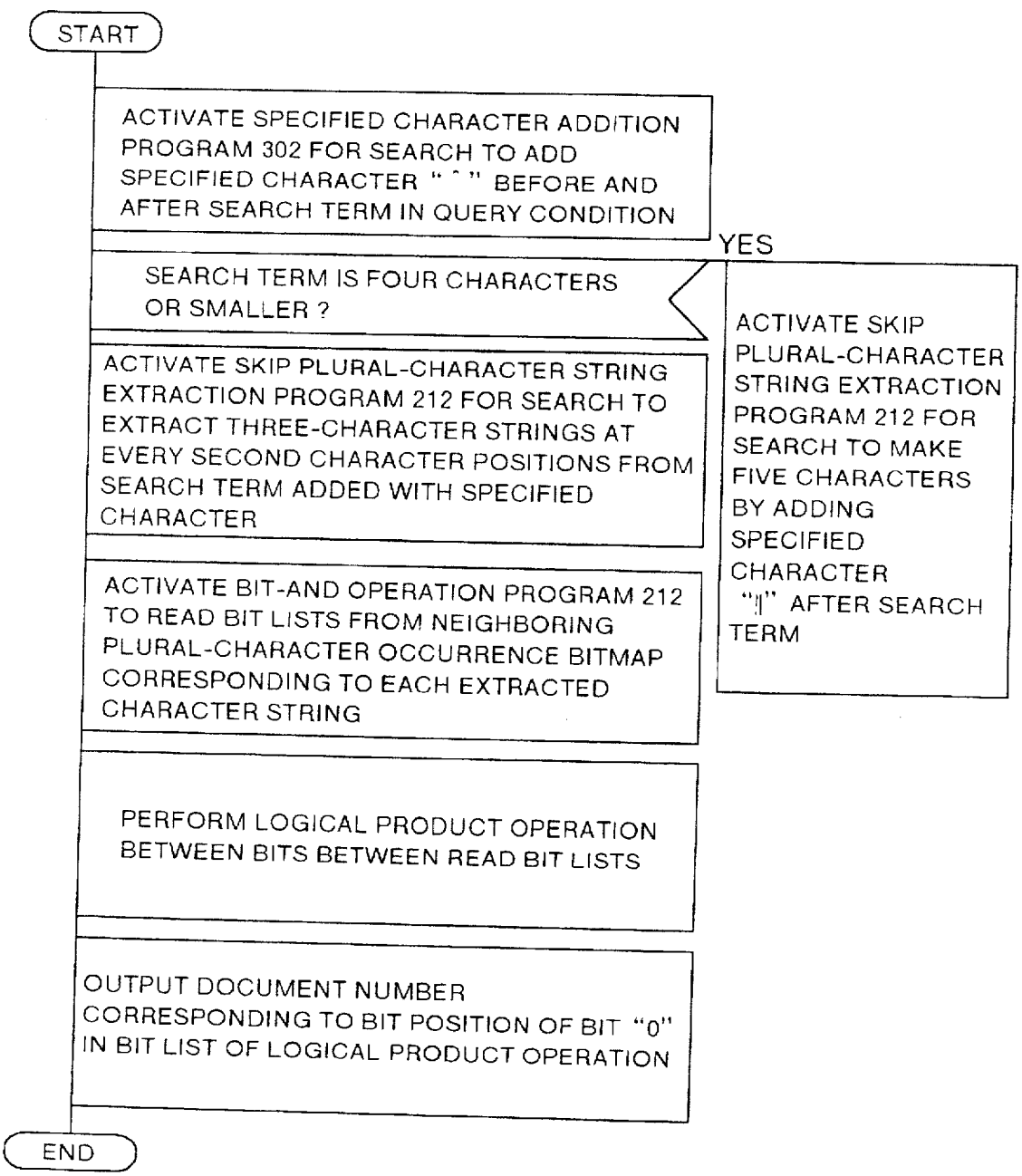
FIG. 33 is a diagram illustrating the procedure of searching a method of forming the neighboring plural-character occurrence bitmap according to the fourth embodiment of the invention.

Next, the details of the procedure of the neighboring plural-character occurrence bitmap search program 211 will be detailed with reference to FIG. 33.

In the neighboring plural-character occurrence bitmap search program 211, the specified character addition program 302 for search adds a specified character "^" before and after a search term of a query condition, and three-character strings are extracted from the search term.

In this embodiment, a neighboring plural-character constituent cannot be extracted from a search term having two characters or less, because the neighboring plural-character occurrence bitmap uses three-character strings. In such a case, a specified character such as "||" is added after a search term added with the specified character "^" to allow a neighboring plural-character constituent to be extracted.

Lastly, the bit-and operation program 213 performs a logical product operation between bits between the bit lists corresponding to each extracted neighboring plural-character string. A document number corresponding to a bit "1" is outputted as the search results of the neighboring plural-character occurrence bitmap.

Figure 34:
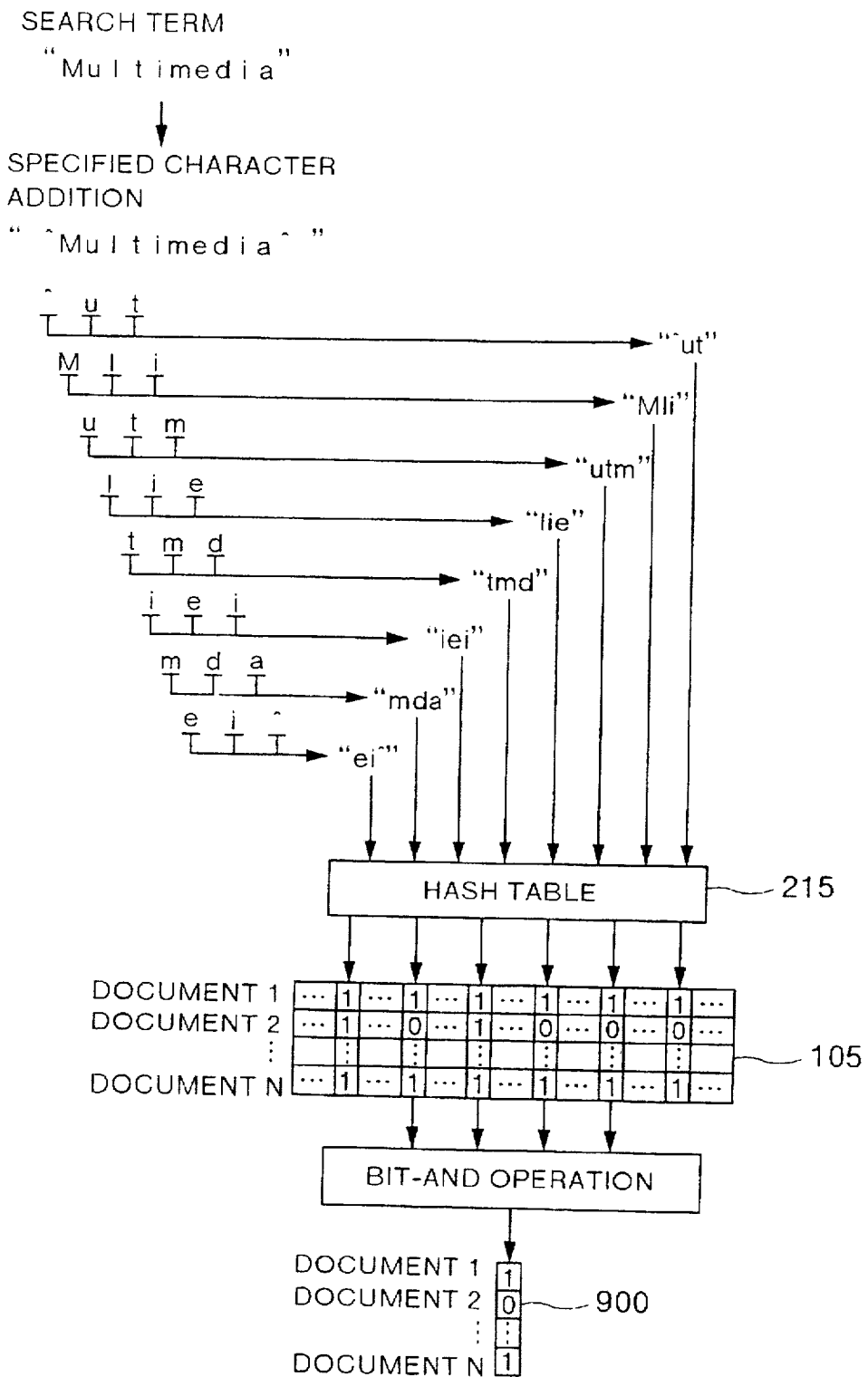
FIG. 34 is a diagram illustrating a method of searching the neighboring plural-character occurrence bitmap according to the fourth embodiment of the invention.

For example, as shown in FIG. 34, a search term "Multimedia" becomes "^Multimedia^" by adding the specified characters "^". Bit lists corresponding to "^ut", "Mli", "utm", "lie", "tmd", "iei", "mda" and "ei^" are read from the neighboring plural-character occurrence bitmap 105 by using the hash table 216. A logical product operation is performed between bits between the read bit lists. A document number at the position of a bit "1" at the bit position of the logical product operation results is a hit document as the search results of the neighboring plural-character occurrence bitmap.

In the above manner, a document containing all of "^ut", "Mli", "utm", "lie", "tmd", "iei", "mda", and "ei^" is extracted as the search results. In the example shown in FIG. 34, documents 1 and N are hit.

Next, the fifth embodiment of the invention will be described, the fifth embodiment applying the document search method of the fourth embodiment to the Japanese language.

The Japanese language is constituted by ideograms each having a meaning. Therefore, as compared to the English language, retrieval noises can be considerably reduced by using a neighboring plural-character occurrence bitmap formed by conventional consecutive character strings (adjacent plural-character strings). However, if a character string constituted by a combination of words is designated as a search term, many noises are generated even in the case of the Japanese language. For example, if a character string "動画像" is designated as a search term, a search of an adjacent plural-character occurrence bitmap hits a document containing both "動画" and "画像". As a result, a document containing, for example, both words "動画" and "画像" is hit as a noise document although it does not contain "動画像".

To solve this problem, in the fifth embodiment of the invention, a character string (adjacent plural-character string) having i (i is an integer of 2 or larger) consecutive characters and a character string (skip plural-character string) having n (n is an integer of 2 or larger) characters at every (m+1)-th character positions (m is an integer of 1 or larger) are extracted from a Japanese language document to form a neighboring plural-character occurrence bitmap. With this arrangement, the neighboring plural-character occurrence bitmap with less retrieval noises can be realized even if a character string constituted by a combination of words is designated as a search term.

The document search method of the fifth embodiment is configured in the same manner as the fourth embodiment. In the fifth embodiment, the adjacent plural-character string has i=2 consecutive characters and the skip plural-character string has n=2 characters at every ((m=1)+1)-th character positions.

The neighboring plural-character occurrence bitmap creation and registration program 205 extracts from a text 103 adjacent two-character strings and neighboring two-character strings at every second character positions.

Extraction of a character string will be described assuming that a text of, for example, "自動画 像質調整機能 を備えた画像 処理装置. . ." is inputted.

Figure 35:
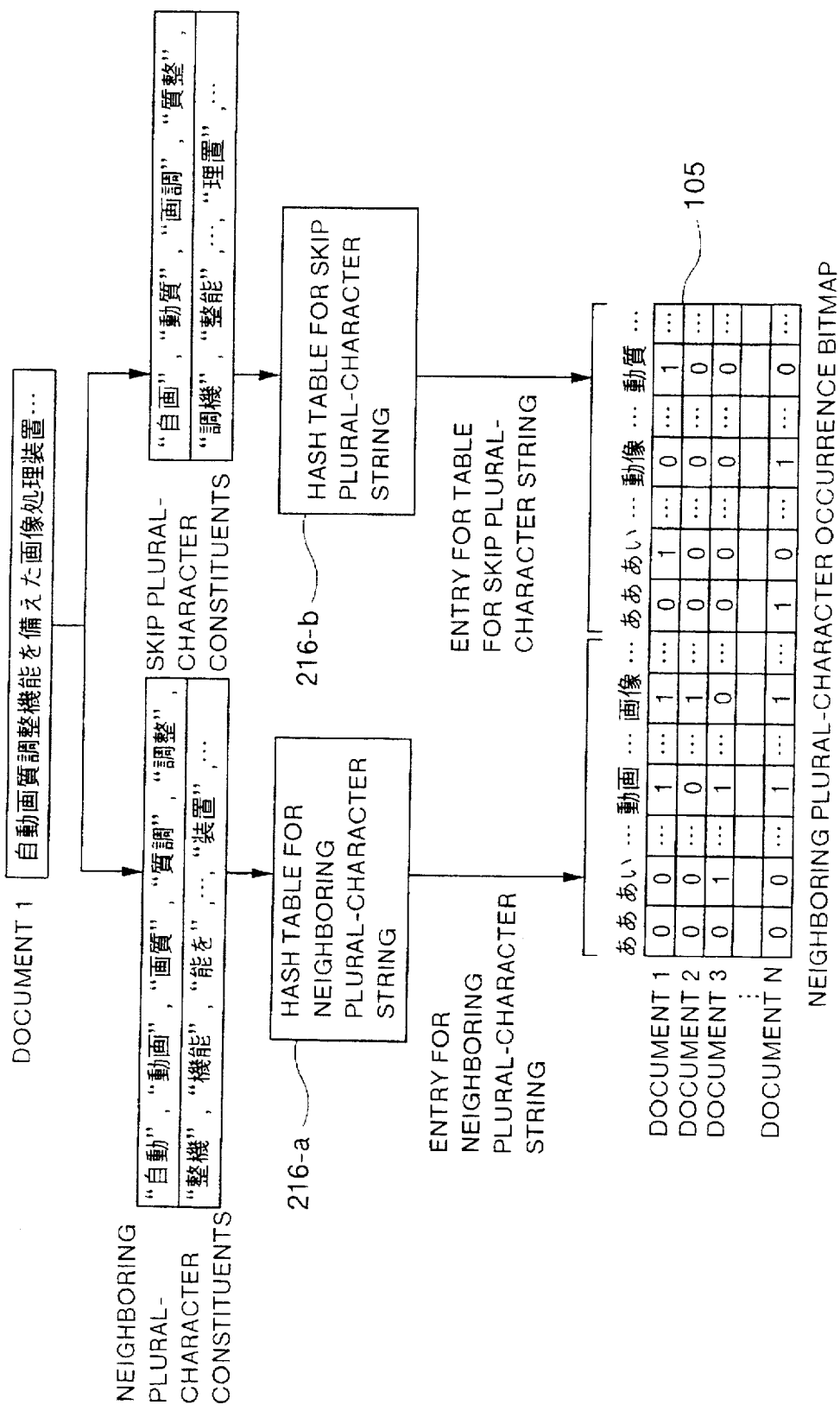
FIG. 35 is a diagram illustrating a method of forming the neighboring plural-character occurrence bitmap according to a fifth embodiment of the invention.

The adjacent plural-character string extraction program 400 extracts from the document 1 shown in FIG. 35 "自動", "動画", "画質", "質調", "調整", "整機", "機能", "能を", . . . , "た画", "画像", "像処", "処理", . . . The skip plural-character string extraction program 206 for registration extracts "自画", "動質", "画調", "質整", "調機", "整能", "機を", "能備", . . . , "た像", "画処", "像理", "処装", . . .

Lastly, the neighboring plural-character occurrence bitmap registration program 207 is activated. "1" is set to an entry corresponding to each neighboring plural-character constituent extracted by the adjacent plural-character string extraction program 400 and skip plural-character string extraction program 206, by using the hash table 216-a for adjacent plural-character strings and hash table 216-b for skip plural-character strings, to thereby indicate a presence of each neighboring plural-character constituent.

Next, the search process will be detailed.

Figure 36:
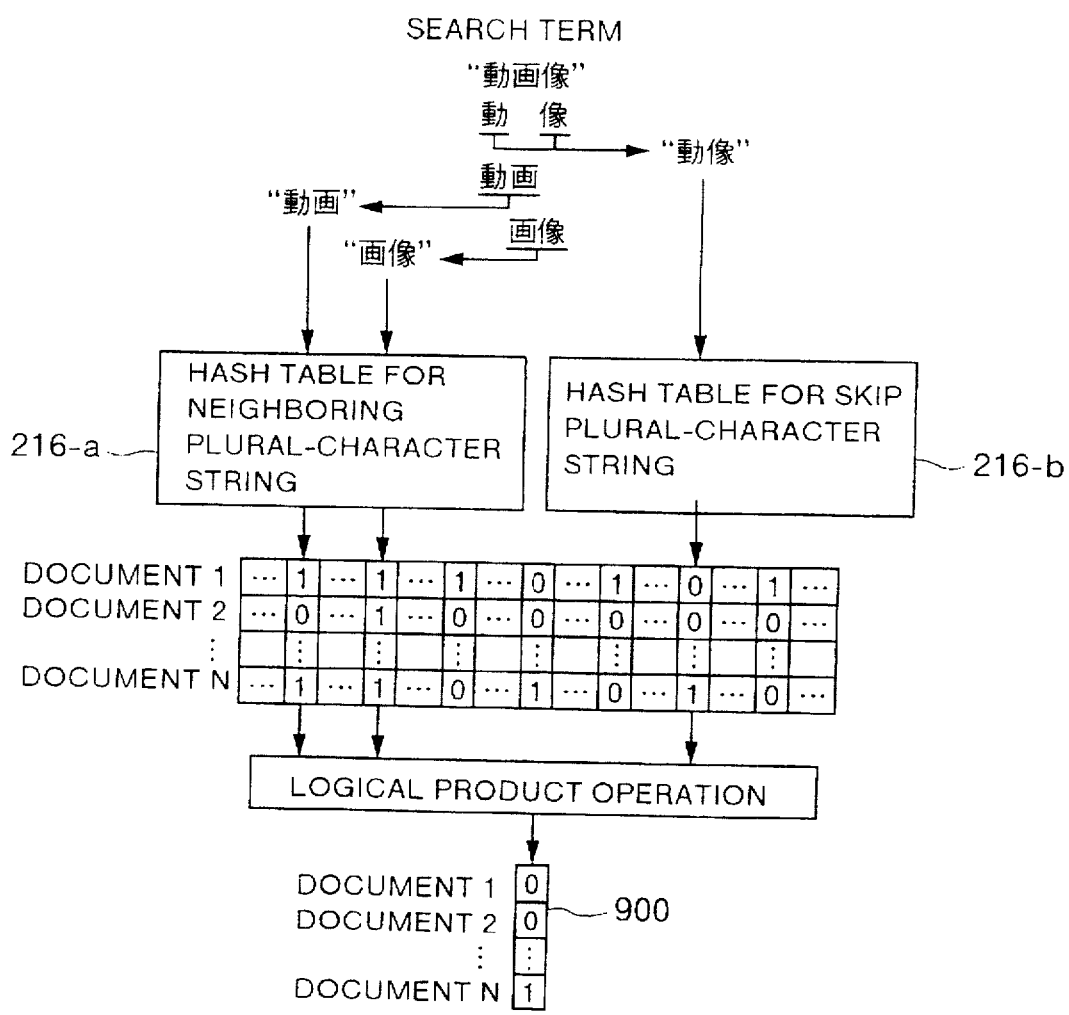
FIG. 36 is a diagram illustrating a method of searching the neighboring plural-character occurrence bitmap according to the fifth embodiment of the invention.

For example, as shown in FIG. 36, for a search term "動画像", the adjacent plural-character string extraction program 401 extracts "動画" and "画像" as the adjacent plural-character constituents. The skip plural-character string extraction program 212 for search extracts "動像" as the skip plural-character constituent. Next, the bit-and operation program 213 reads bit lists in the neighboring plural-character occurrence bitmap 105 by using the hash table 216-a for adjacent plural-character strings and the hash table 216-b for skip plural-character strings. A document having all "1" between bits between bit lists is obtained as the search results of the neighboring plural-character occurrence bitmap.

Specifically, a logical product operation is performed between bits between all read bit lists to obtain the bit-and calculation results 900. A document number corresponding to a bit "1" of the bit-and calculation results indicates a hit document as the search results of the neighboring plural-character occurrence bitmap. In the example shown in FIG. 36, the document N is a hit document.

As above, in the process of the neighboring plural-character occurrence bitmap creation and registration of this embodiment, extracted from a text when a Japanese text is registered are adjacent two-character strings (adjacent plural-character strings) and two-character strings at every second character positions (skip plural-character strings), and information of whether each plural-character constituent is present is registered in the neighboring plural-character occurrence bitmap. In a search operation, a document containing plural-character constituents of both the adjacent and skip plural character strings is searched to thereby reduce a noise during a search of the neighboring plural-character occurrence bitmap, even if a character string constituted by a combination of words is designated as a search term. For example, if "動画像", is designated as a search term, the system searches a document containing the adjacent plural-character strings of "動画" and "画像" and the skip plural-character string of "動像". If a document containing the character strings of "自動画 像質調整機能 を備えた 画像 処理装置.." in its text is registered, "動画" and "画像" are registered as the adjacent plural-character strings in the neighboring plural-character occurrence bitmap. However, "画像" is not extracted as the slip plural-character string. Therefore, noises can be reduced. In another case, if a document containing both words "angry" and "single" is registered, the adjacent plural-character strings of "ang", "ngl", and "gle" are registered in the neighboring plural-character occurrence bitmap. However, since "age" is not extracted as the skip plural-character string, noises can be reduced.

It is therefore possible to improve a search reduction rate during the search of the neighboring plural-character occurrence bitmap. Since the search amount of condensed texts during the hierarchical pre-search is reduced, the total search speed can be equivalently shortened. It is therefore possible to perform a full text search of large volume in real time.

In this embodiment, the neighboring plural-character occurrence bitmap is formed by using all character strings including Japanese kanji, hiragana, katakana, alphabet, numeral, symbol, and the like without paying attention to character classes of a Japanese language document. Therefore, even if a string such as "半導体レーザ" mixed with various character classes is designated as a search term, a search reduction rate can be improved by using neighboring plural-character constituents mixed with various character classes.

In the above embodiment, adjacent two-character strings are used for forming the neighboring plural-character occurrence bitmap. Three-character or four-character or more strings may also be used, with the same process being made possible as apparent from the foregoing description. Similarly, skip two-character strings at every second character positions are used for forming the neighboring plural-character occurrence bitmap. Character strings at every x-th (x=any integer) character positions, or three-character or four-character or more strings may also be used, with the same process being made possible as apparent from the foregoing description.

In this embodiment, the neighboring plural-character occurrence bitmap is formed by using all character strings including spaces (_), periods (.), and comma (,) without paying attention only to words. Similar to the second embodiment, a text may be segmented into words to form the neighboring plural-character occurrence bitmap, or similar to the third embodiment, a text may be segmented into words and a specified character may be added before and after each word to form the neighboring plural-character occurrence bitmap, with the same process being made possible as apparent from the foregoing description.

Next, the sixth embodiment of the invention will be described.

In the fifth embodiment of the invention, the neighboring plural-character occurrence bitmap is formed by using all character strings including Japanese kanji, hiragana, katakana, alphabet, numeral, symbol, and the like without paying attention to character classes of a Japanese language document. With this method, however, neighboring plural-character strings mixed with various character classes are registered in the neighboring plural-character occurrence bitmap. As a result, the following two types of noises are generated.

The first noise is generated if a skip plural-character string and an adjacent plural-character string respectively mixed with various character classes are hashed to the same entry of another neighboring plural-character constituent. For example, if "動画像" is designated as a search term, "動画" and "画像" are extracted as the adjacent plural-character strings and "動像" is extracted as the skip plural-character string. In this case, if a document containing the character strings "自動画 質調 整機能 を備えた 画像 処理装置..." in its text data is registered and if an entry of a skip plural-character string of "能備" is hashed to the same entry of the skip plural-character string of "動像", then this document containing the skip plural-character string of "能備" riding over a hiragana "を" is hit as a noise document containing "自<動><画>質調整機<能>を<備>えた<画><像>処理装置".

The second noise is generated when a document is hit which has the same skip plural-character constituent extracted from a search term between different character classes. Specifically, if a document containing character strings "動画" and "画像" and character strings "---感<動>の<像>を写し出す..." is registered, then the adjacent plural-character strings "動画" and "画像" and the skip plural-character string "動像" riding over a hiragana "の" are registered in the neighboring plural-character occurrence bitmap. In this case, if "動画像" is designated as a search term, the adjacent plural-character strings "動画" and "画像" and the skip plural-character string "動像" are extracted from the search term and the document is hit as a noise document.

To remove these noises, in the sixth embodiment of the invention, when a neighboring plural-character constituent is extracted, text data is divided into respective character classes, and skip plural-character constituents and adjacent plural-character constituents are extracted from these divided character strings to form a neighboring plural-character occurrence bitmap. In this manner, neighboring plural-character constituents between different character classes are not extracted, and the above two types of noises are reduced.

Figure 37:
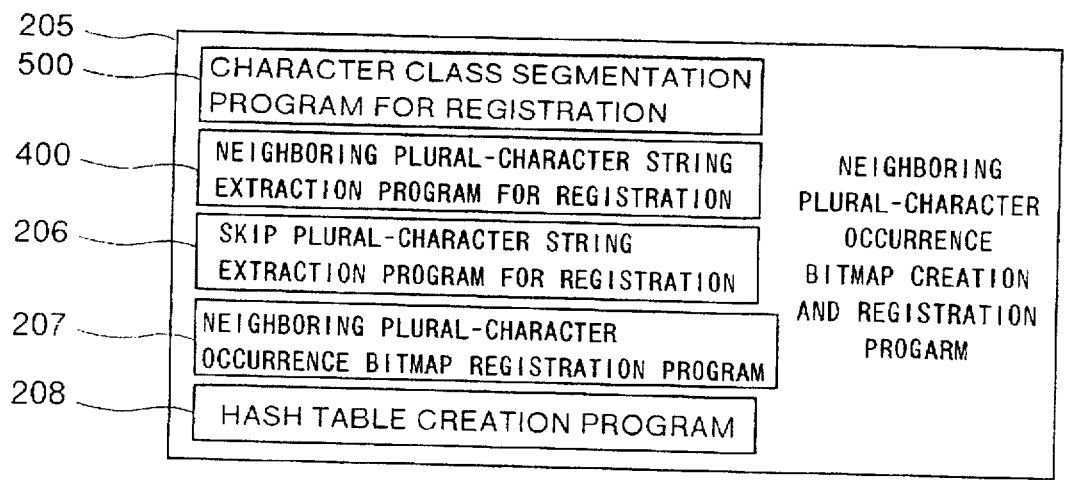
FIG. 37 is a diagram showing the structure of the neighboring plural-character occurrence bitmap creation and registration program according to a sixth embodiment of the invention.
Figure 38:
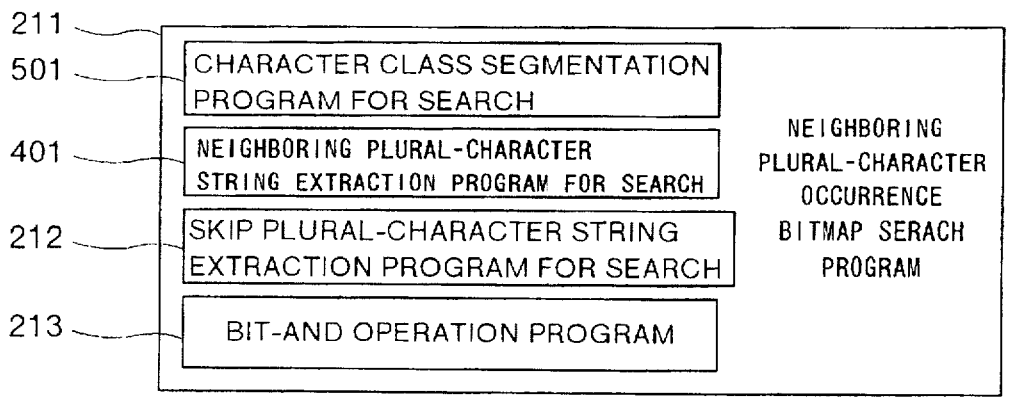
FIG. 38 is a diagram showing the structure of a neighboring plural-character occurrence bitmap search program according to the sixth embodiment of the invention.

The sixth embodiment is structured fundamentally in the same manner as the fourth and fifth embodiments, excepting that the neighboring plural-character occurrence bitmap creation and registration program 205 is configured as shown in FIG. 37 and the neighboring plural-character occurrence bitmap search program 211 is configured as shown in FIG. 38.

Specifically, the neighboring plural-character occurrence bitmap creation and registration program 205 is constituted by a character class segmentation program 500, adjacent plural-character string extraction program 400, skip plural-character string extraction program 206 for registration, neighboring plural-character occurrence bitmap registration program 207, and hash table formation program 208. The neighboring plural-character occurrence bitmap search program 211 is constituted by a character class segmentation program 501, adjacent plural-character string extraction program 401, skip plural-character string extraction program 212 for search, and a bit-and operation program 213.

Figure 39:
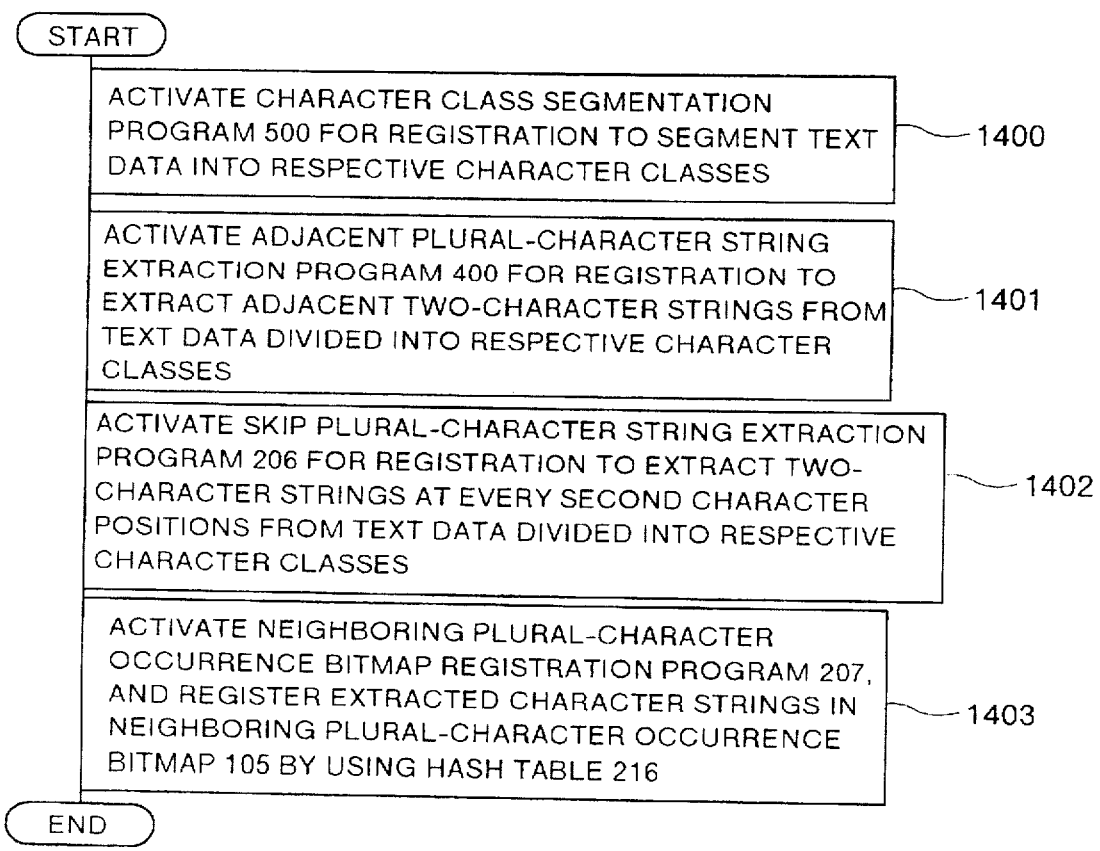
FIG. 39 is a PAD illustrating the procedure of the neighboring plural-character occurrence bitmap creation and registration program according to the sixth embodiment of the invention.

As shown in FIG. 39, the neighboring plural-character occurrence bitmap creation and registration program 205 activates at Step 1400 the character class segmentation program 500 to read text data of a text 103 stored in the magnetic disk 110 in the work area 217. The text data is divided into respective character classes.

Next, at Step 1401, the adjacent plural-character string extraction program 400 is activated, and the character class segmentation program 500 extracts adjacent two-character strings from the text data divided into respective character classes.

Thereafter, at Step 1402, the skip plural-character string extraction program 206 for registration is activated, and the character class segmentation program extracts two-character strings at every second character positions from the text data divided into respective character classes.

Lastly, at Step 1403, the neighboring plural-character occurrence bitmap registration program 207 is activated to register neighboring plural-character strings extracted by the adjacent plural-character string extraction program 400 and skip plural-character string extraction program 206 for registration in the neighboring plural-character occurrence bitmap 105 in the work area 217, by using the hash table 216. This bit map is stored in the magnetic disk 110.

Figure 40:
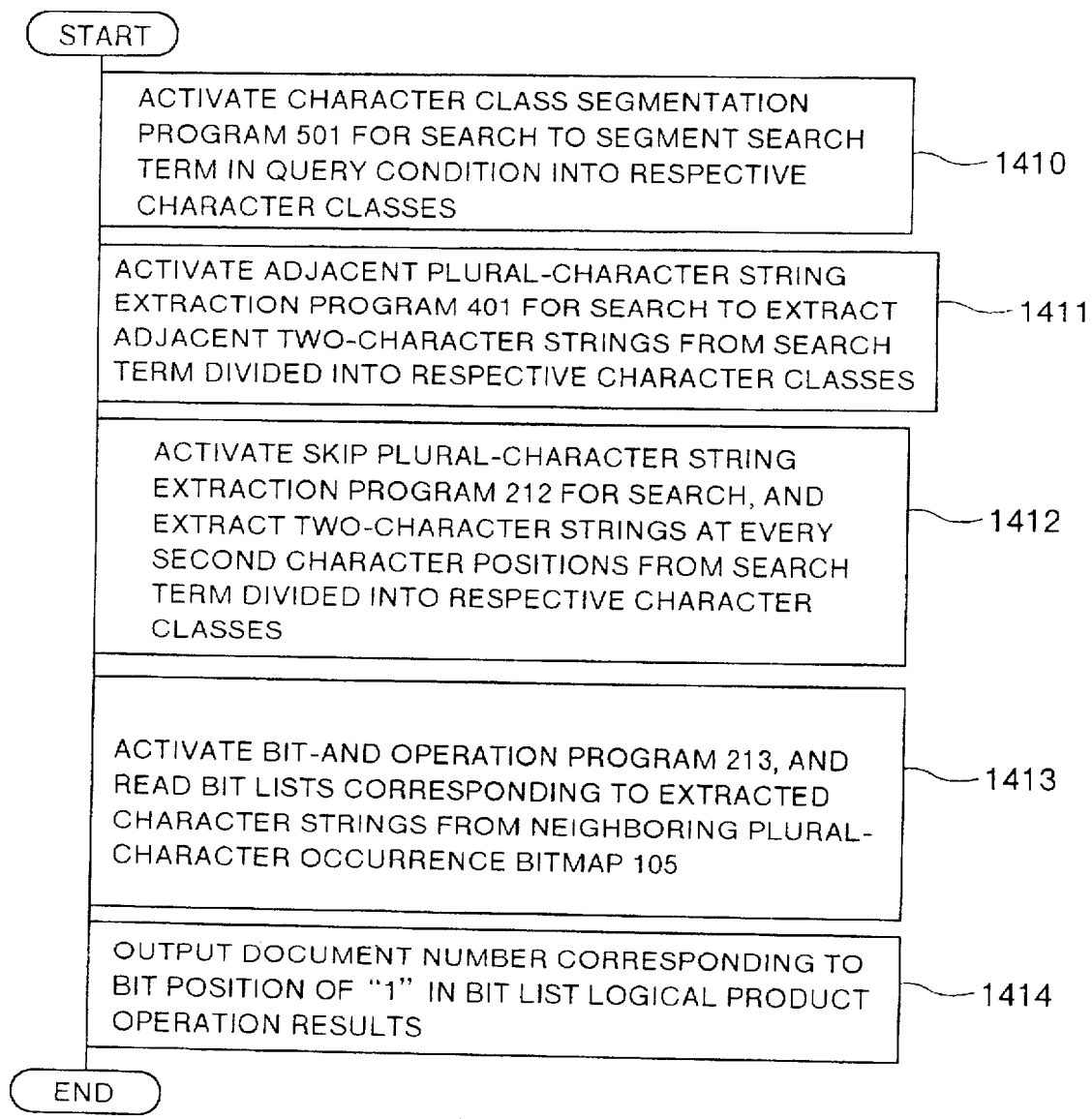
FIG. 40 is a PAD illustrating the procedure of the neighboring plural-character occurrence bitmap search program according to the sixth embodiment of the invention.

In a search operation, as shown in FIG. 40, at Step 1410, the neighboring plural-character occurrence bitmap search program 211 activates the character class segmentation program 501 to divide a search term of a query condition into respective character classes.

Next, at Step 1411, the adjacent plural-character string extraction program 401 is activated to extract all adjacent two-character strings from the search term divided into character classes by the character class segmentation program 501.

Thereafter, at Step 1421, the skip plural-character string extraction program 212 for search is activated to extract all two-character strings at every second character positions from the search term divided into character classes by the character class segmentation program 501.

Next, at Step 1413, the neighboring plural-character occurrence bitmap search program 211 activates the bit-and operation program 213 to read bit lists stored in the entries of the neighboring plural-character occurrence bitmap 105 corresponding to all the character strings extracted by the skip plural-character string extraction program 212 for search and the adjacent plural-character string extraction program 401, by using the hash table 216, and to store the bit lists in the work area 217. At Step 1414, a logical product operation is performed between bits between the read bit lists.

A document number corresponding to the logical product operation results of "1" is outputted as the search results of the neighboring plural-character occurrence bitmap.

Next, the process to be executed by the neighboring plural-character occurrence bitmap creation and registration program 205 will be detailed.

The neighboring plural-character occurrence bitmap creation and registration program 205 divides text data into respective character classes, and extracts therefrom adjacent two-character strings and neighboring two-character strings at every second character positions.

Extraction of neighboring plural-character strings will be described assuming that a text of, for example, "自動画 貿阻 整機能 を備えた 画像 処理装置" is registered.

Figure 41:
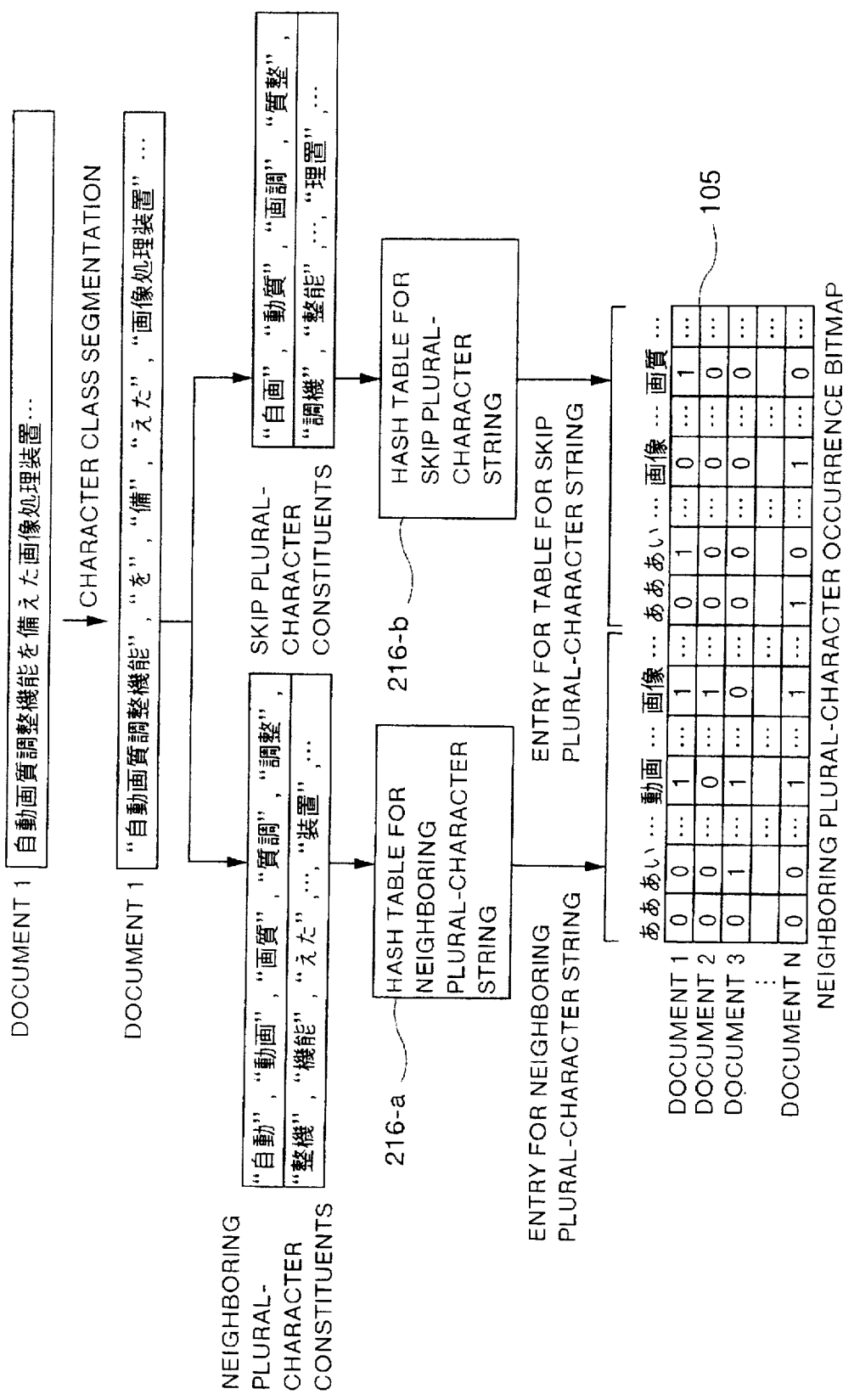
FIG. 41 is a diagram illustrating a method of forming the neighboring plural-character occurrence bitmap according to the sixth embodiment of the invention.

As shown in FIG. 41, the character class segmentation program 500 divides the document 1 into "自動画 貿阻 整機能", "を", "備", "えた", "画像 処理装置", . . .

Next, the adjacent plural-character string extraction program 400 extracts from the text data divided into respective character classes the adjacent plural-character strings including "自動", "動画", "画貿", "貿阻", "阻整", "整機", "機能", "えた", "画像", "像処", "処理", "理装", "装置", . . .

The skip plural-character string extraction program 206 for registration extracts from the text data divided into respective character classes the skip plural-character strings including "自画", "動貿", "画阻", "貿整", "阻機", "整能", "画処", "像理", "処装", "理置", . . .

Lastly, the neighboring plural-character occurrence bitmap registration program 207 is activated. "1" is set to an entry corresponding to each neighboring plural-character constituent extracted by the adjacent plural-character string extraction program 400 and skip plural-character string extraction program 206, by using the hash table 216-a for adjacent plural-character strings and has table 216-b for skip plural-character strings, to thereby indicate a presence of each neighboring plural-character constituent.

Next, a process of a search operation will be detailed.

Figure 42:
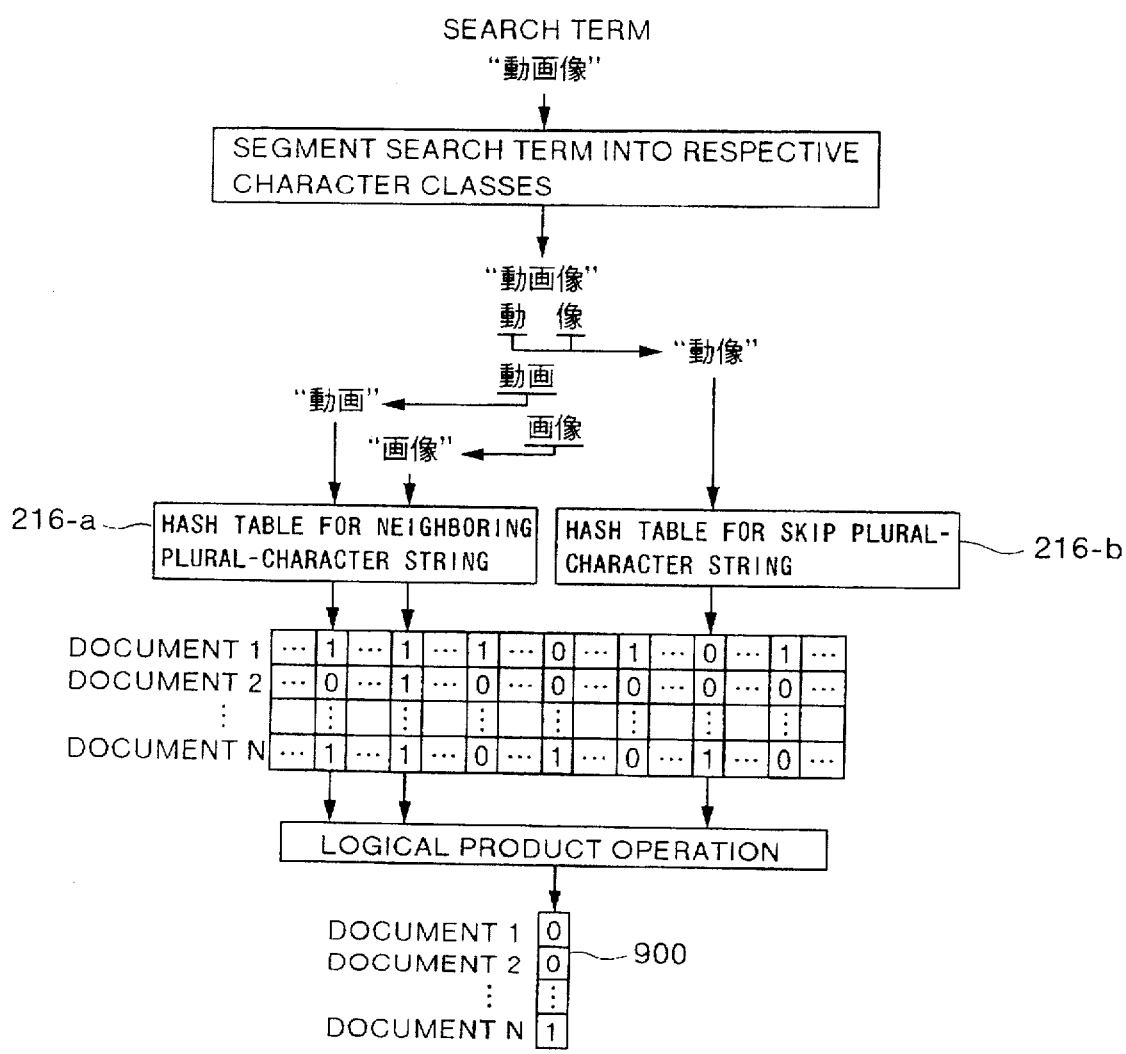
FIG. 42 is a diagram illustrating a method of searching the neighboring plural-character occurrence bitmap according to the sixth embodiment of the invention.

First, the character class segmentation program 501 divides a search term into respective character classes. In the example shown in FIG. 42, a search term is "動画像" all constituted by kanji, and so "動画像" itself is extracted.

Next, the adjacent plural-character string extraction program 400 extracts from the search term subjected to character class segmentation the adjacent plural-character strings of "動画" and "画像". Next, the skip plural-character string extraction program 212 for search extracts "動像" as the skip plural-character constituent. Then, the bit-and operation program 213 is activated to read bit lists stored in entries of the neighboring plural-character occurrence bitmap 105 by using the hash table 216-a for adjacent plural-character strings and hash table 216-b for skip plural-character strings. A document having all bits of "1" between these bit lists is obtained as the search results of the neighboring plural-character occurrence bitmap. In the example shown in FIG. 42, the document N is hit.

As above, in the process of the neighboring plural-character occurrence bitmap creation and registration of this embodiment, when a Japanese language document is registered, its text data is divided into respective character classes. Extracted from the text data divided into respective character classes are adjacent two-character strings (adjacent plural-character strings) and two-character strings at every second character positions (skip plural-character strings), and information of whether each plural-character constituent is present is registered in the neighboring plural-character occurrence bitmap. In a search operation, adjacent plural-character constituents and skip plural-character constituents are extracted from a search term divided into respective character classes. As a result, noises can be reduced which might otherwise be generated by neighboring plural-character strings and skip plural-character strings respectively between character classes registered in the neighboring plural-character occurrence bitmap.

For example, if a document containing the character strings of "動画" and "画像" and "... 感動の 像を写し出す... " in its text is registered, "動画" and "画像" are extracted as the adjacent plural-character strings in the neighboring plural-character occurrence bitmap. However, since the adjacent plural-character constituent is extracted after character strings are divided into respective character classes, the skip plural-character string "の" between character classes can be removed. As a result, if "動画像" is designated as a search term, the skip plural-character string "の" is not extracted although the adjacent plural-character strings "動画" and "画像" are extracted. The document can be deleted as a noise.

It is therefore possible to improve a search reduction rate during the search of the neighboring plural-character occurrence bitmap. Since the search amount of condensed texts during the hierarchical pre-search is reduced, the total search speed can be equivalently shortened. It is therefore possible to perform a full text search of large volume in real time.

In this embodiment, a character class segmentation method of segmenting text data and a search term in the unit of Japanese kanji, hiragana, katakana, alphabet, numeral, symbol, and the like has been described. However, a character class segmentation may not be performed between particular character classes, but adjacent plural-character constituents and skip plural-character constituents may be extracted as neighboring plural-character constituents. In this case, even if a search term of character strings mixed with various character classes is designated, a search reduction rate can be improved highly precisely by using neighboring plural-character constituents mixed with various character classes. For example, if a character class segmentation is not performed between Japanese kanji and katakana classes, character strings such as "半導体レーザ" and "磁気デスク" can be extracted highly precisely with an improved search reduction rate. Furthermore, if a character class segmentation is not performed between Japanese kanji and hiragana classes, character strings such as "日の出" and "読み込み" can be extracted highly precisely with an improved search reduction rate. In the embodiment, text data and a search term are simply divided into respective character classes. Text data and a search term may be divided by using a dictionary or a word segmentation method using Japanese language word processing, to thereafter extract adjacent plural-character constituents and skip plural-character constituents, with the same effects being obtained as apparent from the foregoing description.

In this embodiment, a method of improving a search reduction rate of documents has been described in which the neighboring plural-character occurrence bitmap is formed by using adjacent plural-character strings and skip plural-character strings. An adjacent plural-character occurrence bitmap alone may also be used after text data and a search term are divided into respective character classes. Also in this case, it is apparent that a noise which might otherwise be generated by hashing an entry of a neighboring plural-character string between character classes to the same entry of another neighboring plural-character string.

Next, the seventh embodiment of the invention will be described.

In the sixth embodiment of the invention, Japanese language text data and search terms are previously segmented into character classes, and adjacent plural-character strings and skip plural-character strings are extracted to thereby reduce a noise during the search of the neighboring plural-character occurrence bitmap. This method is associated, however, with the problem that a document having a word containing as its partial character string a word designated as a search term is hit as a noise. For example, assuming that a character string "動画像" is designated as a search term, "動画" and "画像" are extracted as the adjacent plural-character strings and "動像" is extracted as the skip plural-character string. If a document containing character strings "高速な 自動画 像処理 装置... " in its text data is registered, similarly "動画" and "画像" are extracted as the adjacent plural-character strings and "動像" is extracted as the skip plural-character string.

Therefore, a document is hit as a noise, which document contains character strings "自動画 像 処理装置" containing "動画像" as its partial character string.

To solve this problem, in the seventh embodiment of the invention, a specified character (e.g., "") is added before and after text data and a search term divided into character classes as in the document search method of the sixth embodiment. Namely, specified characters are added and a neighboring plural-character constituent is extracted being inclusive of the specified characters to form a neighboring plural-character occurrence bitmap of a specified character addition type. In this manner, a partition between words can be identified by the specified character, and a document having a word containing as its partial character string a search term can be prevented from being hit so that a noise can be reduced.

Figure 43:
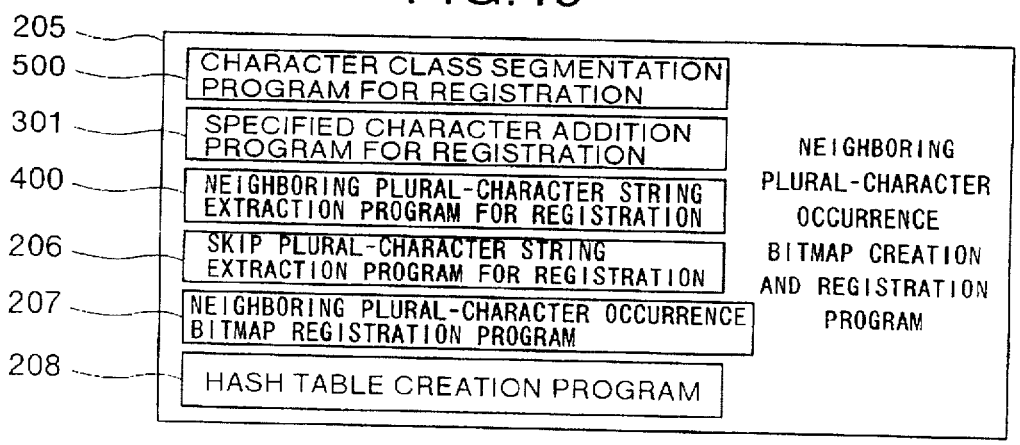
FIG. 43 is a diagram showing the structure of the neighboring plural-character occurrence bitmap creation and registration program according to a seventh embodiment of the invention.

The seventh embodiment is structured fundamentally in the same manner as the sixth embodiment, excepting that the neighboring plural-character occurrence bitmap creation and registration program 205 shown in FIG. 37 is configured as shown in FIG. 43 and neighboring plural-character occurrence bitmap search program 211 shown in FIG. 38 is configured as shown in FIG. 44.

Specifically, the neighboring plural-character occurrence bitmap creation and registration program 205 is constituted by a character class segmentation program 500, specified character addition program 301 for registration, adjacent plural-character string extraction program 400, skip plural-character string extraction program 206 for registration, neighboring plural-character occurrence bitmap registration program 207, and hash table formation program 208. The neighboring plural-character occurrence bitmap search program 211 is constituted by a character class segmentation program 501, specified character addition program 302 for search, skip plural-character string extraction program 212 for search, and bit-and operation program 213.

As shown in FIG. 43, the neighboring plural-character occurrence bitmap creation and registration program 205 activates at Step 1500 the character class segmentation program 500 to read text data of a text 103 in the magnetic disk 110 in the work area 217. The text data is divided into respective character classes.

Next, at Step 1501, the specified character addition program 301 for registration is activated to add the specified character "^" before and after each text data divided into respective character classes by the character class segmentation program 500.

At Step 1502, the adjacent plural-character string extraction program 400 is activated to extract adjacent two-character strings from the text data with the specified characters by the specified character addition program 301 for registration.

Thereafter, the skip plural-character string extraction program 206 for registration is activated to extract all two-character strings from the text data added with the specified words by the specified character addition program 301 for registration.

Lastly, at Step 1504, the neighboring plural-character occurrence bitmap registration program 207 is activated to register neighboring plural-character strings extracted by the adjacent plural-character string extraction program 400 and skip plural-character string extraction program 206 for registration in the neighboring plural-character occurrence bitmap 105 in the work area 217, by using the hash table 216. This bit map is stored in the magnetic disk 110.

Figure 46:
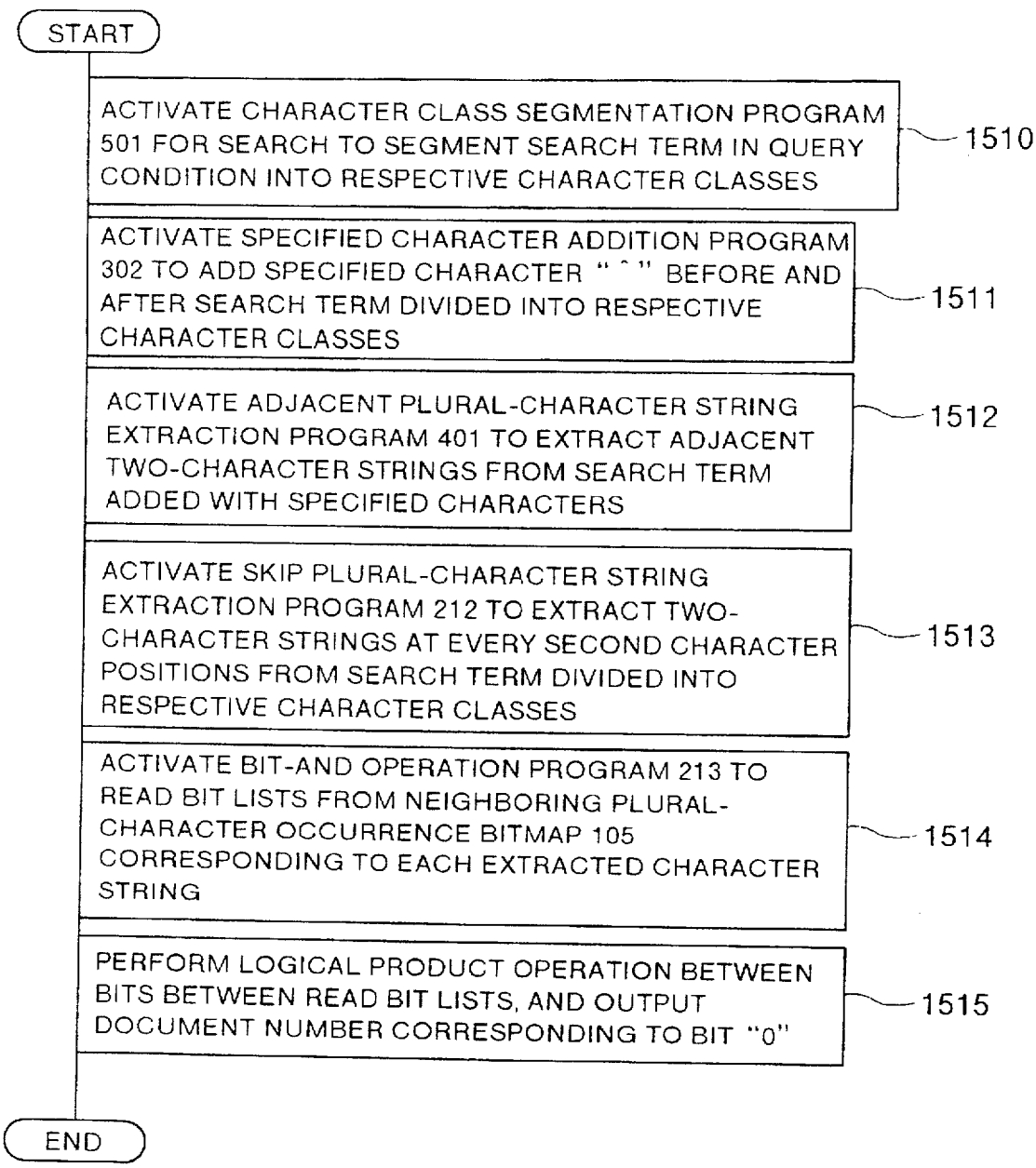
FIG. 46 is a PAD illustrating the procedure of the neighboring plural-character occurrence bitmap search program according to the seventh embodiment of the invention.

In a search operation, as shown in FIG. 46, the neighboring plural-character occurrence bitmap search program 211 activates at Step 1510 the character class segmentation program 501 to divide a search term in a query condition into respective character classes.

Next at Step 1511, the skip plural-character string extraction program 302 for search is activated to add the specified character "^" before and after the search term divided into respective character classes by the character class segmentation program 501.

Thereafter, at Step 1512, the adjacent plural-character string extraction program 401 is activated to extract all adjacent three-character strings from the search term added with the specified characters by the specified character addition program 302 for search.

At Step 1513, the skip plural-character string extraction program 212 for search is activated to extract all three-character strings at every second character positions from the search term added with the specified characters by the specified character addition program 302 for search.

Next, at Step 1514, the bit-and operation program 213 is activated to read bit lists stored in the entries of the neighboring plural-character occurrence bitmap 105 corresponding to all the character strings extracted by the adjacent plural-character string extraction program 401 and skip plural-character string extraction program 212 for search, by using the hash table 216, and to store the bit lists in the work area 217. A logical product operation is performed between bits between the read bit lists.

A document number corresponding to the logical product operation results of "1" is outputted as the search results of the neighboring plural-character occurrence bitmap.

Next, the process to be executed by the neighboring plural-character occurrence bitmap creation and registration program 205 will be detailed.

The neighboring plural-character occurrence bitmap creation and registration program 205 first divides text data into character classes to extract therefrom adjacent three-character strings and three-character strings at every second character positions.

Extraction of neighboring plural-character strings will be described assuming that a text of, for example, "高速な自動画 像処理 装置" is registered.

Figure 47:
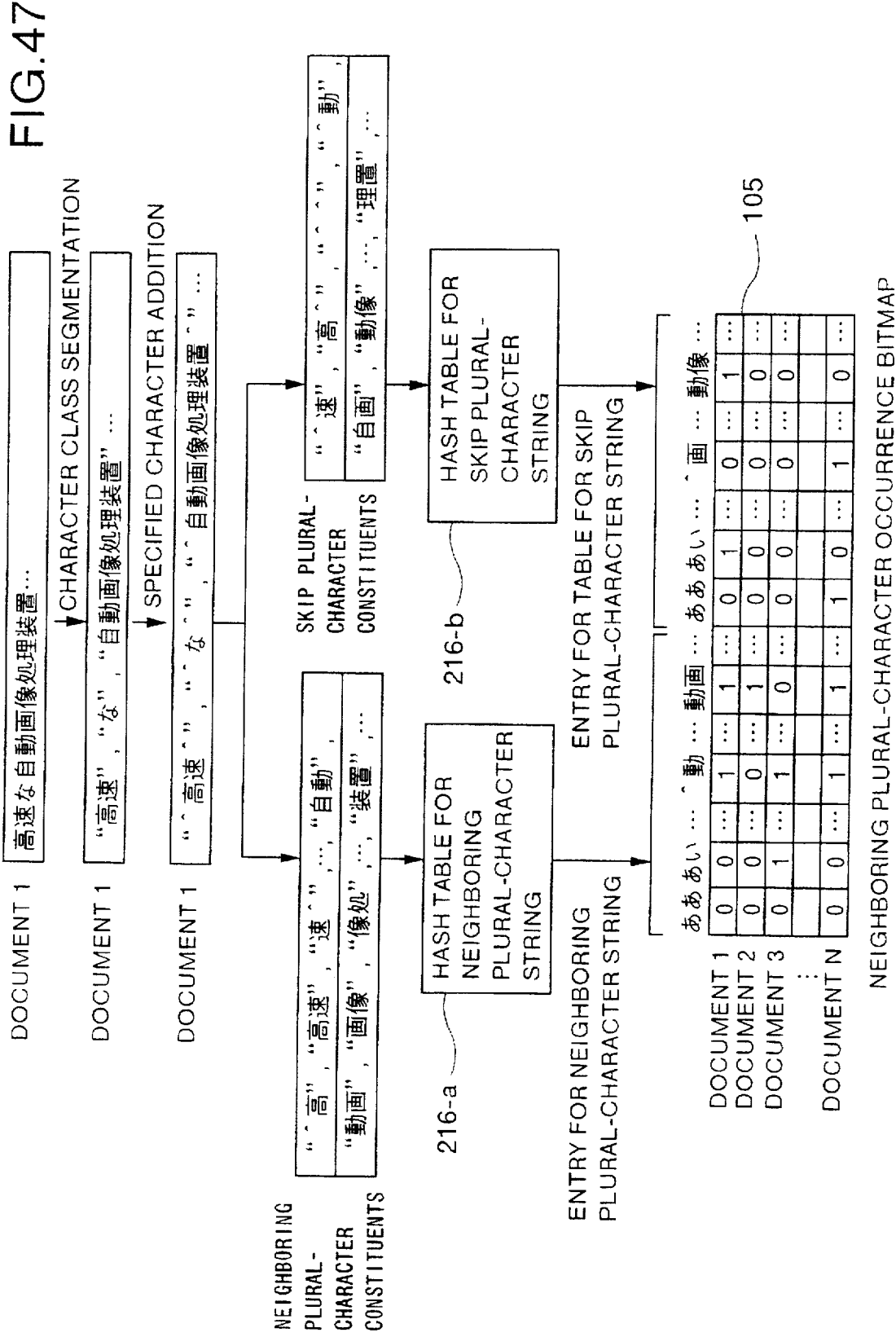
FIG. 47 is a diagram illustrating a method of forming the neighboring plural-character occurrence bitmap according to the seventh embodiment of the invention.

As shown in FIG. 47, the character class segmentation program 500 divides the document 1 into "高速", "な", "自動画 像処理 装置", . . .

Next, the specified character addition program 301 for registration adds the specified character "^" before and after each divided text data to obtain "^高速^", "^な^", "^自動画 像処理 装置^", . . .

Next, extracted from the text data with the specified character "^" by the adjacent plural-character string extraction program 400 are the adjacent plural-character constituents including "^高", "高速", "速^", "^な", "な^", "^自", "自動", "動画", "画像", "像処", "処理", "理装", "装置", . . .

Next, extracted from the text data with the specified character "^" by the skip plural-character string extraction program 206 for registration are the skip plural-character constituents including "^出す", "高^", "^動", "自画", "動像", "画処", "像理", "処置", "理^", "装^", . . .

Lastly, the neighboring plural-character occurrence bitmap registration program 207 is activated. "1" is set to an entry corresponding to each neighboring plural-character constituent extracted by the adjacent plural-character string extraction program 400 and skip plural-character string extraction program 206 for registration, by using the hash table 216-a for neighboring plural-character strings and the hash table 216-b for skip plural-character strings, to thereby indicate a presence of a neighboring plural-character constituent.

Next, the details of a search process will be given.

First, the character class segmentation program 501 divides a search term into respective character classes. In the example shown in FIG. 46, a search term is "動画像" all constituted by kanji, and so "動画像" itself is extracted.

Next, the specified character addition program 302 adds "^" before and after the search term "動画像" to obtain "^動画像^".

Figure 48:
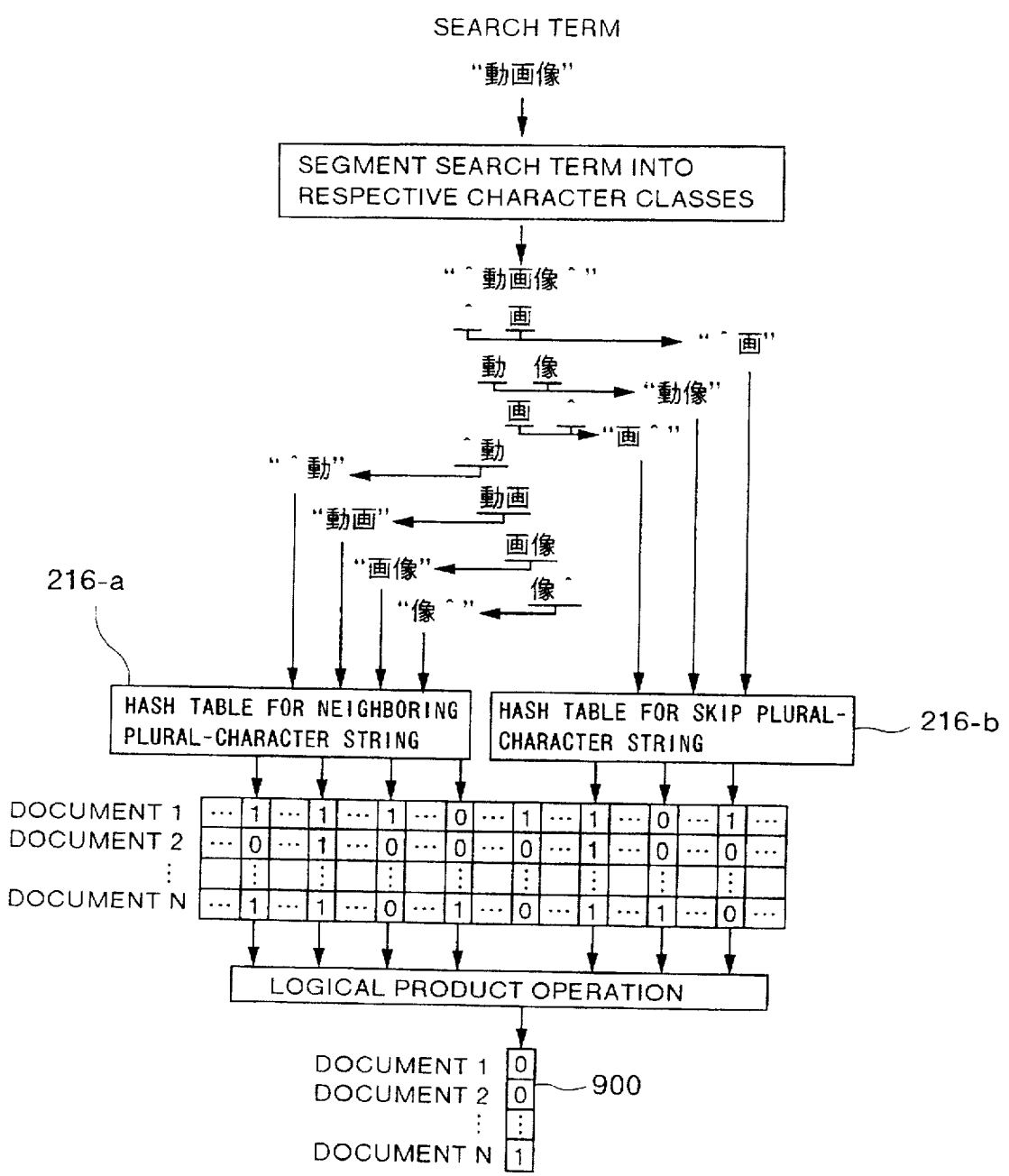
FIG. 48 is a diagram illustrating a method of searching the neighboring plural-character occurrence bitmap according to the seventh embodiment of the invention.

Next, the adjacent plural-character string extraction program 206 extracts from the search term added with the specified characters the adjacent plural-character constituents "^動", "動画", "画像", and "像^". The skip plural-character string extraction program 212 for search extracts "^画", "動像", and "画^" as the skip plural-character constituents. Then, the bit-and operation program 213 is activated to read bit lists stored in entries of the neighboring plural-character occurrence bitmap 105 by using the hash table 216-a for adjacent plural-character strings and hash table 216-b for skip plural-character strings. A document having all bits of "1" between these bit lists is obtained as the search results of the neighboring plural-character occurrence bitmap. In the example shown in FIG. 48, the document N is hit.

Specifically, when "動画像" is designated as the search term, extracted from the "^動画像^" added with the specified characters before and after the search term are the adjacent plural-character strings including "^動", "動画", "画像", and "像", and the skip plural-character strings including "^画", "動像", and "画^". However, the adjacent plural-character strings corresponding to "^動" and "像^" and skip plural-character strings corresponding to "^画" and "画" are not extracted from the document containing "自動画 像処理". Therefore, a document containing character strings "自動画 像処理" containing at its partial character train "動画像" is not hit as a noise document.

As above, in the process of the neighboring plural-character occurrence bitmap creation and registration of this embodiment, when a Japanese language document is registered, a specified character is added before and after its text data divided into respective character classes. Extracted from the text data added with the specified characters are adjacent two-character strings (adjacent plural-character strings) and two-character strings at every second character positions (skip plural-character strings), and information of whether each plural-character constituent is present is registered in the neighboring plural-character occurrence bitmap. In a search operation, after a specified character is added before and after a search term divided into character classes, adjacent plural-character constituents and skip plural-character constituents are extracted from the search term. As a result, a document containing a word containing a designated search term as its partial character string can be prevented from being hit by the middle matching, and noises can be reduced. Specifically, when a document containing character strings "自動画 像処理" in its text is registered, extracted are the adjacent plural-character strings including "^自", "自動", "動画", "画像", "像処", "処理", and "理^" and the skip plural-character strings including "^動", "自画", "動像", "画処", "像理", and "処^". If "動画像" is designated as a search term thereafter, extracted are the adjacent plural-character strings including "^動", "動画", "画像", and "の^" the skip plural-character strings including "^画", "動画", and "画^". In this case, since the adjacent plural-character strings of "^動" and "像^" and the skip plural-character strings of "^画" and "画^" are not extracted from the document containing "自動画 像処理" in its text. Therefore, this document is not hit as a noise document.

It is therefore possible to improve a search reduction rate during the search of the neighboring plural-character occurrence bitmap. Since the search amount of condensed texts during the hierarchical pre-search is reduced, the total search speed can be equivalently shortened. It is therefore possible to perform a full text search of large volume in real time.

In this embodiment, a method of improving a search reduction rate of documents has been described in which the neighboring plural-character occurrence bitmap is formed by using adjacent plural-character strings and skip plural-character strings. An adjacent plural-character occurrence bitmap alone may also be used by adding a specified character before and after text data and a search term divided into character classes and extracting therefrom adjacent plural-character strings and skip plural-character strings. Also in this case, it is apparent that a noise which might otherwise be generated by the middle matching of a word containing a designated search term as its partial character string.

Next, the eighth embodiment of the invention will be described.

In the fifth embodiment of the invention, a plurality of neighboring plural-character constituents are assigned to one entry of the neighboring plural-character occurrence bitmap to realize the bitmap having a practical capacity by using hashing. With this method, however, there is a possibility that when an entry of the bitmap is read by designating a neighboring plural-character string, a document having quite a different neighboring plural-character string may be hit. Therefore, in a large scale document search system storing a large number of documents, documents not relevant to a search term cannot be discarded properly, i.e., a search reduction rate cannot be properly improved, resulting in a low search performance.

To solve this problem, in the eight embodiment of this invention, for a neighboring plural-character constituent having a high occurrence frequency, a document number having such a constituent is stored by a bit list which is set with "1" at a bit position corresponding to the document number, and for a neighboring plural-character constituent having a low occurrence frequency, a document number having such a constituent is stored in a document number list by using binary data of the document number. In this manner, a neighboring plural-character occurrence bitmap having a practical capacity and free of search noises by hashing can be realized.

Figure 49:
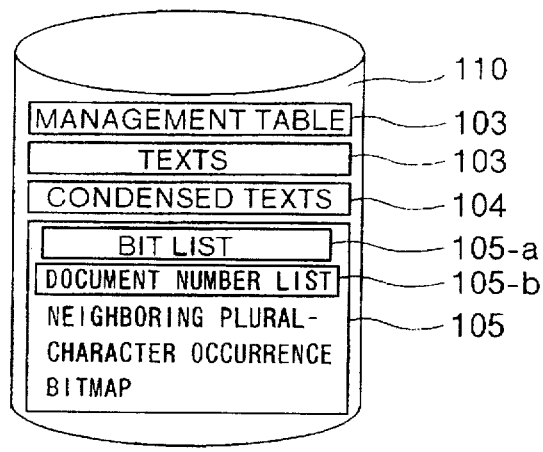
FIG. 49 is a diagram showing the structure of the neighboring plural-character occurrence bitmap according to an eighth embodiment of the invention.
Figure 50:
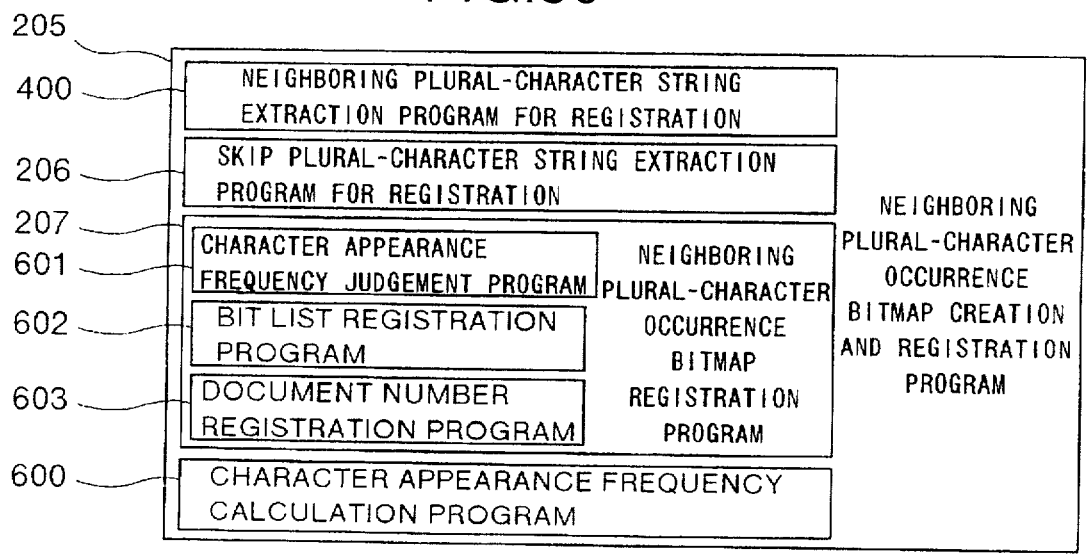
FIG. 50 is a diagram showing the structure of the neighboring plural-character occurrence bitmap creation and registration program according to the eighth embodiment of the invention.
Figure 51:
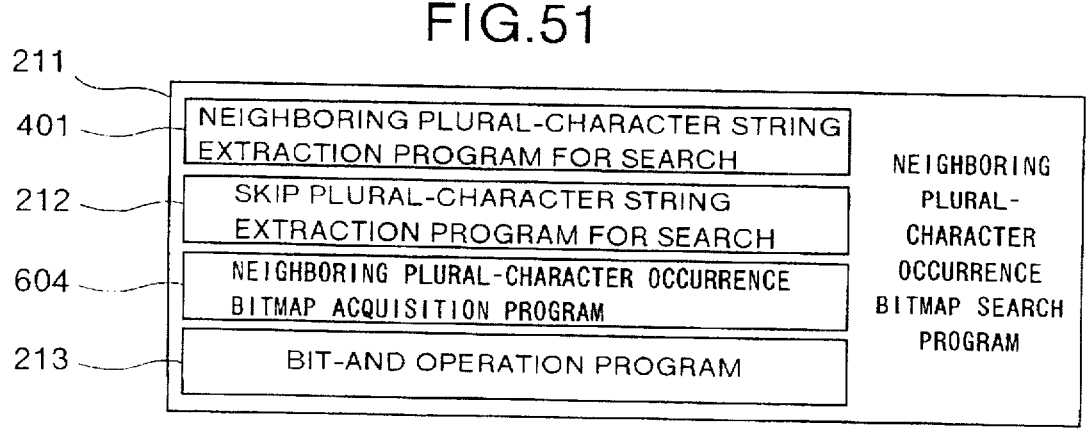
FIG. 51 is a diagram showing the structure of a neighboring plural-character occurrence bitmap search program according to the eighth embodiment of the invention.

The eighth embodiment is structured fundamentally in the same manner as the first embodiment, excepting that the neighboring plural-character occurrence bitmap 105, neighboring plural-character occurrence bitmap creation and registration program 205, and neighboring plural-character occurrence bitmap search program 211 are configured respectively as shown in FIGS. 49, 50, and 51.

Specifically, in this embodiment, the neighboring plural-character occurrence bitmap 105 is constituted as shown in FIG. 49 by a bit list 105-a and a document number list 105-b, and the neighboring plural-character occurrence bitmap creation and registration program 205 is constituted as shown in FIG. 50 by an adjacent plural-character string extraction program 400, skip plural-character string extraction program 206 for registration, neighboring plural-character occurrence bitmap registration program 207, and character occurrence frequency calculation program 600. The neighboring plural-character occurrence bitmap registration program 207 of the neighboring plural-character occurrence bitmap creation and registration program 205 is constituted by a document occurrence frequency judgement program 601, a bit list registration program 602, and a document number list registration program 603. The adjacent plural-character string extraction program 211 is constituted as shown in FIG. 51 by an adjacent plural-character string extraction program 401, a skip plural-character string extraction program 212 for search, a neighboring plural-character occurrence bitmap acquisition program 604, and a bit-and operation program 213.

The outline of a registration and search process of the neighboring plural-character occurrence bitmap of this embodiment will be described.

In this embodiment, the neighboring plural-character occurrence bitmap creation and registration program 205 first activates the character occurrence frequency calculation program 600. Text data in a text 103 is read and stored in the work area 217. Adjacent two-character strings (adjacent plural-character string) and two-character strings at every second character positions (neighboring plural-character strings) are extracted from the text data. The number of documents in which each plural-character string appears is calculated.

Figure 52:
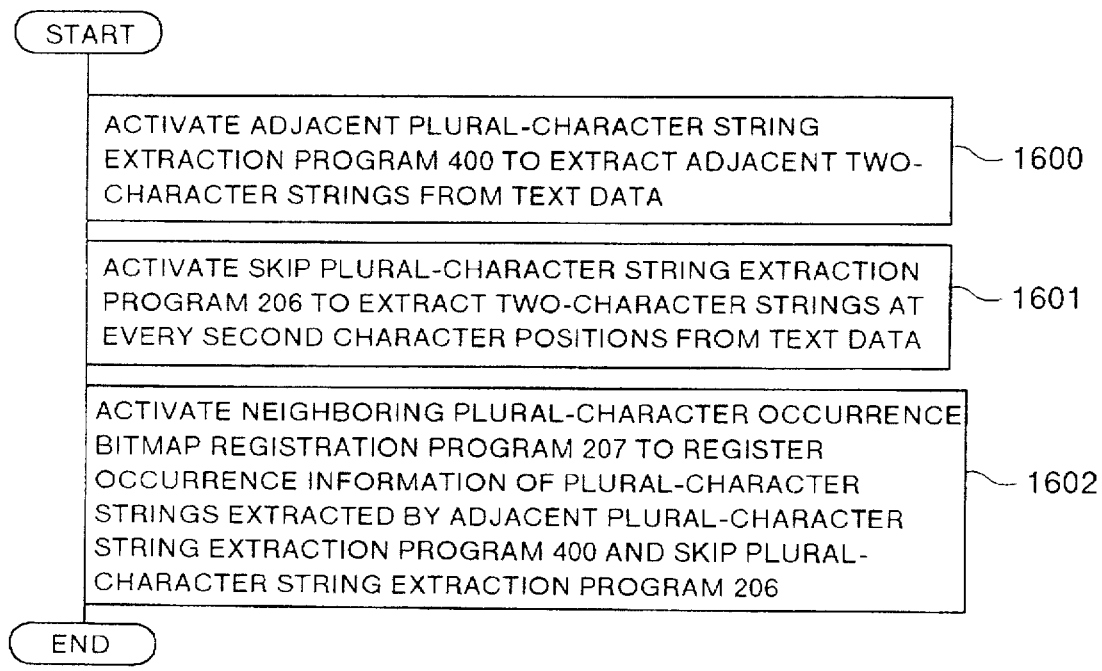
FIG. 52 is a PAD illustrating the procedure of the neighboring plural-character occurrence bitmap creation and registration program according to the eighth embodiment of the invention.

Next, as shown in FIG. 52, at Step 1600, the neighboring plural-character occurrence bitmap creation and registration program 205 activates the adjacent plural-character string extraction program 400 to extract, from a text of each document, adjacent two-character strings as the adjacent plural-character string.

At Step 1601, the neighboring plural-character occurrence bitmap creation and registration program 205 activates the skip plural-character string extraction program 206 for registration to extract, from each document, neighboring two-character string at every second character positions as the neighboring plural-character string.

At Step 1602, the neighboring plural-character occurrence bitmap creation and registration program 205 activates the neighboring plural-character occurrence bitmap registration program 207 to register an occurrence frequency of each neighboring plural-character string extracted by the adjacent plural-character string extraction program 400 and skip plural-character string extraction program 206 for registration, in the neighboring plural-character occurrence bitmap.

Figure 53:
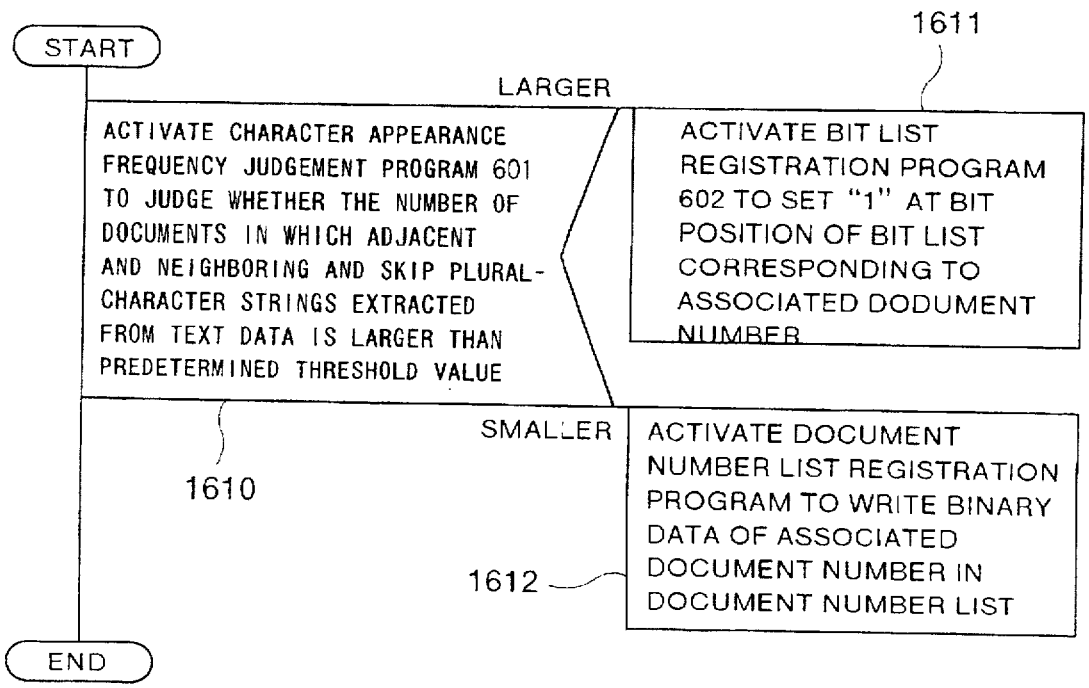
FIG. 53 is a PAD illustrating the procedure of the neighboring plural-character occurrence bitmap creation and registration program according to the eighth embodiment of the invention.
Figure 54:
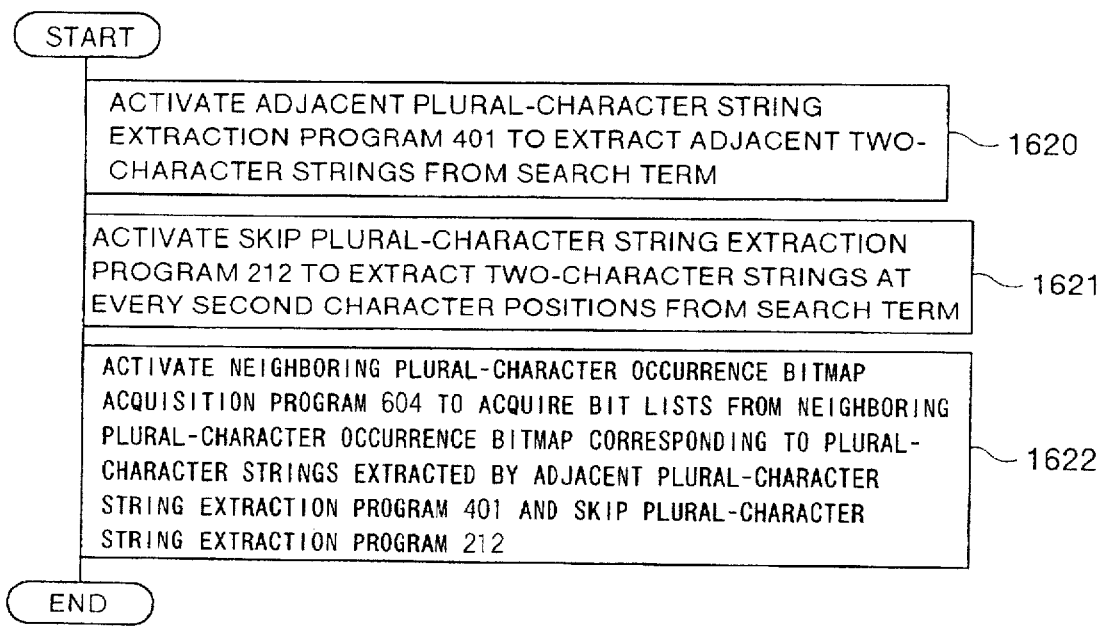
FIG. 54 is a PAD illustrating the procedure of the neighboring plural-character occurrence bitmap search program according to the eighth embodiment of the invention.
Figure 55:
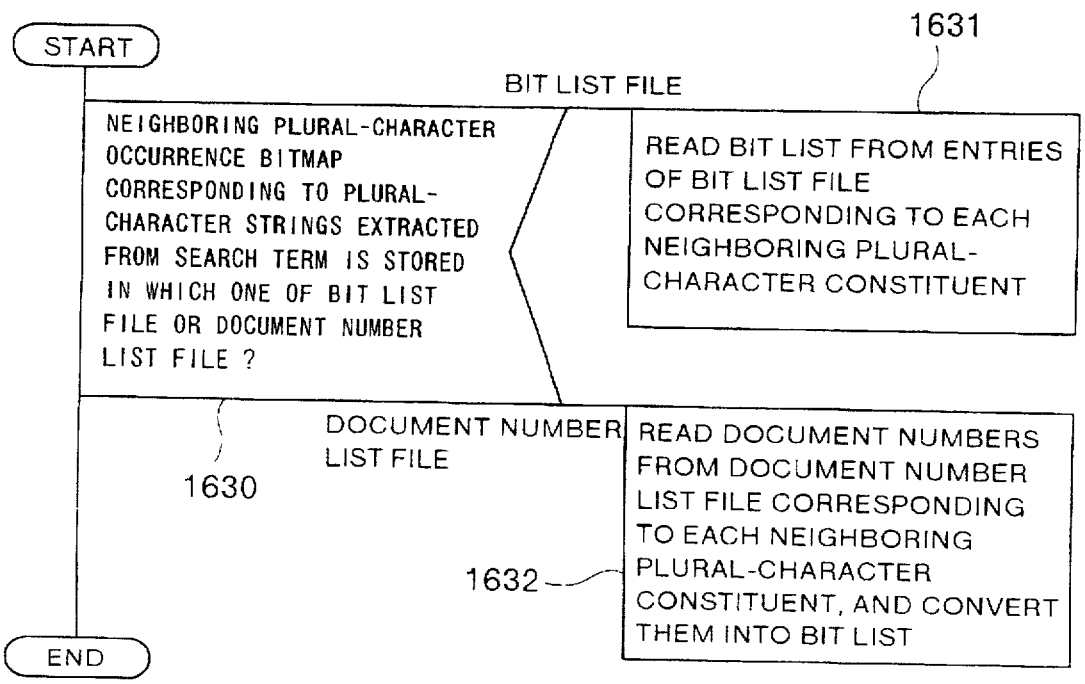
FIG. 55 is a PAD illustrating the procedure of a neighboring plural-character occurrence bitmap acquisition program according to the eighth embodiment of the invention.

Next, the outline of the process of the neighboring plural-character occurrence bitmap registration program 207 will be described with reference to FIG. 53.

At Step 1610, the neighboring plural-character occurrence bitmap registration program 207 activates the character occurrence frequency judgement program 601 to judge whether the occurrence frequency of each neighboring plural-character string extracted by the adjacent plural-character string extraction program 400 and skip plural-character string extraction program 206 for registration, is larger than a predetermined threshold value. If larger, at Step 1611, the bit list registration program 602 is activated to record occurrence information by setting "1" at a bit position of a bit list corresponding to the associated document number. If smaller, at Step 1612, the document number list registration program 603 is activated to record occurrence information by storing binary data of the associated document number in the document number list.

The outline of the registration process has been described above.

In a search operation, as shown in FIG. 52, the neighboring plural-character occurrence bitmap search program 211 activates at Step 1620 the adjacent plural-character string extraction program 401 to extract, from a search term, adjacent two-character strings as the adjacent plural-character string.

The neighboring plural-character occurrence bitmap search program 211 activates at Step 1621 the skip plural-character string extraction program 212 for search to extract, from the search term, two-character strings at every second character positions as the neighboring plural-character string.

Next, at Step 1622, the neighboring plural-character occurrence bitmap search program 211 activates the neighboring plural-character occurrence bitmap acquisition program 503. As shown in FIG. 53, at Step 1630, the neighboring plural-character occurrence bitmap acquisition program 503 judges whether each neighboring plural-character string is stored in the neighboring plural-character occurrence bitmap in the form of the bit list or document number list. If in the form of the bit list, at Step 1631, the associated bit list itself is acquired from the neighboring plural-character occurrence bitmap. If in the form of the document number list, at Step 1632, the associated document number is acquired from the neighboring plural-character occurrence bitmap and converted into a bit list by setting "1" to each bit position corresponding to each document number.

Lastly, at Step 1623, the neighboring plural-character occurrence bitmap search program 211 activates the bit-and operation program 213 to perform a logical product operation between bits between bit lists acquired by the neighboring plural-character occurrence bitmap acquisition program 604. A document number corresponding to the logical product operation results of "1" is outputted as the search results of the neighboring plural-character occurrence bitmap, to the search control program 209.

The outline of the registration and search process of the neighboring plural-character occurrence bitmap of this invention has been described above.

The details of the registration and search process of the neighboring plural-character occurrence bitmap of this embodiment will be given by using a particular example. In this embodiment, it is assumed that the total number of registered documents is one million and the document number is stored in the document number list by using 32-bit binary data.

First, a search operation will be described.

Figure 56:
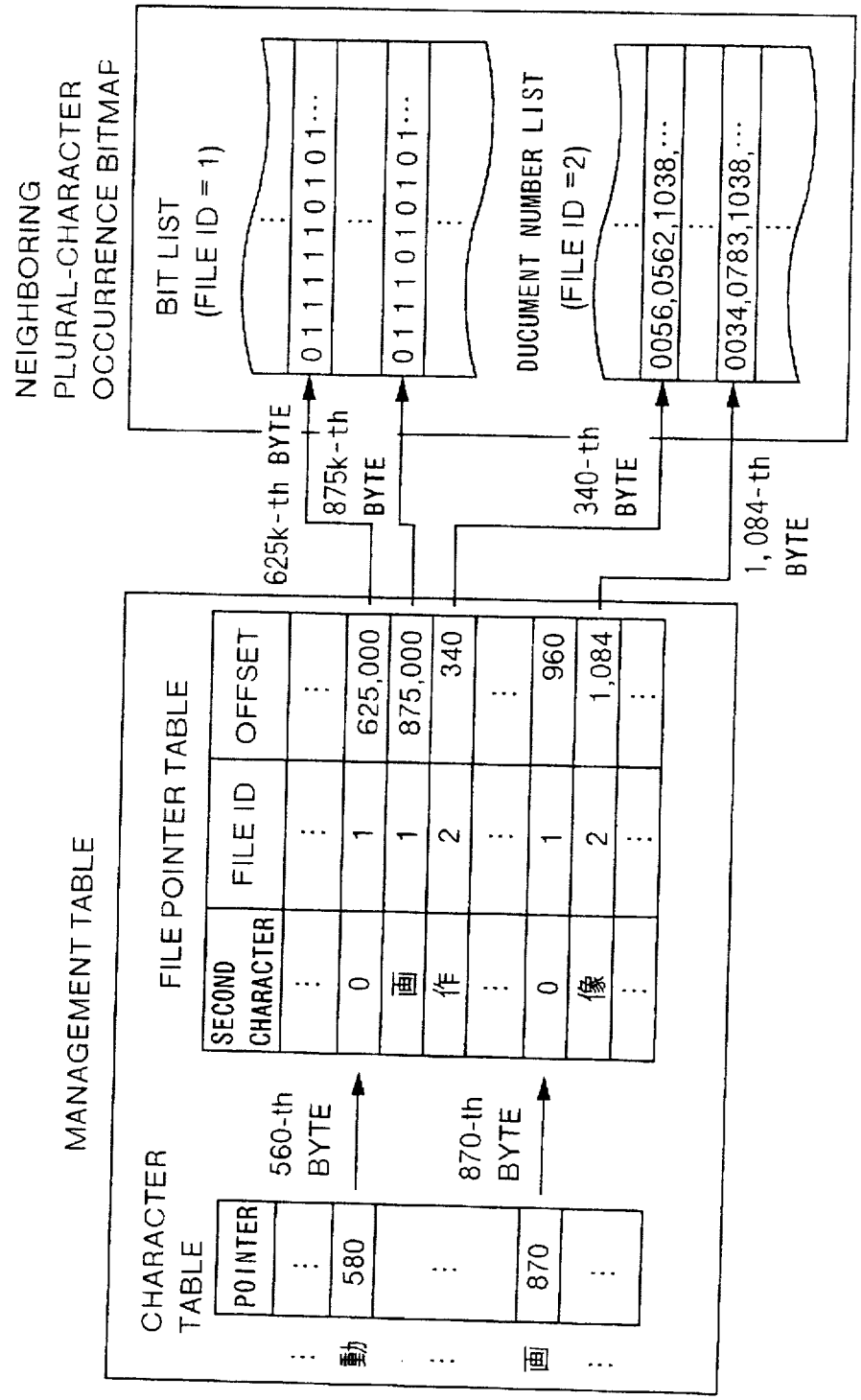
FIG. 56 is a diagram illustrating a method of searching the neighboring plural-character occurrence bitmap according to the eighth embodiment of the invention.
Figure 57:
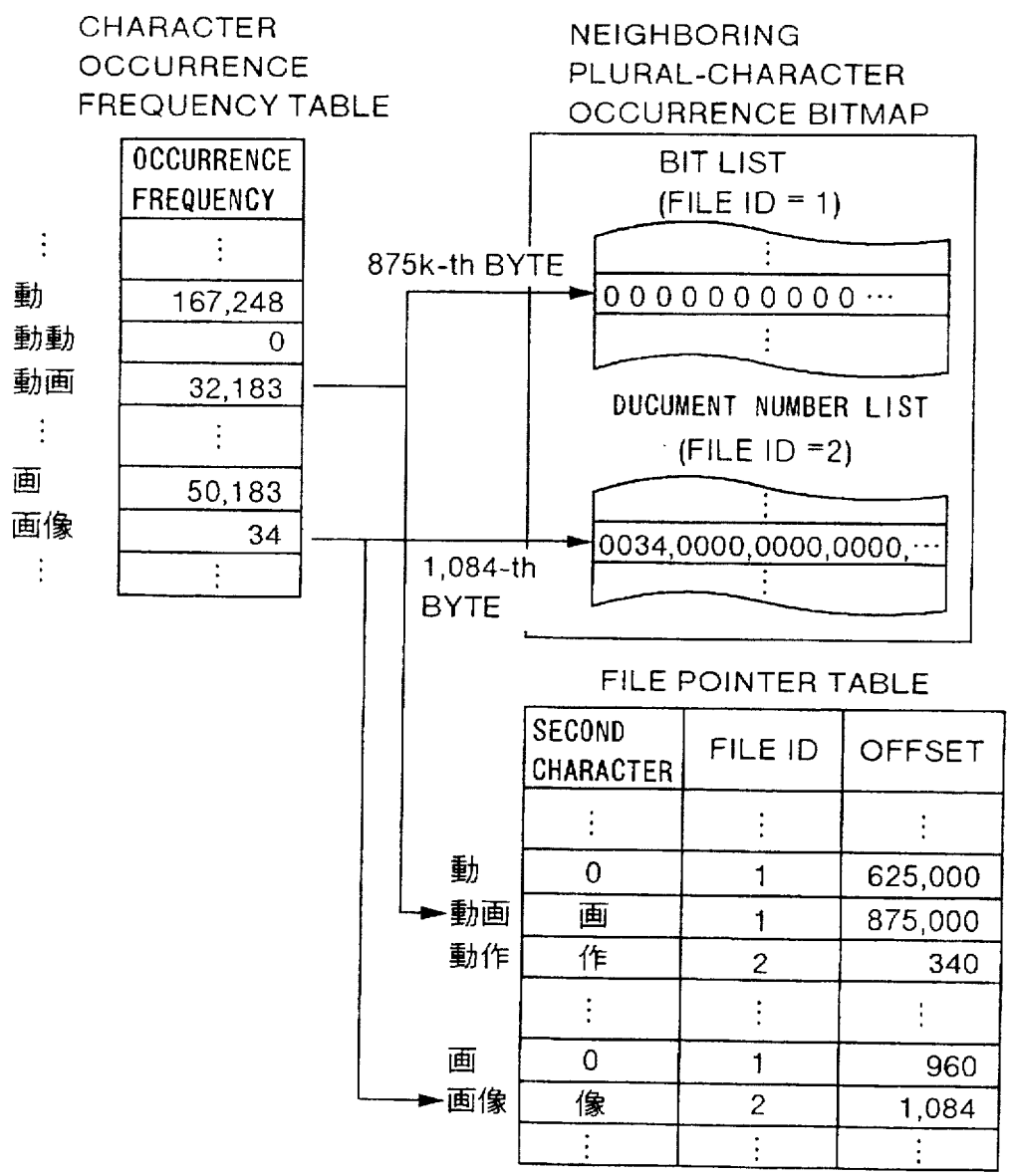
FIG. 57 is a diagram illustrating a method of forming the neighboring plural-character occurrence bitmap according to the eighth embodiment of the invention.

In this embodiment, in order to acquire bit lists of a neighboring plural-character constituent extracted from a search term from the neighboring plural-character occurrence bitmap, a management table including a character table and a file pointer table is used. FIG. 56 illustrates the outline of a search process using the character table and file pointer table.

As described previously, in searching the neighboring plural-character occurrence bitmap, the neighboring plural-character occurrence bitmap search program 211 first activates the adjacent plural-character string extraction program 401 to extract, from a search term, adjacent two-character strings as the adjacent plural-character string. For example, if a character string "動画像" is designated as a search term, "動画" and "画像" are extracted as the adjacent plural-character string.

The skip plural-character string extraction program 212 for search is then activated to extract, from the search term, two-character strings at every second character positions as the skip plural-character string. For example, when a character string "動画像" is designated as a search term, "動像" is extracted as the skip plural-character string.

For the simplicity of description, the registration and search process of an adjacent plural-character occurrence bitmap is mainly explained hereinunder. Similar processes are used for a skip plural-character occurrence bitmap.

Next, the neighboring plural-character occurrence bitmap acquisition program 604 refers to a record of the character table corresponding to a character code of the first character of the neighboring plural-character string extracted from the search term, and obtains pointer information to a file pointer table. For example, in the case of the "動画", a record of the character table corresponding to the first character code of "動" is referred to to obtain pointer information 560 to the file pointer table.

Next, in accordance with the pointer information obtained by referring to the character table, the file pointer table is referred to to obtain a file identifier (ID) of the neighboring plural-character occurrence bitmap and intra-file information (offset from the file start position). In the example shown in FIG. 56, in accordance with the pointer information "560" obtained by referring to the character table, records after the 560-th byte from the top of the file pointer table are referred to to search a record having the second character of "■". With the above processes, the file ID of "1" and the offset of "1034" are obtained as information for searching "動画" in the neighboring plural-character occurrence bitmap. The first record of the file pointer table corresponding to each start character is a record for the second character of "0" stored in which are a file ID and an offset for accessing a single-character occurrence bitmap corresponding to the first character. In the example shown in FIG. 56, stored in the 580-th byte of the file pointer table are a file ID and offset for a single-character occurrence bitmap for the first character "動". With this arrangement, if the second character "■" is not referred but the "0" record is referred as the second character, it means that the neighboring plural-character string "動■" is not present in text data.

Next, in accordance with the file ID and offset obtained by referring to the file pointer table, a file of the neighboring plural-character occurrence bitmap corresponding to the associated neighboring plural-character constituent is acquired. In this embodiment, a bit list file ID and a document number file ID are determined in advance. Therefore, it is possible to judge from the file ID whether the neighboring plural-character occurrence bitmap for each neighboring plural-character string is constituted by a bit list or a document number list. Specifically, in the example shown in FIG. 56, a file having a file ID=1 indicates a bit list file, whereas a file having a file ID=2 indicates a document number list file. If a file ID for a designated neighboring plural-character string is "1", a bit list corresponding in bit number to the number of registered documents is read from the offset position. If a file ID for a designated neighboring plural-character string is "2", first the number of documents (occurrence document number) in which the associated neighboring plural-character string appears is read from the associated offset number of the file "2", and next the document numbers corresponding to the occurrence document number are read to read a list of document numbers in which the associated neighboring plural-character string appears. Thereafter, the read document number list is converted into a bit list to obtain the neighboring plural-character occurrence bitmap corresponding to the associated neighboring plural-character string.

In the example shown in FIG. 56, a file ID of "1" and an offset of 875,000 are obtained as access information to the neighboring plural-character occurrence bitmap corresponding to the neighboring plural-character string "動画". Therefore, a bit list "0111010101 . . . " corresponding in bit number to 125 Kbyte (=1,000,000 bits) which is the number of registered documents, is read from the 876-th byte of the file "1". This bit list or bit train indicates that each bit "1" therein shows a document at a corresponding document number containing a neighboring plural-character string "動画". Obtained for the neighboring plural-character occurrence bitmap corresponding to the neighboring plural-character string "画像", are a file ID of "2" and an offset of 1084. Therefore, the 1084-th byte from the start of the file "2" is referred to to read the number of documents which contain the neighboring plural-character string "画像". The number of documents is "34". Then, the "34" document numbers are read from the document number list which are 783, 1038, . . . In accordance with these document numbers, "1" is set at each bit position corresponding to the document number to convert the document numbers into a bit train.

Lastly, the bit-and operation program 213 performs a logical product operation between bits between all bit lists. A document having the logical product results of "1" is outputted as the search results of the neighboring plural-character occurrence bitmap.

The search process of the neighboring plural-character occurrence bitmap of this embodiment has been described above.

The registration process of the neighboring plural-character occurrence bitmap realizing such search and the method of creating the character table and file pointer table will be described. In this embodiment, it is assumed that the total number of registered documents is one million and the document number is stored in the document number list by using 32-bit binary data. Therefore, the character occurrence frequency threshold value used is 31,250 (one billion bits divided by 32 bits per one document).

First, a method of calculating the number of documents in which each neighboring plural-character constituent appears will be described. The number of documents in which each neighboring plural-character constituent appears is calculated by using a character appearance frequency table for the neighboring plural-character occurrence bitmap. First, all data in the character appearance frequency table is initialized to "0". Next, text data for each document is read from a text 103 and stored in the work area 217 to extract from the text data two-character strings. "1" is added to the associated data of the character appearance frequency table corresponding to a character code of the extracted two-character string. In this manner, the number of documents (occurrence document number) in which each neighboring plural-character constituent appears is calculated. Extracted for text data of "自動画 質調 整機能 を備えた 画像 処理装置. . . " are "自動", "動画", "画質", . . . , and "1" is added to the associated data of the character appearance frequency table corresponding to a character code of the extracted two-character string, to thereby calculate the number of documents among all registered documents in which each neighboring plural-character constituent appears.

Next, each neighboring plural-character string which has a value of the character appearance frequency table other than "0" is extracted to extract each neighboring plural-character string appeared in the text data.

Specifically, since the value of the character appearance frequency table for "動" is "0", this neighboring plural-character string is not extracted because it does not appear in the text data.

Since the value of the character appearance frequency table for "動画" is not "0", this neighboring plural-character string is extracted as a string appeared in the text data. In this case, since the occurrence document number is larger than the threshold value of 31,250, an area of 125 Kbyte (=1,000,000 bits) corresponding to the number of registered documents is allocated in the bit list. Written in the file pointer table are the second character "■", the bit list file ID "1", and the offset 875,000 which corresponds to the start offset of the area allocated in the bit list.

Further, since the value of the character appearance frequency table for "画像" is not "0", this neighboring plural-character string is extracted as a string appeared in the text data. In this case, since the occurrence document number is smaller than the threshold value of 31,250, the occurrence document number of "56" is written in the document number list and an area of 136 bytes (4 bytes per document divided by 34 documents) corresponding to the occurrence document number is allocated in the document number list. Written in the file pointer table are the second character "動", the document number list file ID "2", and the offset 1,084 which corresponds to the start offset of the area allocated in the document number list.

As above, in this embodiment, the areas for storing the bit list and document number list for each neighboring plural-character string are allocated in advance to prepare for registering the neighboring plural-character occurrence bitmap.

Next, the registration process of the neighboring plural-character occurrence bitmap will be described assuming that a character string "動画像" appears in text data of the document number "783".

First, text data for each text 103 is read into the work area 217 to extract adjacent two-character strings therefrom, the extracted adjacent two-character strings being "動画" and "画像". Next, similar to a search of the neighboring plural-character occurrence bitmap, the character table and file pointer table are referred to to obtain the file ID and offset in which each neighboring plural-character string is stored. For example, obtained for the neighboring plural-character string "動画" are a file ID of "1" and an offset of 875,000. A bit list train corresponding to one million documents, i.e., 125 Kbytes is read from the 875-th Kbyte of the bit list of the file ID "1", and "1" is set at a bit position of the bit list train corresponding to the document number "783", to thereby indicate an appearance of a character string "動画" in the document number "783". Similarly, for the neighboring plural-character string "画像", the character table and file pointer table are referred to to obtain a file ID of "2" and an offset of 1,084. The 1,084-th byte of the document number list of the file ID "2" is referred to to obtain information of the number of occurrence documents in which "画像" appears. The "34" document numbers are read from the document number list. Of these numbers, binary data of 783 is written in an entry of first appearing "0", to thereby indicate an appearance of a character string "画像" in the document number "783".

The registration process of the neighboring plural-character occurrence bitmap of this embodiment has been described above.

As above, the neighboring plural-character occurrence bitmap of this embodiment stores appearance information of a neighboring plural-character string of a high appearance frequency in the bit list, and appearance information of a neighboring plural-character string of a low appearance frequency in the document number list. With this arrangement, a neighboring plural-character occurrence bitmap of practical capacity can be realized which does not generate a noise to be caused by hashing.

In this embodiment, for the pre-process of the registration process, an appearance frequency of each neighboring plural-character constituent is calculated by referring to text data of all registered documents, and the areas of the bit list and document number list are allocated. However, by using statistics information, a bit list may be allocated in advance to a neighboring plural-character string judged to have a high appearance frequency, and a capacity suitable for the appearance document number may be allocated to a neighboring plural-character string judged to have a low appearance frequency. In this case, the appearance frequency calculation program is not needed.

In this embodiment, a method of storing appearance information of each neighboring plural-character string in the bit list for high appearance frequency and in the document number list for low appearance frequency is applied to the fifth embodiment. However, this method may be obviously applied to all other embodiments described so far.

Lastly, in this embodiment, a method of performing the registration process of the neighboring plural-character occurrence bitmap once for one million documents has been described. Instead, a bit list and document number list may be formed for text data of a set of ten thousands documents, and thereafter respective bit lists and document number lists may be merged to form a neighboring plural-character occurrence bitmap for one billion documents. In this case, tables used when the neighboring plural-character occurrence bitmap is formed require only a small capacity. Accordingly, even a computer having a small memory capacity can register documents while shortening a registration time.

What is claimed is:

1. A document search method in a data base of stored documents comprising the steps of:

extracting a partial character string in a predetermined form from each of the stored documents;

creating a neighboring plural-character occurrence bitmap for indicating whether each of said documents contains any of said partial character strings;

extracting a search term partial character string in a predetermined form from a search term inputted for searching for a desired document from said stored documents; and referring to said neighboring plural-character occurrence bitmap for said extracted search term partial string to search if any of said stored documents contains said search term partial character string, and to discard any of said stored documents not containing said search term partial character string.

wherein:

said partial character string and said search term partial character string comprise predetermined n-character strings selected from predetermined (m+1)-th character positions from each of said stored documents and exclude intermediate elements between said predetermined (m+1)-th character positions where n is an integer of 2 or larger and m is an integer of 1 or larger.

2. The document search method according to claim 1, wherein said extracting said partial character string from each of said documents further comprises segmenting each of said documents into words.

3. The document search method according to claim 2, wherein said partial character string is extracted from each of said segmented words; and said search term partial character string is extracted from said search term.

4. The document search method according to claim 2, further comprising adding a predetermined code before and after each of said segmented words; and, extracting said partial character string from each of said segmented words added with said predetermined codes.

5. The document search method according to claim 4, further comprising adding said predetermined code before and after said search term; and extracting said search term partial character string from said search term added with said predetermined codes.

6. The document search method according to claim 1, wherein:

character strings of predetermined consecutive i-character strings and character strings of predetermined n-character strings at every predetermined (m+1)-th character positions are extracted from each of said segmented words, as said partial character strings, where i is an integer of 2 or larger, n is an integer of 2 or larger, and m is an integer of 1 or larger; and character strings of predetermined consecutive i-character strings and character strings of predetermined n-character strings at every predetermined (m+1)-th character positions are extracted from said search term, as said search term partial character strings, where i is an integer of 2 or larger, n is an integer of 2 or larger, and m is an integer of 1 or larger.

7. The document search method according to claim 6 further comprising segmenting each of said documents into words before extracting said partial character string from each of said documents, extracting said partial character strings of predetermined consecutive i-character strings and character strings of predetermined n-character strings at every predetermined (m+1)-th character positions from each of said segmented words, where i is an integer of 2 or larger, n is an integer of 2 or larger, and m is an integer of 1 or larger; and extracting said search term partial character strings of predetermined consecutive i-character strings and character strings of predetermined n-character strings at every predetermined (m+1)-th character positions from said search term, where i is an integer of 2 or larger, n is an integer of 2 or larger and m is an integer of 1 or larger.

8. The document search method according to claim 7, further comprising adding a predetermined code before and after each of said words segmented from each of said documents;

extracting said partial character string from each of said segmented words added with said predetermined codes;

adding said predetermined code before and after said search term; and, extracting said search term partial character string from said search term added with said predetermined codes.

9. The document search method according to claim 7 wherein said segmenting comprises segmenting each of said documents into words in respective character classes;

said extracting said search term partial character strings from said search term comprises segmenting said search term into words in respective character classes;

wherein said character string of predetermined consecutive i-character strings is extracted from said words segmented from each of said documents, as said partial character string, where i is an integer or 2 or larger; and said character string of predetermined n-character strings at every predetermined (m+1)-th character position are extracted from said words segmented from said search term, as said search term partial character string, where n is an integer of 2 or larger and m is an integer of 1 or larger.

10. The document search method according to claim 9, wherein when each of said documents is segmented into words and when said search term is segmented into words or words are detected from said search term, division into said words is performed only when two consecutive character classes take a particular combination.

11. The document search method according to claim 7, wherein said segmenting comprises segmenting each of said documents into words in respective character classes;

adding a predetermined code before and after said words segmented from each of said documents;

extracting a partial character string of predetermined consecutive i-character strings and character strings of predetermined n-character strings at every predetermined (m+1)-th character positions from each of said segmented words, where i is an integer of 2 or larger, n is an integer of 2 or larger, and m is an integer of 1 or larger;

detecting words from said search term in respective classes;

adding said predetermined code before and after each of said words of said search term; and extracting a search term partial character string of predetermined consecutive i-character strings from said search term where m is an integer of 2 or larger.

12. The document search method according to claim 7, wherein said segmenting comprises segmenting each of said documents is segmented into words in respective character classes;

wherein a character string of predetermined consecutive m-character strings is extracted from said words segmented from each of said documents, as said partial character string, where m is an integer of 2 or larger;

in extracting said search term partial character string from said search term, segmenting said search term into words in respective character classes; and wherein said character string of predetermined consecutive m-character strings is extracted from said words segmented from said search term, as said search term partial character string.

13. A document search method according to claim 7, wherein;

in segmenting each of said documents into words, each of said documents is segmented into words in respective character classes;

a predetermined code is added before and after said words segmented from each of said documents;

character strings of predetermined consecutive m-character strings are extracted from each of said segmented words, as said partial character strings, where m is an integer of 2 or larger;

words are detected from said search term in respective classes;

said predetermined code is added before and after each of said words of said search term; and character strings of predetermined consecutive m-character strings are extracted from said search term, as said search term partial character strings, where m is an integer of 2 or larger.

14. The document search method according to claim 13, wherein when each of said documents is segmented into words and when said search term is segmented into words or words are detected from said search term, at least one of a dictionary containing word information and a language processing based on a characteristic of language describing each of said documents, is used.

15. The document search method according to claim 14, wherein:

said neighboring plural-character occurrence bitmap includes a bit list and a document number list, said bit list storing appearance information of a character string by setting a "1" at a bit position corresponding to a document number containing a neighboring plural-character string having an appearance frequency higher than a predetermined threshold value, and said document number list for a neighboring plural-character string having an appearance frequency lower than a predetermined threshold value, storing a document number containing a neighboring plural-character string having an appearance frequency lower than the predetermined threshold value, in the form of a binary data list;

the type of each neighboring plural-character constituent appearing in each of said documents and the number of documents in which each neighboring plural-character constituent appears being calculated in advance;

whether the number of occurrence documents in which texts each neighboring plural-character string appears is larger than said threshold value is judged from the calculated results;

if the number of occurrence documents is judged to be larger than said predetermined threshold value, appearance information of each neighboring plural-character constituent is registered by setting the "1" at a bit position of said bit list corresponding to a document number in which the associated neighboring plural-character string appears;

if the number of occurrence documents is judged to be smaller than said predetermined threshold value, appearance information of each neighboring plural-character constituent is registered by writing a binary data list of a document number in which the associated neighboring plural-character string appears, in said document number list; and the bit list corresponding to a neighboring plural-character string extracted from said search term is read from said neighboring plural-character occurrence bitmap or said document number list corresponding to a neighboring plural-character string extracted from said search term is read from said neighboring plural-character occurrence bitmap and said document number list is converted into a bit list.

16. The document search method according to claim 15, wherein:

a neighboring plural-character string having a high appearance frequency is selected by using statistics information;

each neighboring plural-character string appearing in each said documents is judged whether said neighboring plural-character is selected as having a high appearance frequency;

if the selecting indicates a high appearance frequency, appearance information of each neighboring plural-character constituent is registered by setting the "1" at a bit position of said bit list corresponding to a document number in which the associated neighboring plural-character string appears; and if the selecting indicates a low appearance frequency, appearance information of each neighboring plural-character constituent is registered by writing a binary data list of a document number in which the associated neighboring plural-character string appears, in said document number list.

17. The document search method according to claim 16, wherein:

dividing said registered documents into groups of a predetermined number of documents in accordance with a predetermined rule;

extracting a neighboring plural-character string from each of said divided groups, and creating said bit list and said document number list for each neighboring plural-character string; and merging said bit list and said document number list created for each of said groups to create said neighboring plural-character occurrence bitmap for all of said stored documents.

18. The document search method according to claim 17, wherein further comprising outputting documents not discarded by a search of said neighboring plural-character occurrence bitmap as a search result.

* * * * *